US011361385B2

(12) United States Patent
Brandmaier et al.

(10) Patent No.: US 11,361,385 B2
(45) Date of Patent: *Jun. 14, 2022

(54) APPLICATION FACILITATED CLAIMS DAMAGE ESTIMATION

(71) Applicant: Allstate Insurance Company, Northbrook, IL (US)

(72) Inventors: Jennifer A. Brandmaier, St. Louis Park, MN (US); Mark E. Faga, Evanston, IL (US); Robert H. Johnson, Hoffman Estates, IL (US); Daniel Koza, Hinsdale, IL (US); William Loo, Arlington Heights, IL (US); Clint J. Marlow, Barrington, IL (US); Philip Peter Ramirez, Arlington Heights, IL (US); Kurt M. Stricker, Northfield, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/748,206

(22) Filed: Jan. 21, 2020

(65) Prior Publication Data

US 2022/0012810 A1 Jan. 13, 2022

Related U.S. Application Data

(63) Continuation of application No. 14/063,570, filed on Oct. 25, 2013, now Pat. No. 10,580,075, which is a (Continued)

(51) Int. Cl.
*G06Q 40/08* (2012.01)
(52) U.S. Cl.
CPC .................. *G06Q 40/08* (2013.01)

(58) Field of Classification Search
None
See application file for complete search history.

(56) References Cited

U.S. PATENT DOCUMENTS

| | | | |
|---|---|---|---|
| 4,899,292 A | 2/1990 | Montagna et al. | |
| 5,128,859 A | 7/1992 | Carbone et al. | |
| (Continued) | | | |

FOREIGN PATENT DOCUMENTS

| | | |
|---|---|---|
| CN | 1828336 A | 9/2006 |
| EP | 1215612 A1 | 6/2002 |
| (Continued) | | |

OTHER PUBLICATIONS

Dec. 11, 2020—U.S. Final Office Action—U.S. Appl. No. 15/374,278.

(Continued)

*Primary Examiner* — Narayanswamy Subramanian
(74) *Attorney, Agent, or Firm* — Foley & Lardner LLP

(57) ABSTRACT

Systems and methods provide for an automated system for analyzing damage to process claims associated with an insured item, such as a vehicle. An enhanced claims processing server may analyze damage associated with the insured item using photos/video transmitted to the server from a user device (e.g., a mobile device). The enhanced claims processing server may submit a signal that locks one or more portions of an application on the mobile device used to submit the photos/videos. The mobile device may receive feedback from the server regarding the acceptability of submitted photos/video. The photos may further be annotated using, for example, a touch screen display. An estimate, such as a cost estimate, may be determined for the damage associated with the insured item based on the photos and/or annotations.

19 Claims, 52 Drawing Sheets

Related U.S. Application Data continuation-in-part of application No. 13/834,161, filed on Mar. 15, 2013, now Pat. No. 10,783,585, which is a continuation-in-part of application No. 13/587,620, filed on Aug. 16, 2012, now Pat. No. 8,510,196, and a continuation-in-part of application No. 13/587,630, filed on Aug. 16, 2012, now abandoned, and a continuation-in-part of application No. 13/587,635, filed on Aug. 16, 2012, now Pat. No. 10,430,885.

(56) References Cited

U.S. PATENT DOCUMENTS

| | | |
|---|---|---|
| 5,317,503 A | 5/1994 | Inoue |
| 5,432,904 A | 7/1995 | Wong |
| 5,504,674 A | 4/1996 | Chen et al. |
| 5,950,169 A | 9/1999 | Borghesi et al. |
| 6,141,611 A | 10/2000 | Mackey et al. |
| 6,185,540 B1 | 2/2001 | Schreitmueller et al. |
| 7,092,369 B2 | 8/2006 | Fuccello et al. |
| 7,197,444 B2 | 3/2007 | Bomar, Jr. et al. |
| 7,203,654 B2 | 4/2007 | Menendez |
| 7,263,493 B1 | 8/2007 | Provost et al. |
| 7,324,951 B2 | 1/2008 | Renwick et al. |
| 7,346,523 B1 | 3/2008 | Provost et al. |
| 7,432,938 B1 | 10/2008 | Reuter et al. |
| 7,586,654 B2 | 9/2009 | Hoberock |
| 7,702,529 B2 | 4/2010 | Wahlbin et al. |
| 7,734,485 B1 | 6/2010 | Bohanek |
| 7,809,587 B2 | 10/2010 | Dorai et al. |
| 7,873,710 B2 | 1/2011 | Kiley et al. |
| 7,889,931 B2 | 2/2011 | Webb et al. |
| 7,953,615 B2 | 5/2011 | Aquila et al. |
| 7,962,485 B1 | 6/2011 | Trandal et al. |
| 8,005,720 B2 | 8/2011 | King et al. |
| 8,015,036 B2 | 9/2011 | Leisure |
| 8,019,629 B1 | 9/2011 | Medina, III et al. |
| 8,035,639 B2 | 10/2011 | Witte |
| 8,081,795 B2 | 12/2011 | Brown |
| 8,095,394 B2 | 1/2012 | Nowak et al. |
| 8,239,220 B2 | 8/2012 | Kidd et al. |
| 8,306,258 B2 | 11/2012 | Brown |
| 8,510,196 B1 | 8/2013 | Brandmaier et al. |
| 8,554,587 B1 | 10/2013 | Nowak et al. |
| 8,650,106 B1 | 2/2014 | Hopkins, III |
| 8,712,893 B1 | 4/2014 | Brandmaier et al. |
| 9,137,417 B2 | 9/2015 | Macciola et al. |
| 9,691,189 B1* | 6/2017 | Creath ............... G07C 1/00 |
| 9,824,453 B1 | 11/2017 | Collins et al. |
| 9,846,915 B2 | 12/2017 | Howe et al. |
| 9,970,881 B1 | 5/2018 | Hillman et al. |
| 10,332,209 B1 | 6/2019 | Brandmaier et al. |
| 10,373,262 B1 | 8/2019 | Haller, Jr. et al. |
| 10,373,387 B1 | 8/2019 | Fields et al. |
| 10,380,696 B1 | 8/2019 | Haller, Jr. et al. |
| 10,430,885 B1 | 10/2019 | Brandmaier et al. |
| 10,430,886 B1 | 10/2019 | Brandmaier et al. |
| 10,572,944 B1 | 2/2020 | Brandmaier et al. |
| 10,573,012 B1 | 2/2020 | Collins et al. |
| 10,580,075 B1 | 3/2020 | Brandmaier et al. |
| 10,621,675 B1 | 4/2020 | Genser et al. |
| 10,650,617 B2 | 5/2020 | Schmitt et al. |
| 10,783,585 B1 | 9/2020 | Banerjee et al. |
| 10,810,677 B1 | 10/2020 | Brandmaier et al. |
| 10,846,556 B2* | 11/2020 | Hou ............... G06N 3/0454 |
| 10,902,525 B2* | 1/2021 | Kelsh ............... G06Q 40/08 |
| 2002/0002475 A1 | 1/2002 | Freedman et al. |
| 2002/0055861 A1 | 5/2002 | King et al. |
| 2002/0161533 A1 | 10/2002 | Uegaki |
| 2002/0188479 A1* | 12/2002 | Renwick ............. G06Q 40/08 |
| | | 705/4 |
| 2003/0219169 A1 | 11/2003 | Sartor et al. |
| 2004/0064345 A1 | 4/2004 | Ajamian et al. |
| 2004/0153346 A1 | 8/2004 | Grundel et al. |
| 2005/0125127 A1 | 6/2005 | Bomar et al. |
| 2005/0228683 A1 | 10/2005 | Saylor et al. |
| 2005/0246108 A1 | 11/2005 | Fournier |
| 2005/0251427 A1 | 11/2005 | Dorai et al. |
| 2006/0029296 A1 | 2/2006 | King et al. |
| 2006/0080154 A1 | 4/2006 | Larsen |
| 2006/0098899 A1 | 5/2006 | King et al. |
| 2007/0027726 A1 | 2/2007 | Warren et al. |
| 2008/0052134 A1 | 2/2008 | Nowak et al. |
| 2008/0059238 A1 | 3/2008 | Park et al. |
| 2008/0255722 A1 | 10/2008 | McClellan et al. |
| 2008/0255887 A1 | 10/2008 | Gruter |
| 2008/0267487 A1 | 10/2008 | Siri |
| 2009/0018859 A1 | 1/2009 | Purifoy et al. |
| 2009/0018874 A1 | 1/2009 | Blair et al. |
| 2009/0100106 A1 | 4/2009 | Anthony et al. |
| 2009/0138290 A1 | 5/2009 | Holden |
| 2009/0147988 A1 | 6/2009 | Jones et al. |
| 2009/0234678 A1* | 9/2009 | Arenas ............... G06Q 40/08 |
| | | 705/4 |
| 2009/0265193 A1 | 10/2009 | Collins et al. |
| 2009/0309893 A1 | 12/2009 | Boothroyd et al. |
| 2010/0036683 A1 | 2/2010 | Logan |
| 2010/0066012 A1 | 3/2010 | Yamazaki et al. |
| 2010/0088123 A1 | 4/2010 | McCall et al. |
| 2010/0138298 A1 | 6/2010 | Fitzgerald et al. |
| 2010/0174564 A1 | 7/2010 | Stender et al. |
| 2010/0183246 A1 | 7/2010 | King et al. |
| 2011/0040692 A1 | 2/2011 | Ahroon |
| 2011/0054806 A1 | 3/2011 | Goldfine et al. |
| 2011/0085211 A1 | 4/2011 | King et al. |
| 2011/0161100 A1 | 6/2011 | Peak et al. |
| 2011/0161116 A1 | 6/2011 | Peak et al. |
| 2011/0161117 A1 | 6/2011 | Busque et al. |
| 2011/0161118 A1 | 6/2011 | Borden et al. |
| 2011/0196707 A1 | 8/2011 | Danico et al. |
| 2011/0213628 A1 | 9/2011 | Peak et al. |
| 2011/0218825 A1 | 9/2011 | Hertenstein |
| 2011/0270641 A1 | 11/2011 | Rossmark et al. |
| 2011/0313936 A1 | 12/2011 | Sieger |
| 2011/0313951 A1 | 12/2011 | Cook |
| 2012/0066012 A1 | 3/2012 | Brown |
| 2012/0290333 A1 | 11/2012 | Birchall |
| 2012/0297337 A1 | 11/2012 | St. Denis et al. |
| 2013/0100306 A1 | 4/2013 | Bekiares et al. |
| 2013/0297353 A1 | 11/2013 | Strange et al. |
| 2013/0317861 A1 | 11/2013 | Tofte et al. |
| 2014/0032430 A1 | 1/2014 | Sieger |
| 2014/0108058 A1 | 4/2014 | Bourne et al. |
| 2014/0122133 A1 | 5/2014 | Weisberg et al. |
| 2014/0229207 A1 | 8/2014 | Swamy et al. |
| 2014/0266789 A1 | 9/2014 | Matus |
| 2014/0327940 A1 | 11/2014 | Amtrup et al. |
| 2015/0029346 A1 | 1/2015 | Sieger et al. |
| 2015/0073864 A1 | 3/2015 | Labrie et al. |
| 2015/0156419 A1 | 6/2015 | Aggarwal et al. |
| 2015/0294419 A1 | 10/2015 | Gonzalez Miranda et al. |
| 2015/0324639 A1 | 11/2015 | Macciola |
| 2015/0348204 A1 | 12/2015 | Daues |
| 2015/0363717 A1 | 12/2015 | Lim |
| 2015/0365600 A1 | 12/2015 | Pollack et al. |
| 2016/0171622 A1 | 6/2016 | Perkins et al. |
| 2017/0046788 A1 | 2/2017 | Macciola et al. |
| 2017/0111532 A1 | 4/2017 | Amtrup et al. |
| 2017/0116494 A1 | 4/2017 | Isaev |
| 2017/0270612 A1 | 9/2017 | Howe et al. |
| 2017/0270650 A1 | 9/2017 | Howe et al. |
| 2017/0293894 A1 | 10/2017 | Taliwal et al. |
| 2017/0330207 A1 | 11/2017 | Labrie et al. |
| 2017/0330284 A1 | 11/2017 | Tofte et al. |
| 2017/0364159 A1 | 12/2017 | Eronen et al. |
| 2018/0260793 A1 | 9/2018 | Li et al. |

(56) References Cited

U.S. PATENT DOCUMENTS

| | | | |
|---|---|---|---|
| 2019/0019295 A1 | 1/2019 | Lehtiniemi et al. | |
| 2020/0065632 A1 | 2/2020 | Guo et al. | |
| 2020/0242838 A1 | 7/2020 | Kuruvilla et al. | |

FOREIGN PATENT DOCUMENTS

| | | | |
|---|---|---|---|
| JP | 2000050156 A | 2/2000 | |
| JP | 2010157267 A | 7/2010 | |
| KR | 2002008466 A | 1/2002 | |
| KR | 2006031208 A | 4/2006 | |
| WO | 2010026170 A1 | 3/2010 | |
| WO | 2011157064 A1 | 12/2011 | |
| WO | 2012113084 A1 | 8/2012 | |
| WO | 2013003957 A1 | 1/2013 | |
| WO | PCT/US20/52698 | 9/2020 | |

OTHER PUBLICATIONS

Mar. 26, 2020—U.S. Non-Final Office Action—U.S. Appl. No. 16/586,008.
Apr. 13, 2020—U.S. Final Office Action—U.S. Appl. No. 14/269,387.
Nov. 10, 2020—U.S. Non-Final Office Action—U.S. Appl. No. 16/450,270.
Nov. 13, 2020—U.S. Final Office Action—U.S. Appl. No. 14/269,387.
Feb. 19, 2020—U.S. Non-Final Office Action—U.S. Appl. No. 14/671,602.
Feb. 27, 2020—U.S. Final Office Action—U.S. Appl. No. 16/450,270.
May 18, 2017—U.S. Final Office Action—U.S. Appl. No. 14/671,617.
May 24, 2017—U.S. Non-Final Office Action—U.S. Appl. No. 14/063,517.
Jul. 10, 2017—U.S. Non-Final Office Action—U.S. Appl. No. 14/190,976.
Aug. 22, 2017—U.S. Final Office Action—U.S. Appl. No. 13/587,635.
Sep. 13, 2017—U.S. Final Office Action—U.S. Appl. No. 14/063,517.
Sep. 18, 2017—U.S. Final Office Action—U.S. Appl. No. 13/892,598.
Sep. 25, 2017—U.S. Non-Final Office Action—U.S. Appl. No. 13/834,170.
Sep. 25, 2017—U.S. Non-Final Office Action—U.S. Appl. No. 13/834,161.
Oct. 6, 2017—U.S. Final Office Action—U.S. Appl. No. 13/587,630.
Oct. 20, 2017—U.S. Non-Final Office Action—U.S. Appl. No. 13/834,210.
Nov. 1, 2017—U.S. Final Office Action—U.S. Appl. No. 14/671,602.
Dec. 1, 2017—U.S. Non-Final Office Action—U.S. Appl. No. 13/933,576.
Dec. 7, 2017—U.S. Non-Final Office Action—U.S. Appl. No. 14/671,617.
Dec. 8, 2017—U.S. Non-Final Office Action—U.S. Appl. No. 14/063,570.
Jan. 9, 2018—U.S. Non-Final Office Action—U.S. Appl. No. 13/892,598.
Jan. 12, 2018—U.S. Final Office Action—U.S. Appl. No. 13/834,161.
Mar. 12, 2018—U.S. Non-Final Office Action—U.S. Appl. No. 14/063,517.
Mar. 9, 2018—U.S. Final Office Action—U.S. Appl. No. 14/269,387.
Mar. 14, 2018—U.S. Final Office Action—U.S. Appl. No. 13/834,170.
Mar. 14, 2018—U.S. Final Office Action—U.S. Appl. No. 13/834,210.
Mar. 16, 2018—U.S. Final Office Action—U.S. Appl. No. 14/063,570.
Mar. 16, 2018—U.S. Final Office Action—U.S. Appl. No. 13/933,576.
Mar. 21, 2018—U.S. Non-Final Office Action—U.S. Appl. No. 14/671,602.
Mar. 28, 2018—U.S. Non-Final Office Action—U.S. Appl. No. 13/587,635.
Mar. 30, 2018—U.S. Non-Final Office Action—U.S. Appl. No. 13/587,630.
Mar. 27, 2018—U.S. Non-Final Office Action—U.S. Appl. No. 15/855,057.
Apr. 3, 2018—U.S. Final Office Action—U.S. Appl. No. 14/190,976.
Jun. 20, 2018—U.S. Non-Final Office Action—U.S. Appl. No. 13/834,161.
Jun. 26, 2018—U.S. Final Office Action—U.S. Appl. No. 13/892,598.
Jul. 6, 2018—U.S. Final Office Action—U.S. Appl. No. 14/671,602.
Aug. 15, 2018—U.S. Non-Final Office Action—U.S. Appl. No. 13/834,170.
Sep. 5, 2018—U.S. Final Office Action—U.S. Appl. No. 14/063,517.
Sep. 4, 2018—U.S. Non-Final Office Action—U.S. Appl. No. 13/834,210.
Sep. 17, 2018—U.S. Non-Final Office Action—U.S. Appl. No. 13/933,576.
Sep. 21, 2018—U.S. Final Office Action—U.S. Appl. No. 14/671,617.
Oct. 4, 2018—U.S. Final Office Action—U.S. Appl. No. 15/855,057.
Oct. 5, 2018—U.S. Final Office Action—U.S. Appl. No. 13/587,630.
Nov. 2, 2018—U.S. Non-Final Office Action—U.S. Appl. No. 14/269,387.
Oct. 9, 2018—U.S. Final Office Action—U.S. Appl. No. 13/834,161.
Nov. 9, 2018—U.S. Non-Final Office Action—U.S. Appl. No. 14/063,570.
Nov. 13, 2018—U.S. Final Office Action—U.S. Appl. No. 13/587,635.
Nov. 14, 2018—U.S. Non-Final Office Action—U.S. Appl. No. 13/892,598.
Jan. 14, 2019—U.S. Final Office Action—U.S. Appl. No. 13/834,170.
Feb. 6, 2019—U.S. Notice of Allowance—U.S. Appl. No. 14/190,976.
"How Can We Stop Insurers Writing Estimates from Photos", Angelo DiTullio, Babcox Media, Inc., BodyShop Business 35.4: 48(2), Apr. 2016.
Applying Image Analysis to Auto Insurance Triage: A Novel Application, Institute of Electrical and Electronics Engineers, Ying Li and Chitra Dorai, MMSP 2007 Proceedings, Chania, Crete, Greece, Oct. 1-3, 2007, pp. 280-283, Year: 2007.
Feb. 21, 2019—U.S. Non-Final Office Action—U.S. Appl. No. No. 14/671,602.
Mar. 22, 2019—U.S. Non-Final Office Action—U.S. Appl. No. 13.587,630.
Mar. 20, 2019—U.S. Final Office Action—U.S. Appl. No. 14/063,570.
Nov. 27, 2020—U.S. Non-Final Office Action—U.S. Appl. No. 17/026,598.
Nov. 30, 2020—U.S. Notice of Allowance—U.S. Appl. No. 16/995,003.
Jan. 29, 2020—U.S. Notice of Allowance—U.S. Appl. No. 14/458,826.
May 20, 2020—U.S. Notice of Allowance—U.S. Appl. No. 13/834,161.
Jun. 11, 2020—Notice of Allowance—U.S. Appl. No. 16/570,421.
Jun. 12, 2020—U.S. Notice of Allowance—U.S. Appl. No. 15/855,057.
Mar. 22, 2019—U.S. Non-Final Office Action—U.S. Appl. No. 14/063,517.
Mar. 22, 2019—U.S. Non-Final Office Action—U.S. Appl. No. 14/671,617.
Mar. 20, 2019—U.S. Final Office Action—U.S. Appl. No. 13/834,210.
Apr. 12, 2019—U.S. Final Office Action—U.S. Appl. No. 13/933,576.
"Stereoscopic Imaging", https://www.Techopedia.com/definition/91/stereoscopic-imaging, retrieved on Apr. 7, 2019, Year 2019.
May 3, 2019—U.S. Final Office Action—U.S. Appl. No. 15/184,580.
Mort, et al, "Marketing m-services: Establishing a Usage Benefit Typology Related to Mobile User Characteristics," Jul. 2005, Journal of Database Martketing & Customer Strategy Management, vol. 12, Issue 4, pp. 327-341.
May 15, 2019 U.S. Notice of Allowance and Fees Due—U.S. Appl. No. 16/892,598.
May 20, 2019 U.S. Notice of Allowance and Fees Due—U.S. Appl. No. 13/587,635.
May 17, 2019—U.S. Non-Final Office Action—U.S. Appl. No. 15/374,278.
Jul. 30, 2019—U.S. Non-Final Office Action—U.S. Appl. No. 15/855,057.
Aug. 28, 2019—U.S. Non-Final Office Action—U.S. Appl. No. 16/450,270.
Sep. 30, 2019—U.S. Final Office Action—U.S. Appl. No. 14/671,602.
Oct. 4, 2019—U.S. Final Office Action—U.S. Appl. No. 15/374,278.
Oct. 18, 2019—U.S. Notice of Allowance—U.S. Appl. No. 14/671,617.
Nov. 18, 2019—U.S. Notice of Allowance—U.S. Appl. No. 14/063,517.
Nov. 18, 2019—U.S. Notice of Allowance—U.S. Appl. No. 14/063,570.
Dec. 3, 2019 U.S. Non-Final Office Action—U.S. Appl. No. 14/269,387.
Dec. 5, 2019 U.S. Final Office Action—U.S. Appl. No. 15/855,057.

(56) References Cited

OTHER PUBLICATIONS

Jul. 16, 2020—U.S. Non-Final Office Action—U.S. Appl. No. 15/374,278.
Jul. 30, 2020—U.S. Final Office Action—U.S. Appl. No. 16/586,008.
Sep. 23, 2013 U.S.—Final Office Action—U.S. Appl. No. 13/587,635.
Sep. 30, 2013 U.S. Office Action—U.S. Appl. No. 13/587,630.
Jan. 23, 2014 U.S. Office Action—U.S. Appl. No. 13/834,210.
Dec. 3, 2013—U.S. Office Action—U.S. Appl. No. 13/834,161.
Feb. 27, 2013 U.S. Office Action—U.S. Appl. No. 13/587,620.
Jun. 25, 2013 U.S. Office Action—U.S. Appl. No. 13/587,635.
Dec. 26, 2013—U.S. Office Action—U.S. Appl. No. 13/933,576.
Aug. 8, 2013—U.S. Office Action—U.S. Appl. No. 13/933,576.
Download our pocket agent app for iPhone today; retrieved from https://www.statefarm.com/about-us/innovation-research/mobile-apps/pocket-agent-for-iphone/; Copyright, State Farm Mutual Automobile Insurance Company, 2013.
Security First Mobile, downloaded from http://www.securityfirstflorida.com/security-first-mobile/, Copyright 2014 Security First Insurance Company.
Set the Nationwide Mobile App for Android and iPhone, downloaded from http://www.nationwide.com/mobile-support.isp, 2014 Nationwide Mutual Insurance Company amd Affililated Companies.
Welcome to USAA! to get started, please enable cookies, downloaded from https://www.usaa.com/inet/pages/mobile_access_methods_mobileapps?akredirect=true, 2013 USAA.
Farmers iClaim, downloaded from http://www.farmers.com/iclaim.html, 2014 Farmers Insurance Company.
Imaging Technology Saves the Day for Insurance Claim Processing; downloaded from www.snowbound.com/resources/articles/business-benefits-industry-information/imaging-technology-saves-day-insurance; 2013 Snowbound Software.
Feb. 26, 2016 U.S. Office Action—U.S. Appl. No. 13/834,170.
Feb. 26, 2014 U.S. Office Action—U.S. Appl. No. 14/063,517.
May 6, 2014 (US)—Office Action U.S. Appl. No. 13/892,598.
Apr. 9, 2014 U.S. Office Action—U.S. Appl. No. 14/063,533.
Apr. 9, 2014 U.S. Office Action—U.S. Appl. No. 14/063,570.
Mar. 26, 2014 U.S. Office Action U.S. Appl. No. 13/834,193.
May 19, 2014—U.S. Office Action—U.S. Appl. No. 13/834,161.
Apr. 23, 2014—U.S. Office Action—U.S. Appl. No. 13/587,635.
Aug. 21, 2014—U.S. Non-Final Office Action—U.S. Appl. No. 14/063,517.
Aug. 22, 2014—U.S. Non-Final Office Action—U.S. Appl. No. 13/834,170.
Aug. 25, 2014—U.S. Non-Final Office Action—U.S. Appl. No. 13/834,210.
Oct. 30, 2014—U.S. Non-Final Office Action—U.S. Appl. No. 13/834,193.
Nov. 18, 2014—U.S. Final Office Action—U.S. Appl. No. 13/892,598.
Nov. 20, 2014—U.S. Non-Final Office Action—U.S. Appl. No. 14/063,533.
Nov. 20, 2014—U.S. Non-Final Office Action—U.S. Appl. No. 14/063,570.
Dec. 3, 2014 U.S. Non-Final Office Action—U.S. Appl. No. 14/076,473.
Dec. 4, 2014—U.S. Office Action—U.S. Appl. No. 13/834,161.
Jan. 13, 2015 U.S. Non-Final Office Action—U.S. Appl. No. 13/587,635.
Jan. 20, 2015 U.S. Non-Final Office Action—U.S. Appl. No. 13/933,576.
Mar. 4, 2015 U.S. Final Office Action—U.S. Appl. No. 14/063,517.
Mar. 13, 2015 U.S. Final Office Action—U.S. Appl. No. 13/834,170.
Mar. 13, 2015 U.S. Office Action—U.S. Appl. No. 13/834,161.
Mar. 16, 2015 U.S. Final Office Action—U.S. Appl. No. 13/834,210.
Apr. 29, 2015 U.S. Final Office Action—U.S. Appl. No. 13/834,193.
Apr. 30, 2015 U.S. Final Office Action—U.S. Appl. No. 14/063,570.
May 12, 2015 U.S. Final Office Action—U.S. Appl. No. 13/933,576.
May 8, 2015 U.S. Final Office Action—U.S. Appl. No. 14/063,533.
May 6, 2015 U.S. Final Office Action—U.S. Appl. No. 14/076,473.
Jun. 3, 2015—U.S. Office Action—U.S. Appl. No. 14/671,617.
May 20, 2015 U.S. Non-Final Office Action—U.S. Appl. No. 13/892,598.
May 18, 2015—U.S. Non-Final Office Action—U.S. Appl. No. 14/269,387.
May 14, 2015—U.S. Non-Final Office Action—U.S. Appl. No. 14/671,602.
Jul. 27, 2015—U.S. Final Office Action—U.S. Appl. No. 13/587,635.
Aug. 11, 2015—U.S. Non-Final Office Action—U.S. Appl. No. 14/076,473.
Aug. 13, 2015—U.S. Non-Final Office Action—U.S. Appl. No. 14/190,976.
Feb. 5, 2015 U.S. Final Office Action—U.S. Appl. No. 13/587,630.
Aug. 21, 2014 U.S. Non-Final Office Action—U.S. Appl. No. 13/587,630.
Aug. 21, 2014 U.S. Final Office Action—U.S. Appl. No. 13/587,635.
Aug. 12, 2015—U.S. Final Office Action—U.S. Appl. No. 14/269,387.
Sep. 23, 2015—U.S. Final Office Action—U.S. Appl. No. 14/671,602.
Nov. 12, 2015—U.S. Response to Non-Final Office Action—U.S. Appl. No. 14/190,976.
Aug. 31, 2015—U.S. Response to Non-Final Office Action—U.S. Appl. No. 14/671,617.
Nov. 11, 2015—U.S. Response to Non-Final Office Action—U.S. Appl. No. 14/076,473.
Dec. 3, 2015—U.S. Office Action—U.S. Appl. No. 14/671,617.
Jan. 22, 2016—U.S. Final Office Action—U.S. Appl. No. 14/190,976.
Dec. 1, 2015 U.S. Final Office Action—U.S. Appl. No. 13/892,598.
Oct. 30, 2015 U.S. Non-Final Office Action—U.S. Appl. No. 13/587,635.
Feb. 12, 2016—U.S. Non-Final Office Action—U.S. Appl. No. 14/341,043.
Feb. 16, 2016—U.S. Non-Final Office Action—U.S. Appl. No. 14/341,139.
Mar. 1, 2016—U.S. Final Office Action—U.S. Appl. No. 14/076,473.
Apr. 25, 2016—U.S. Non-Final Office Action—U.S. Appl. No. 13/587,630.
Apr. 5, 2016—U.S. Non-Final Office Action—U.S. Appl. No. 13/892,598.
May 23, 2016—U.S. Non-Final Office Action—U.S. Appl. No. 14/190,976.
Jun. 1, 2016—U.S. Non-Final Office Action—U.S. Appl. No. 13/587,635.
Feb. 23, 2016—U.S. Final Office Action—U.S. Appl. No. 13/587,635.
Jun. 13, 2016—U.S. Non-Final Office Action—U.S. Appl. No. 14/076,473.
Jun. 17, 2016—U.S. Non-Final Office Action—U.S. Appl. No. 14/063,517.
Jul. 29, 2016—U.S. Non-Final Office Action—U.S. Appl. No. 13/834,170.
Aug. 1, 2016—U.S. Office Action—U.S. Appl. No. 13/834,161.
Aug. 3, 2016—U.S. Non-Final Office Action—U.S. Appl. No. 14/671,602.
Jul. 12, 2016—U.S. Final Office Action—U.S. Appl. No. 13/587,630.
Aug. 29, 2016—U.S. Non-Final Office Action—U.S. Appl. No. 13/834,210.
Sep. 15, 2016—U.S. Final Office Action—U.S. Appl. No. 14/063,517.
Sep. 29, 2016 U.S. Final Office Action—U.S. Appl. No. 13/587,635.
Oct. 13, 2016—U.S. Final Office Action—U.S. Appl. No. 13/834,161.
Oct. 13, 2016—U.S. Office Action—U.S. Appl. No. 13/933,576.
Oct. 17, 2016—U.S. Final Office Action—U.S. Appl. No. 13/892,598.
Oct. 18, 2016—U.S. Office Action—U.S. Appl. No. 14/671,602.
Oct. 21, 2016—(US)—Non-Final Office Action—U.S. Appl. No. 14/063,570.
Oct. 24, 2016—U.S. Non-Final Office Action—U.S. Appl. No. 13/834,193.
Nov. 4, 2016—U.S. Final Office Action—U.S. Appl. No. 13/834,170.
Nov. 10, 2016—U.S. Non-Final Office Action—U.S. Appl. No. 14/063,533.
Nov. 25, 2016—U.S. Non-Final Office Action—U.S. Appl. No. 14/671,617.
Dec. 2, 2016—U.S. Final Office Action—U.S. Appl. No. 13/834,210.
Dec. 2, 2016—U.S. Final Office Action—U.S. Appl. No. 14/190,976.
Dec. 2, 2016—U.S. Non-Final Office Action—U.S. Appl. No. 14/269,387.
Oct. 18, 2016—U.S. Final Office Action—U.S. Appl. No. 14/671,602.

(56) References Cited

OTHER PUBLICATIONS

Feb. 7, 2017—U.S. Non-Final Office Action—U.S. Appl. No. 13/587,635.
Mar. 13, 2017—U.S. Final Office Action—U.S. Appl. No. 14/269,387.
Mar. 29, 2017—U.S. Final Office Action—U.S. Appl. No. 13/834,193.
Mar. 30, 2017—U.S. Final Office Action—U.S. Appl. No. 14/063,533.
Mar. 31, 2017—U.S. Final Office Action—U.S. Appl. No. 14/063,570.
Apr. 6, 2017—U.S. Final Office Action—U.S. Appl. No. 13/933,576.
Apr. 5, 2017—U.S. Non-Final Office Action—U.S. Appl. No. 13/892,598.
May 9, 2017—U.S. Non-Final Office Action—U.S. Appl. No. 13/587,630.
May 16, 2017—U.S. Non-Final Office Action—U.S. Appl. No. 14/671,602.
Aug. 19, 2020—U.S. Notice of Allowance—U.S. Appl. No. 14/671,602.
Notice of Allowance on U.S. Appl. No. 16/586,008 dated Nov. 15, 2021, 10 pages.
Notice of Allowance on U.S. Appl. No. 17/026,598 dated Oct. 1, 2021, 7 pages.
Office Action on U.S. Appl. No. 14/269,387 dated Oct. 26, 2021, 26 pages.
Office Action on U.S. Appl. No. 15/374,278 dated Oct. 15, 2021, 20 pages.
Office Action on U.S. Appl. No. 16/450,270 dated Dec. 7, 2021, 17 pages.
International Search Report & Written Opinion for PCT/US2020/052698 dated Jan. 28, 2021, 8 pages.
U.S. Office Action for U.S. Appl. No. 14/269,387 dated Jun. 25, 2021, 21 pages.
U.S. Office Action for U.S. Appl. No. 16/450,270 dated May 5, 2021, 14 pages.
U.S. Office Action for U.S. Appl. No. 16/586,008 dated Jun. 30, 2021, 21 pages.
U.S. Office Action on U.S. Appl. No. 17/008,079 dated Sep. 15, 2021, 10 pages.
U.S. Notice of Allowance on U.S. Appl. No. 16/995,003 dated Apr. 7, 2021.
U.S. Notice of Allowance on U.S. Appl. No. 17/026,598 dated Mar. 19, 2021.
U.S. Office Action on U.S. Appl. No. 13/834,210 dated Apr. 29, 2021.
U.S. Office Action on U.S. Appl. No. 16/586,008 dated Mar. 8, 2021.
Final Office Action for U.S. Appl. No. 13/834,210 dated Apr. 1, 2022, 17 pages.
Final Office Action on U.S. Appl. No. 15/374,278 dated Feb. 15, 2022, 19 pages.
Notice of Allowance for U.S. Appl. No. 17/026,598 dated Mar. 28, 2022, 6 pages.
Notice of Allowance on U.S. Appl. No. 16/995,003 dated Feb. 17, 2022, 5 pages.
Notice of Allowance on U.S. Appl. No. 17/008,079 dated Feb. 22, 2022, 11 pages.
Office Action for U.S. Appl. No. 14/269,387 dated Apr. 14, 2022, 20 pages.
Phillips, "Image Processing in C," R&D Publications, Second Edition, pp. 47-275 (2000).

\* cited by examiner

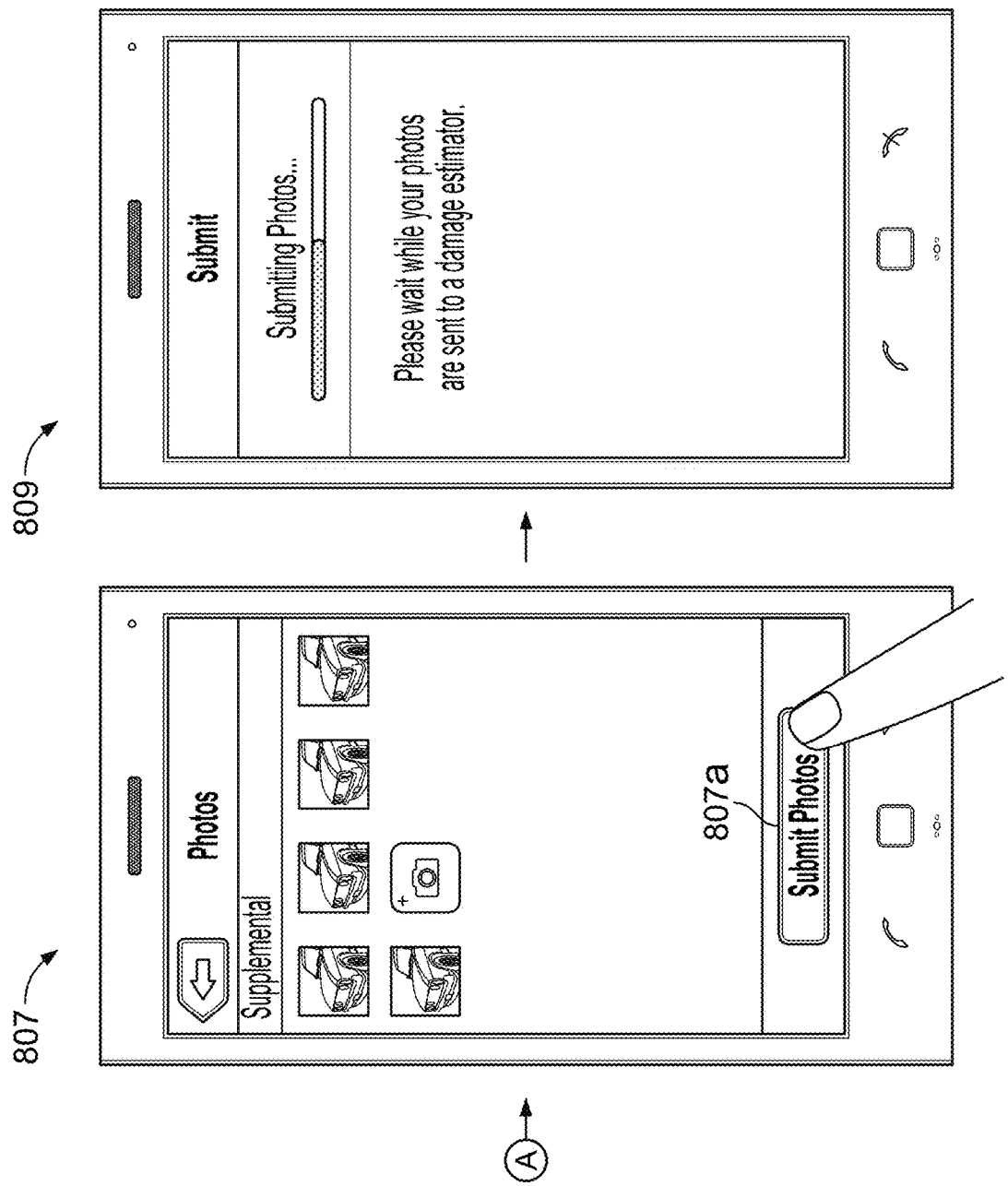

1000

```
┌─────────────────────────────────────────────────────────────────────┐
│ Server associated with third party entity receives data related to  │
│ damage of an insured item (1001)                                    │
└─────────────────────────────────────────────────────────────────────┘
                                 ↓
┌─────────────────────────────────────────────────────────────────────┐
│ Server associated with third party entity evaluates information     │
│ related to insurance policy associated with the insured item (1003) │
└─────────────────────────────────────────────────────────────────────┘
                                 ↓
┌─────────────────────────────────────────────────────────────────────┐
│ Server associated with third party entity analyzes data related to  │
│ damage of insured item and information related to insurance policy  │
│ (1005)                                                              │
└─────────────────────────────────────────────────────────────────────┘
                                 ↓
┌─────────────────────────────────────────────────────────────────────┐
│ Server associated with third party entity calculates an overall     │
│ valuation of submitting an insurance claim (1007)                   │
└─────────────────────────────────────────────────────────────────────┘
                                 ↓
┌─────────────────────────────────────────────────────────────────────┐
│ Server associated with third party entity transmits suggestion of   │
│ whether or not to submit an insurance claim for the damaged item    │
│ (1009)                                                              │
└─────────────────────────────────────────────────────────────────────┘
                                 ↓
┌─────────────────────────────────────────────────────────────────────┐
│ Server associated with third party entity transmits incentives      │
│ based on consumer details, insurance policy details, and damage     │
│ details (1011)                                                      │
└─────────────────────────────────────────────────────────────────────┘
```

FIG. 10

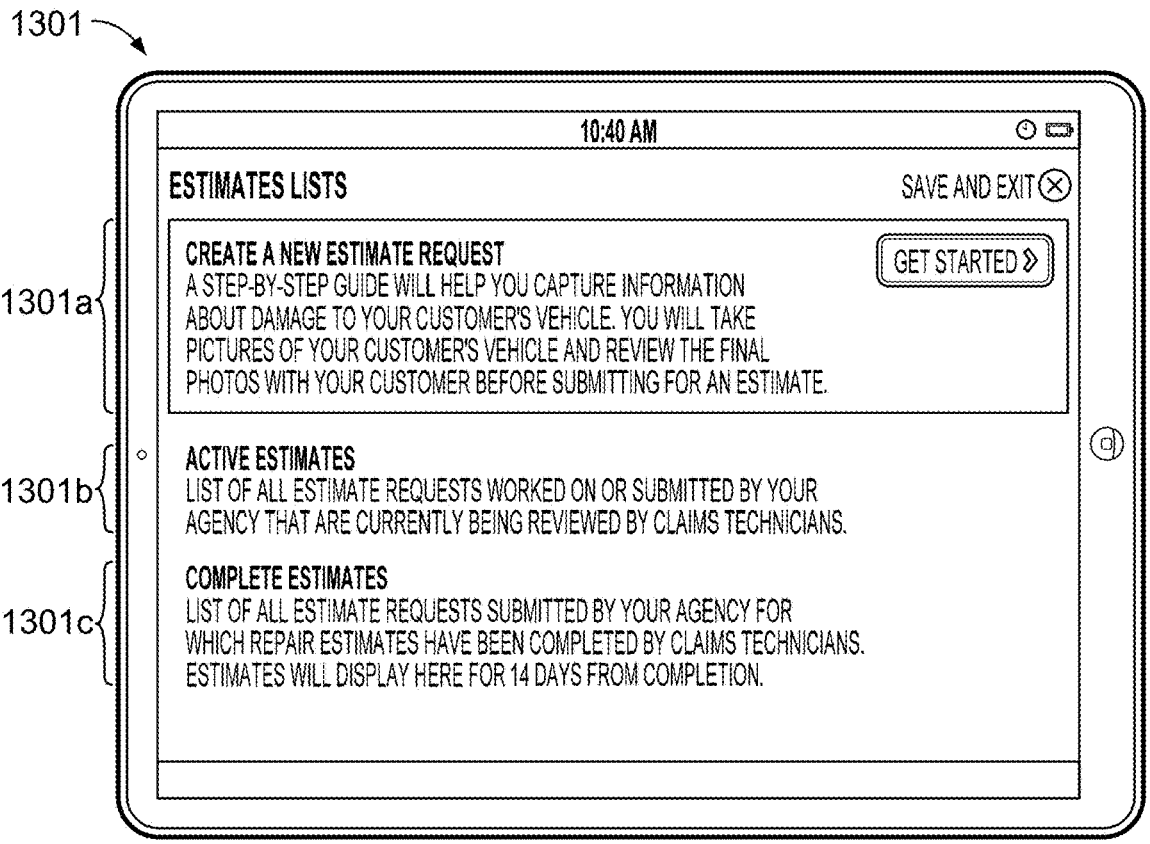
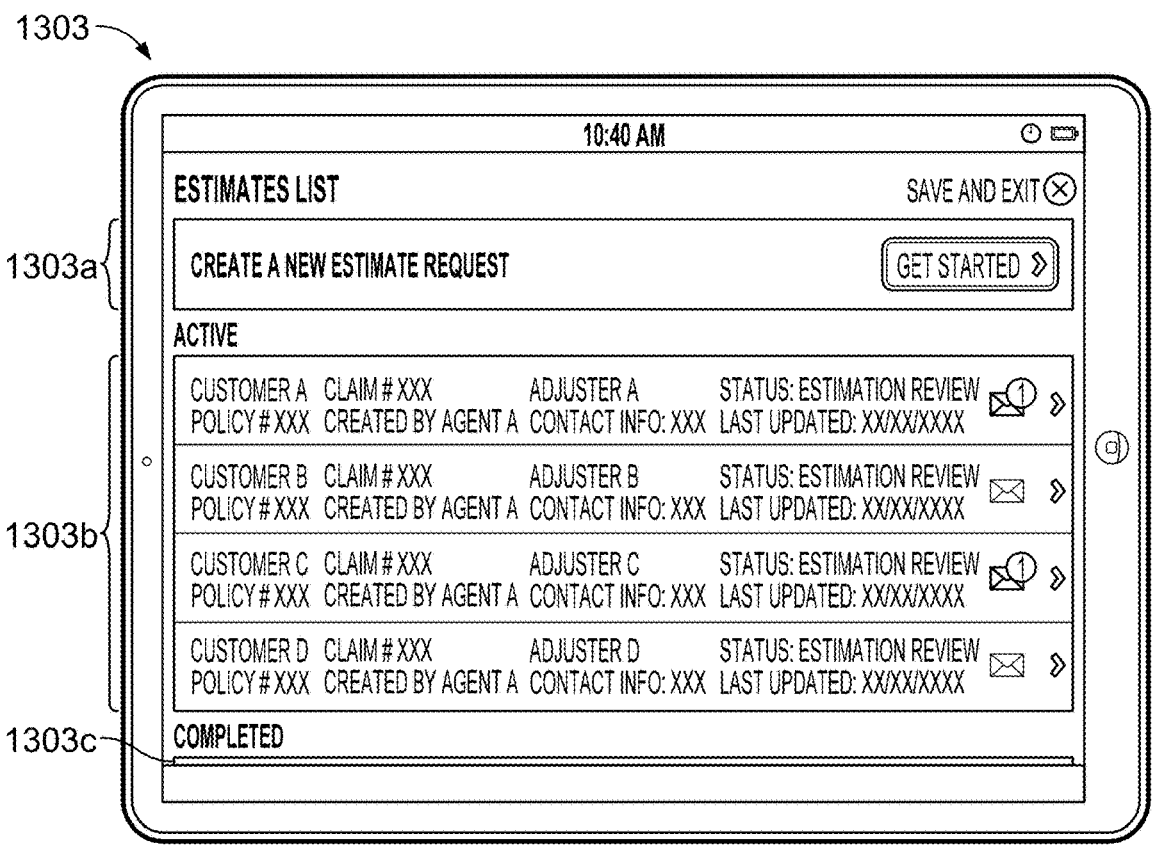
FIG. 13

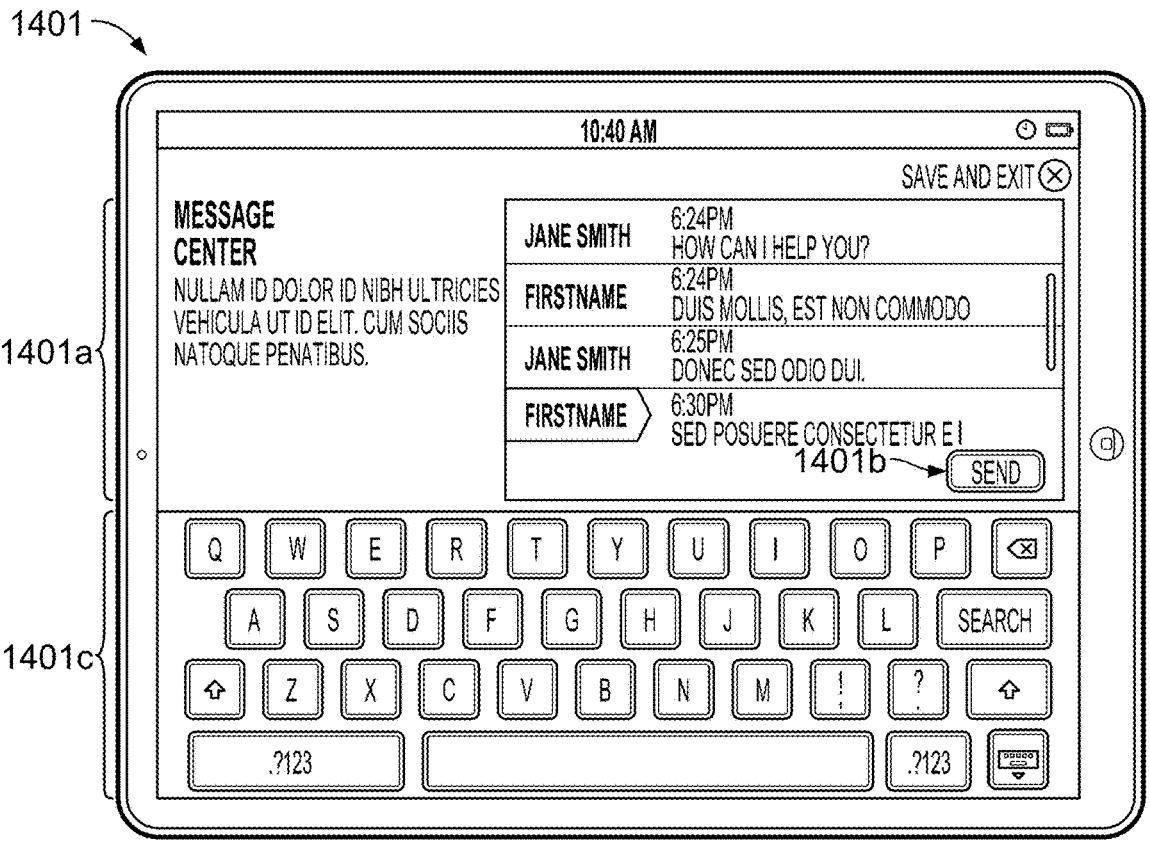
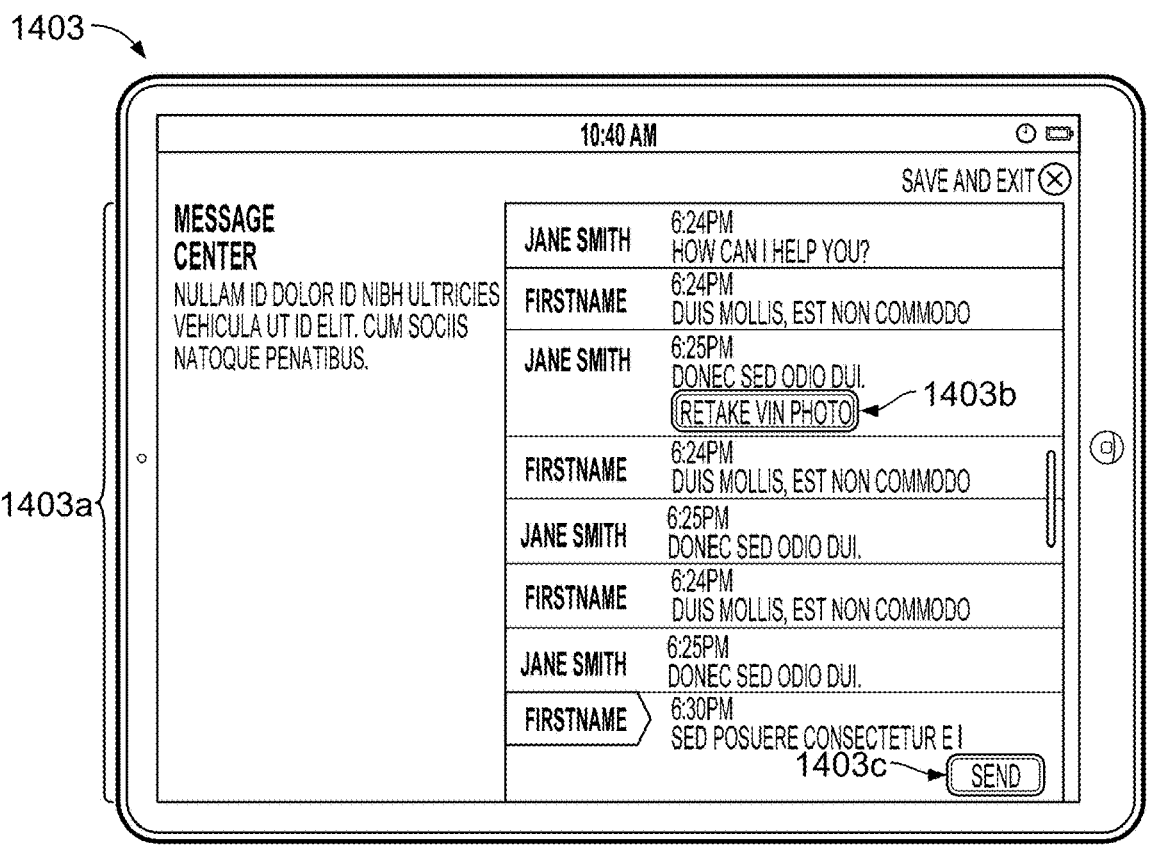
FIG. 14

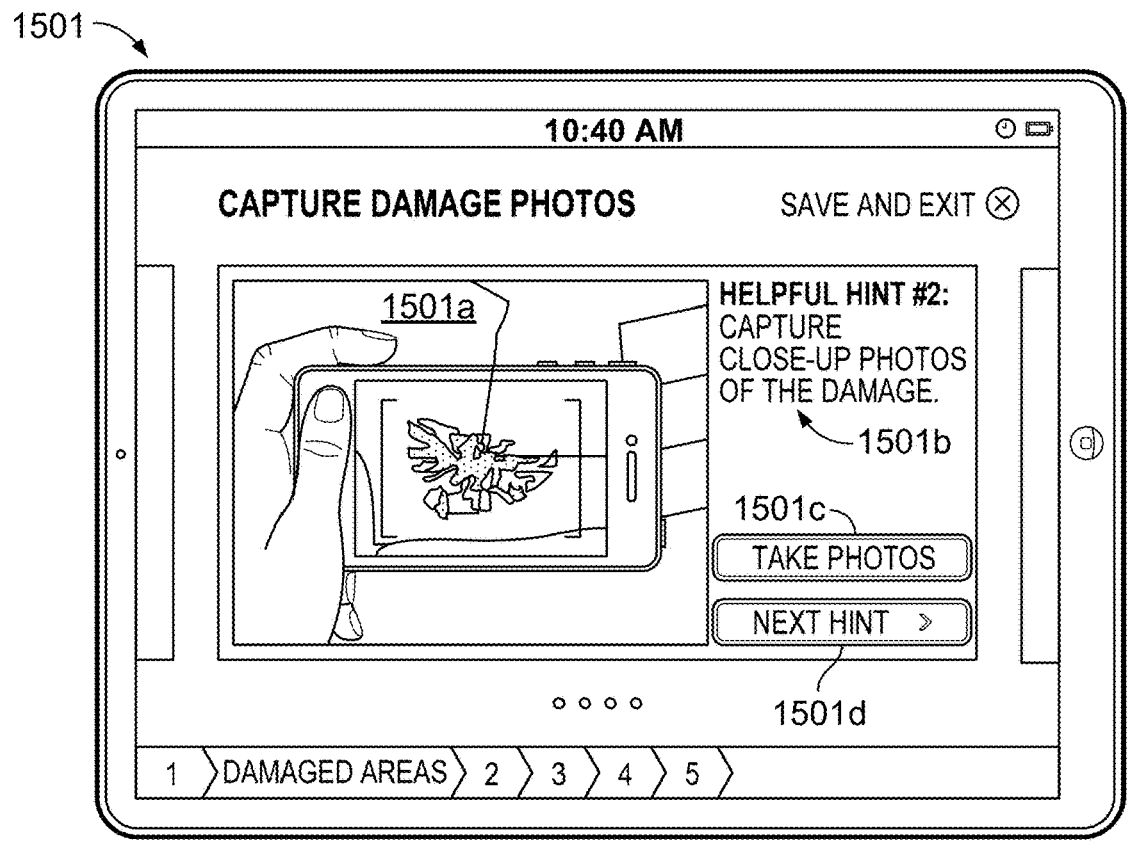
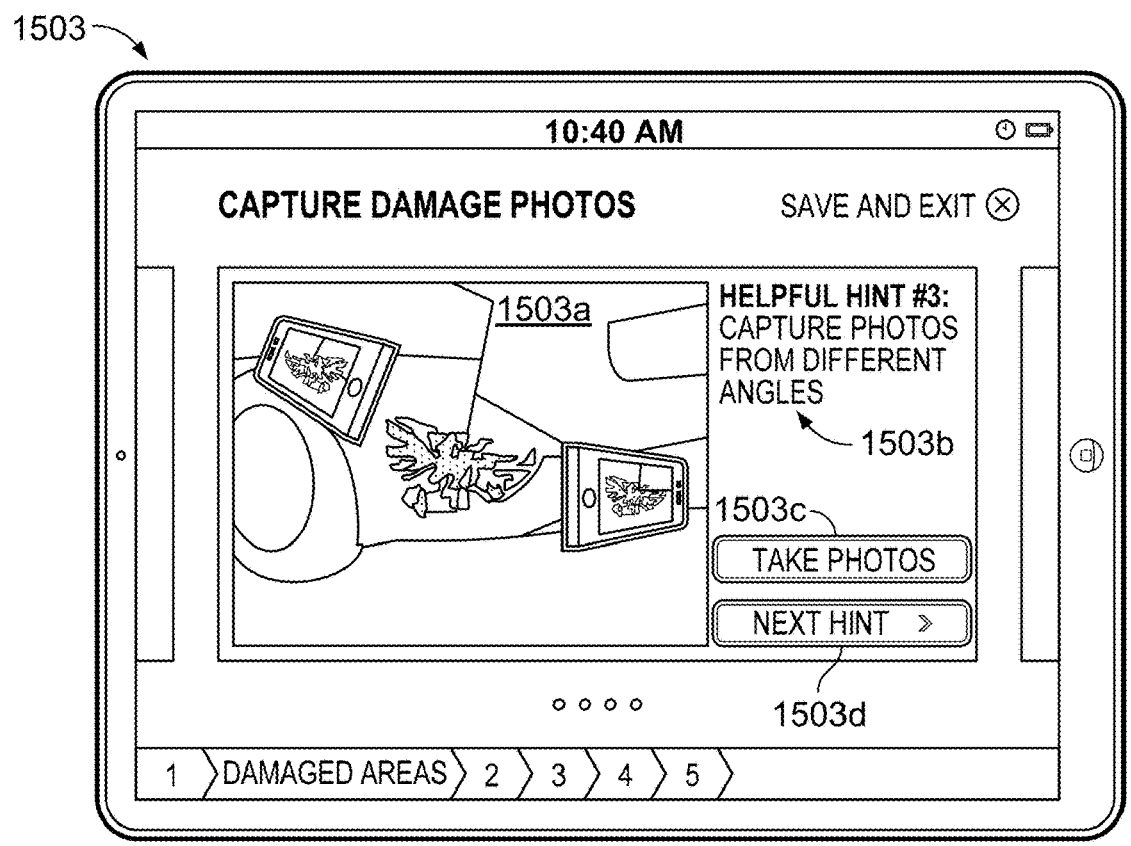
FIG. 15

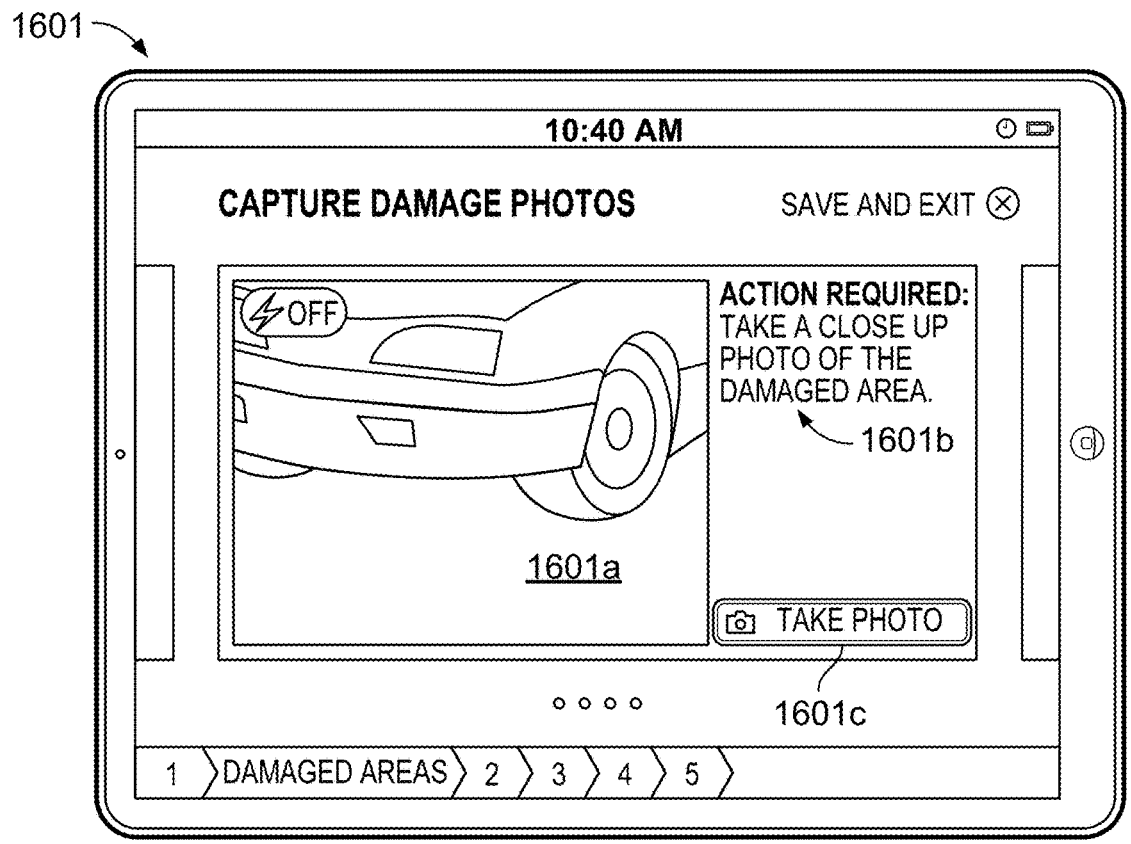
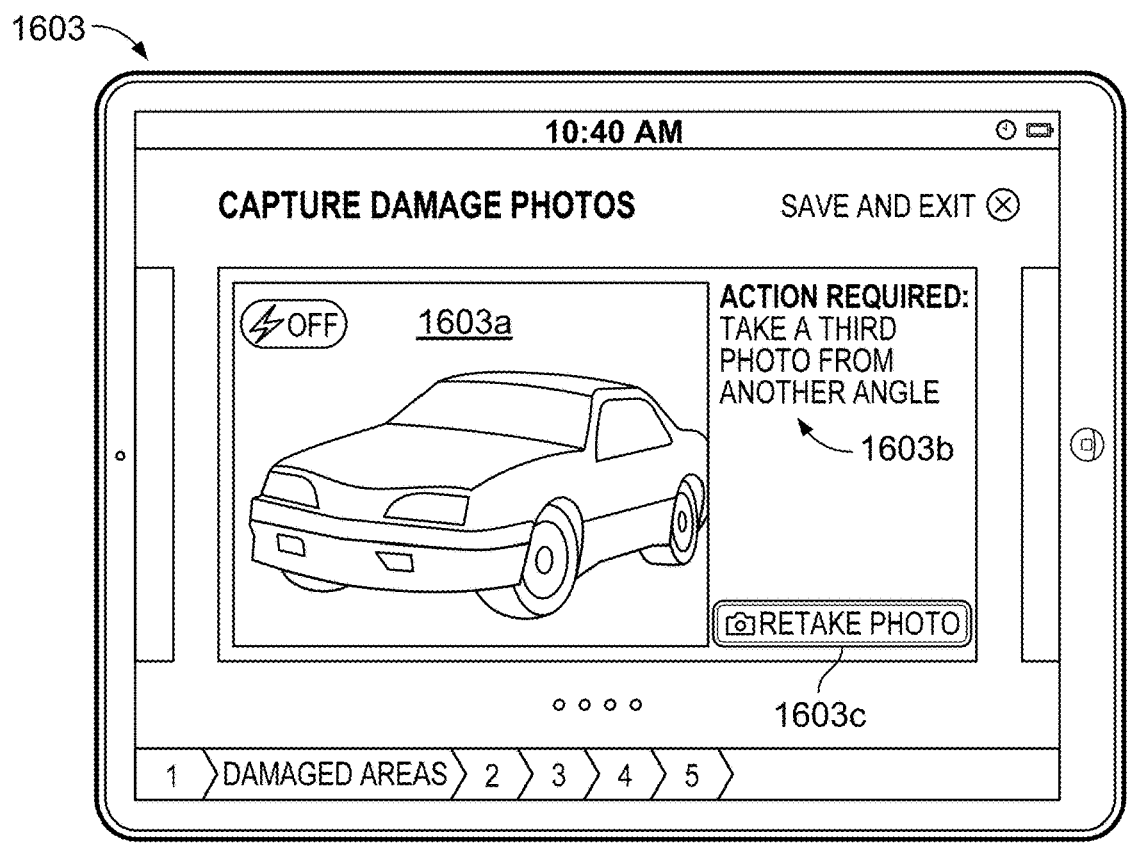
FIG. 16

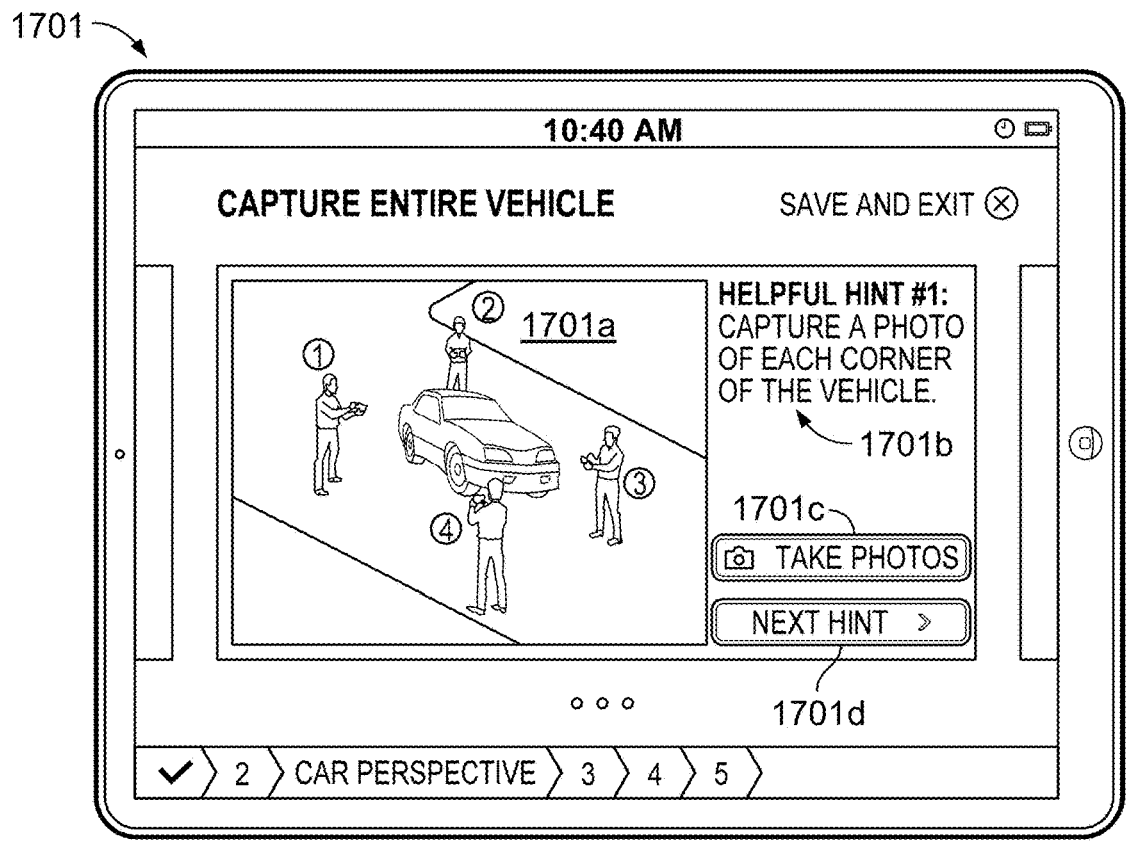
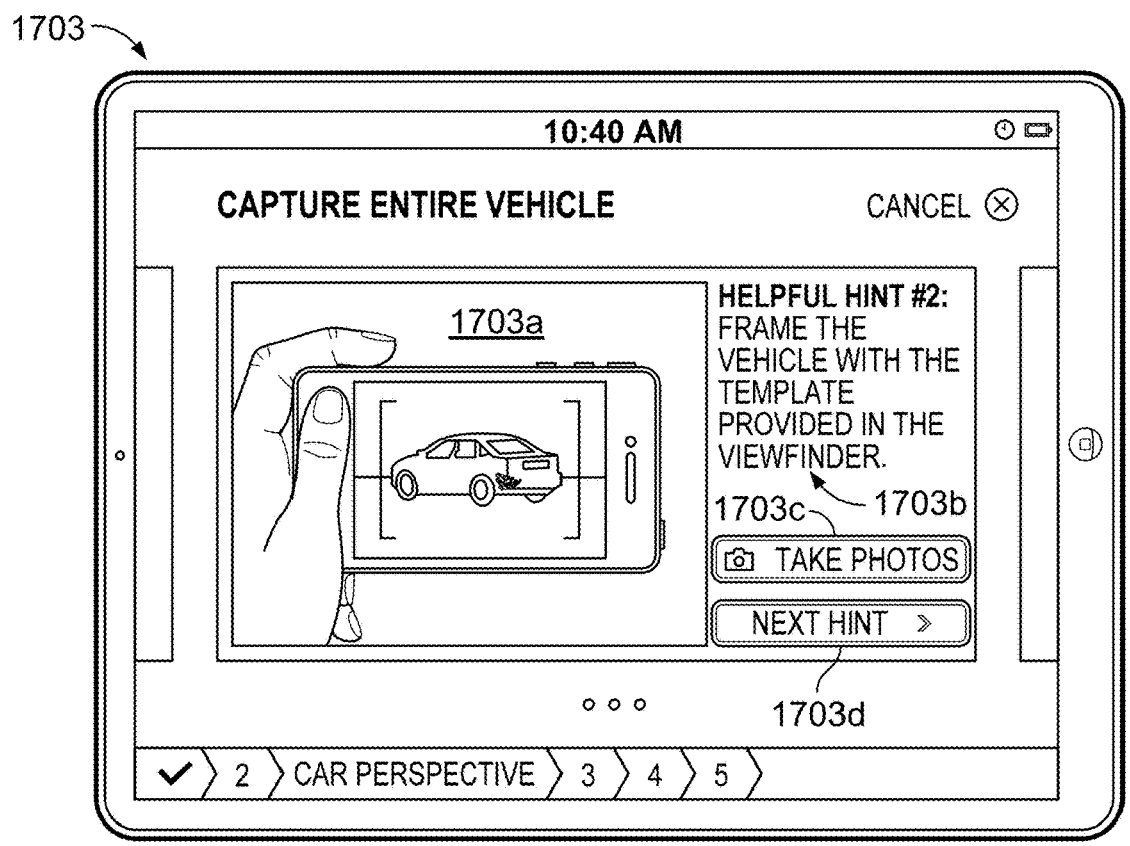
FIG. 17

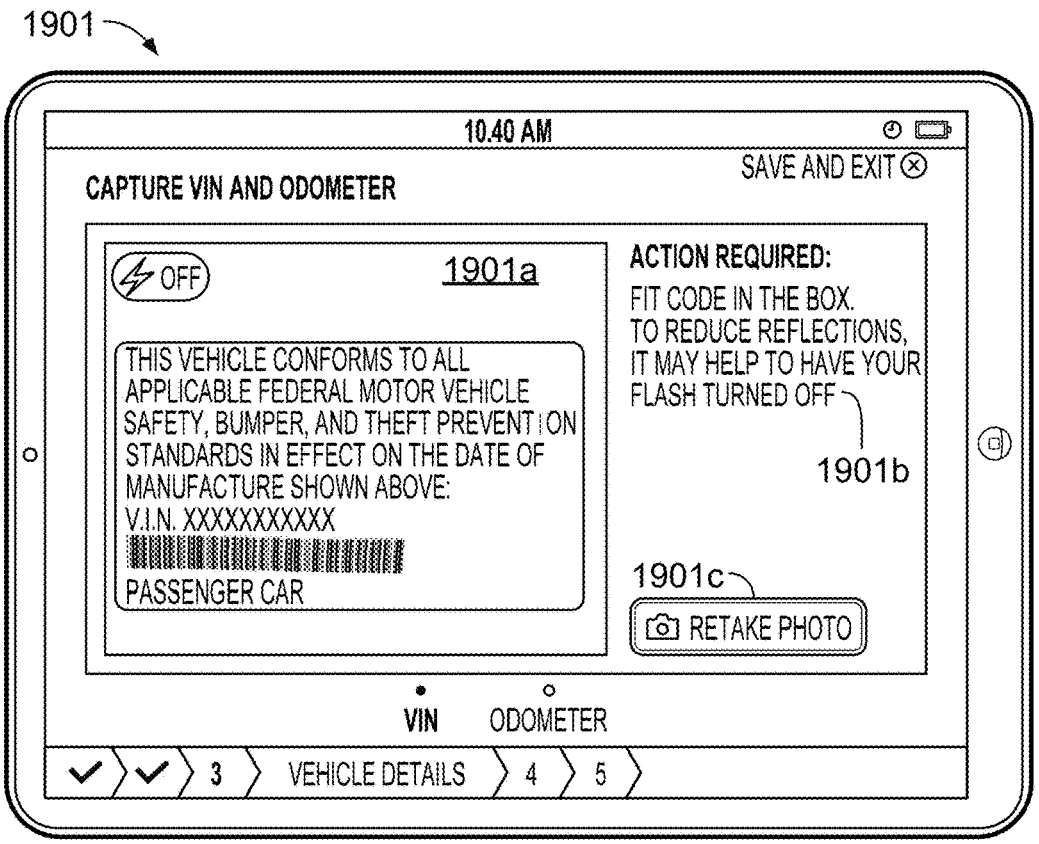
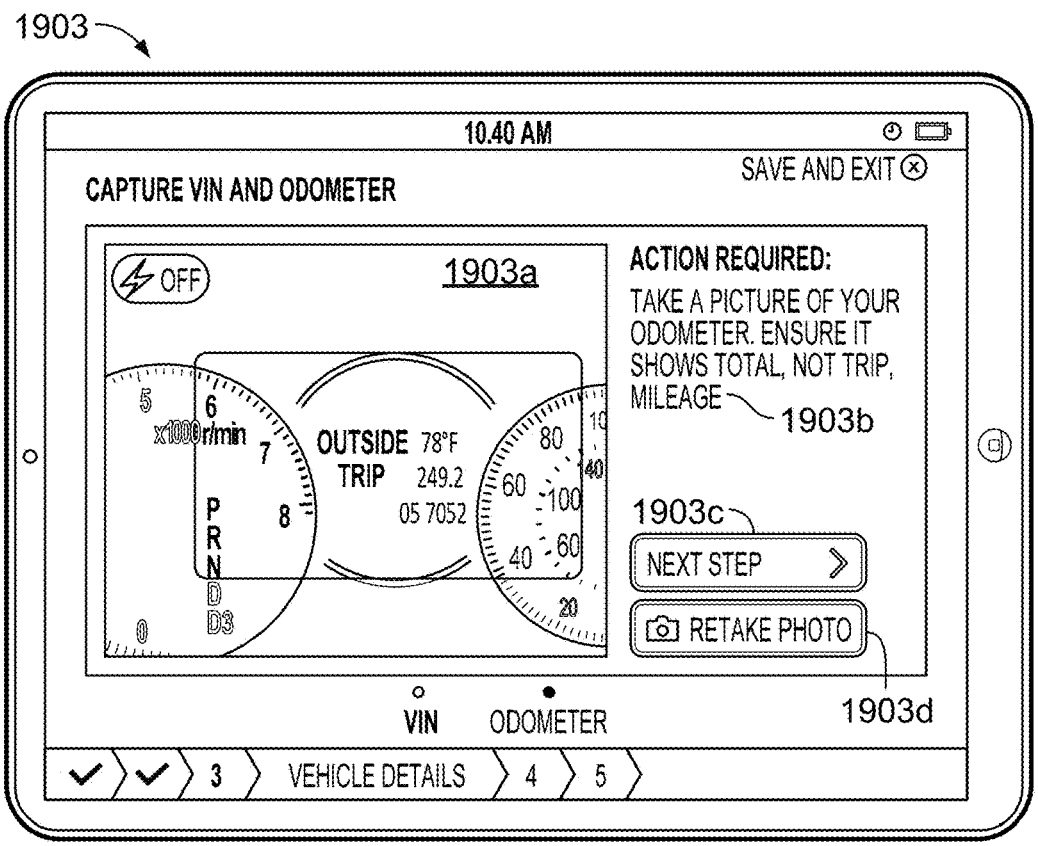
FIG. 19

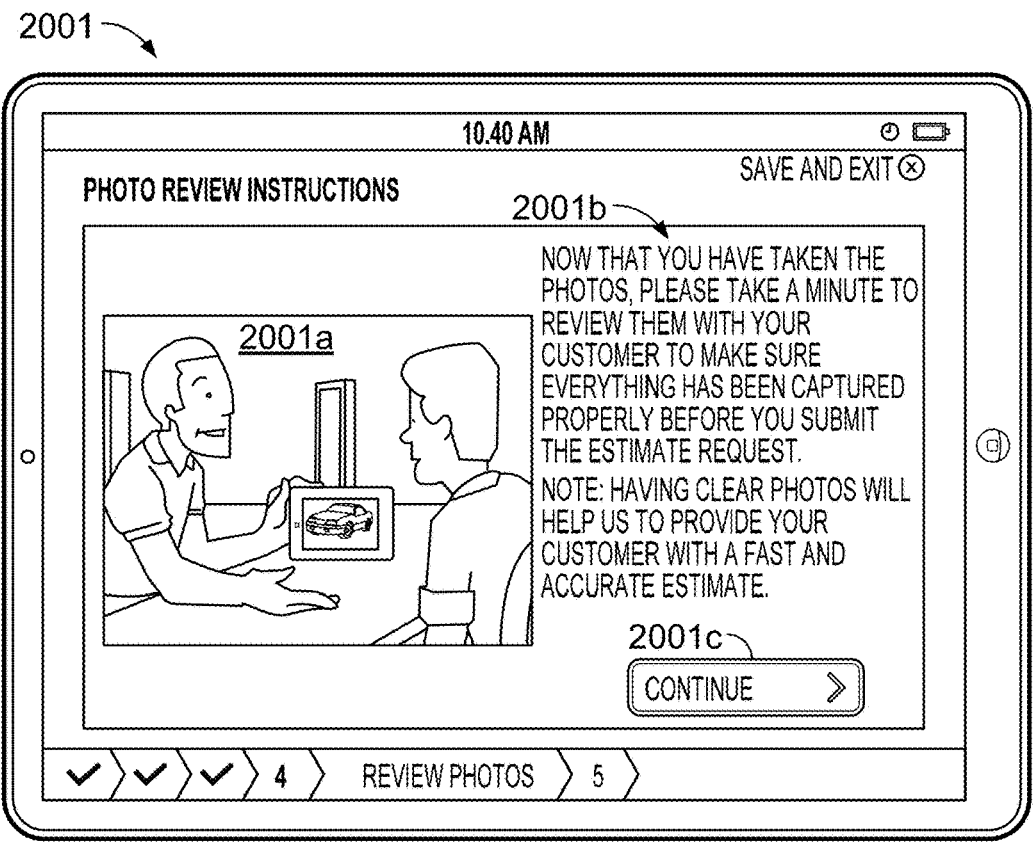
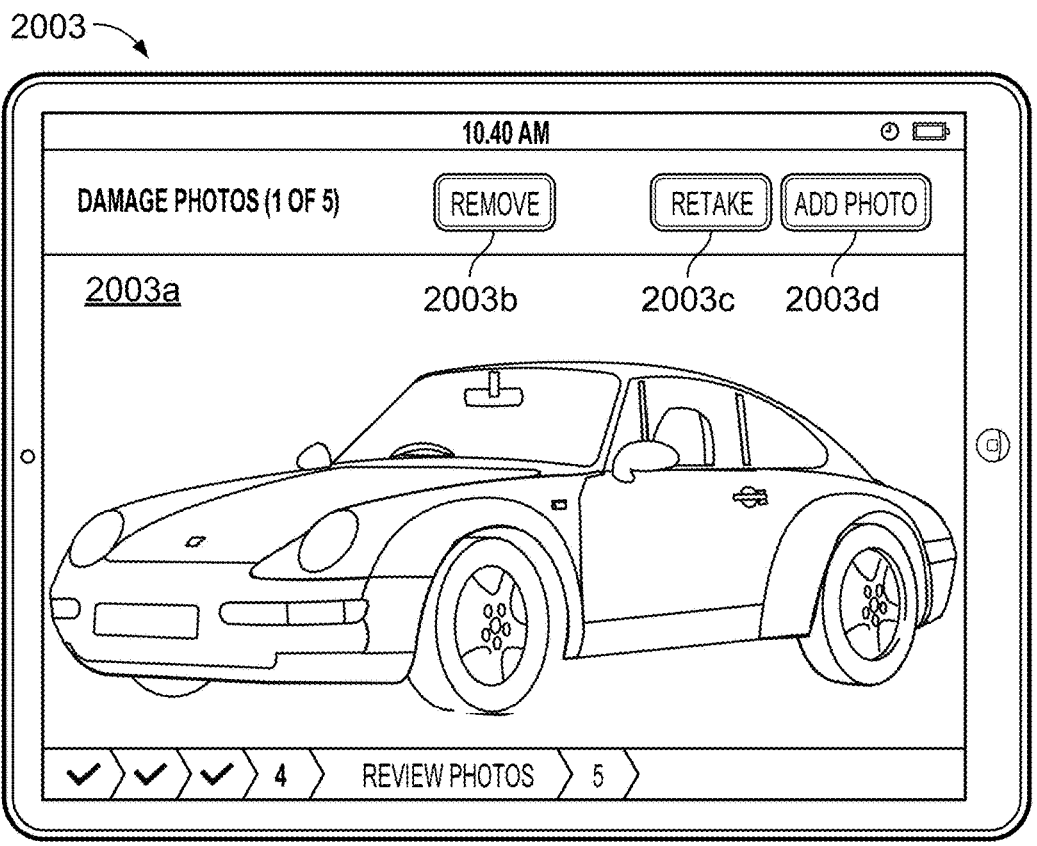
FIG. 20

CLAIM INFORMATION

ENTER CLAIM AND CONTACT INFORMATION

CONTACT INFORMATION
- CUSTOMER: JOHNDOE
- SUBMITTER: ••••••••

CLAIM INFORMATION
- CLAIM NUMBER

POLICY INFORMATION
- POLICY NUMBER

ADDITIONAL DETAILS
TYPE ANY ADDITIONAL COMMENTS ABOUT THE INCIDENT HERE.

[SUBMIT FOR ESTIMATE]

FIG. 21

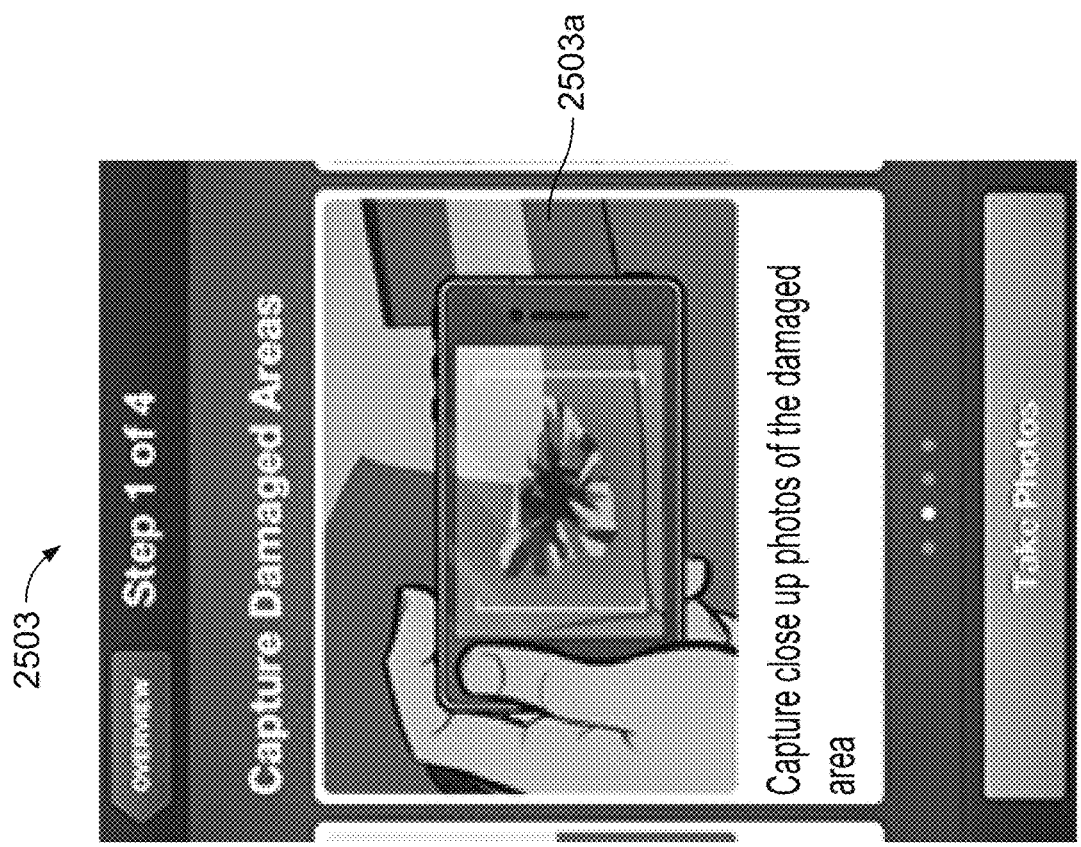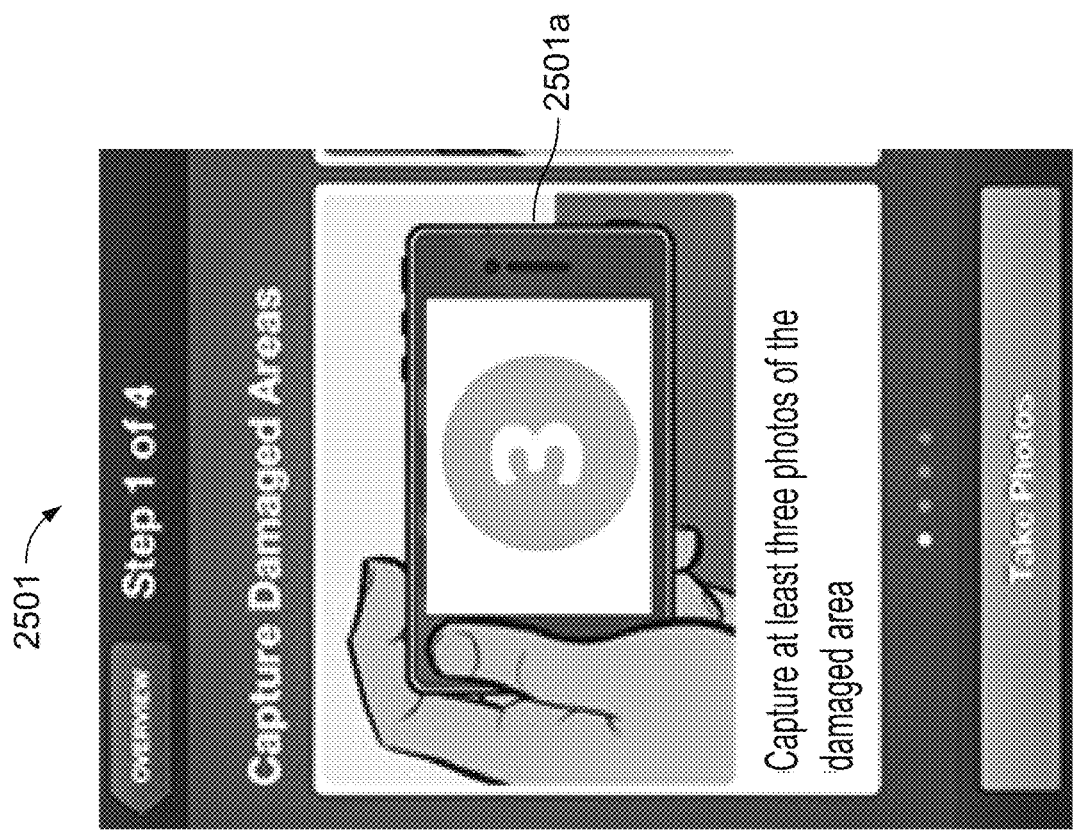
FIG. 25

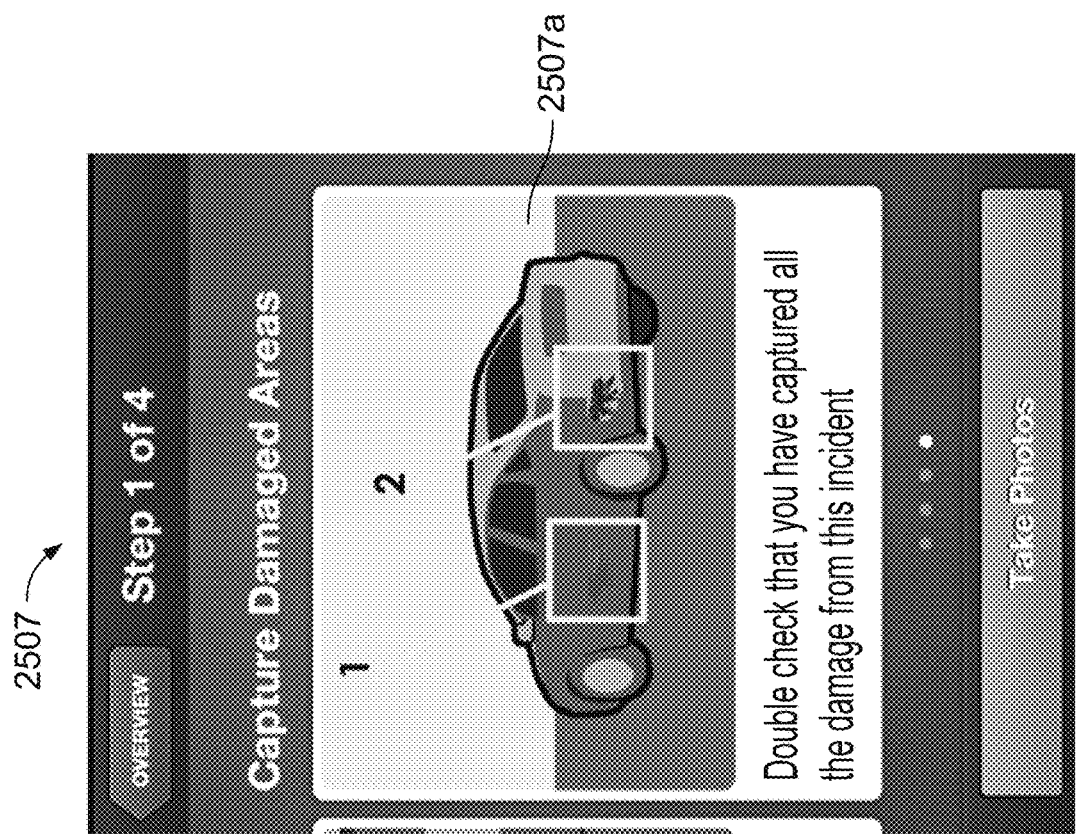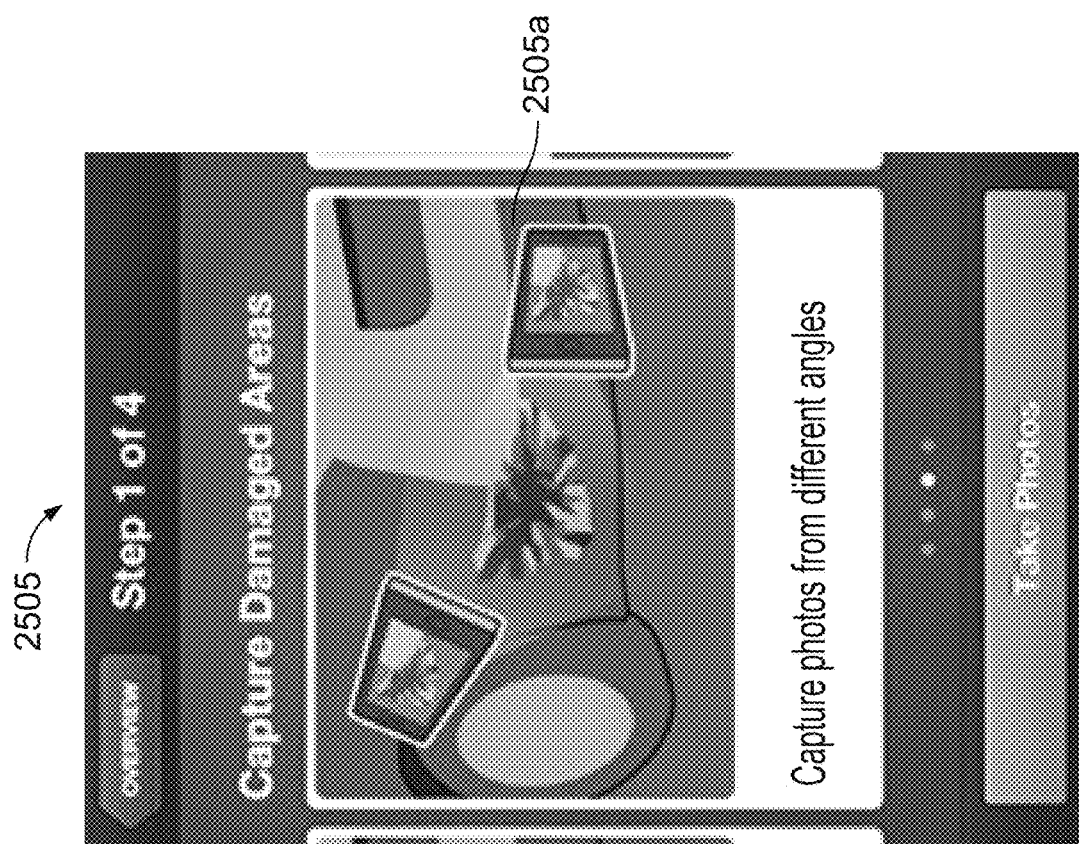
FIG. 25 (continued)

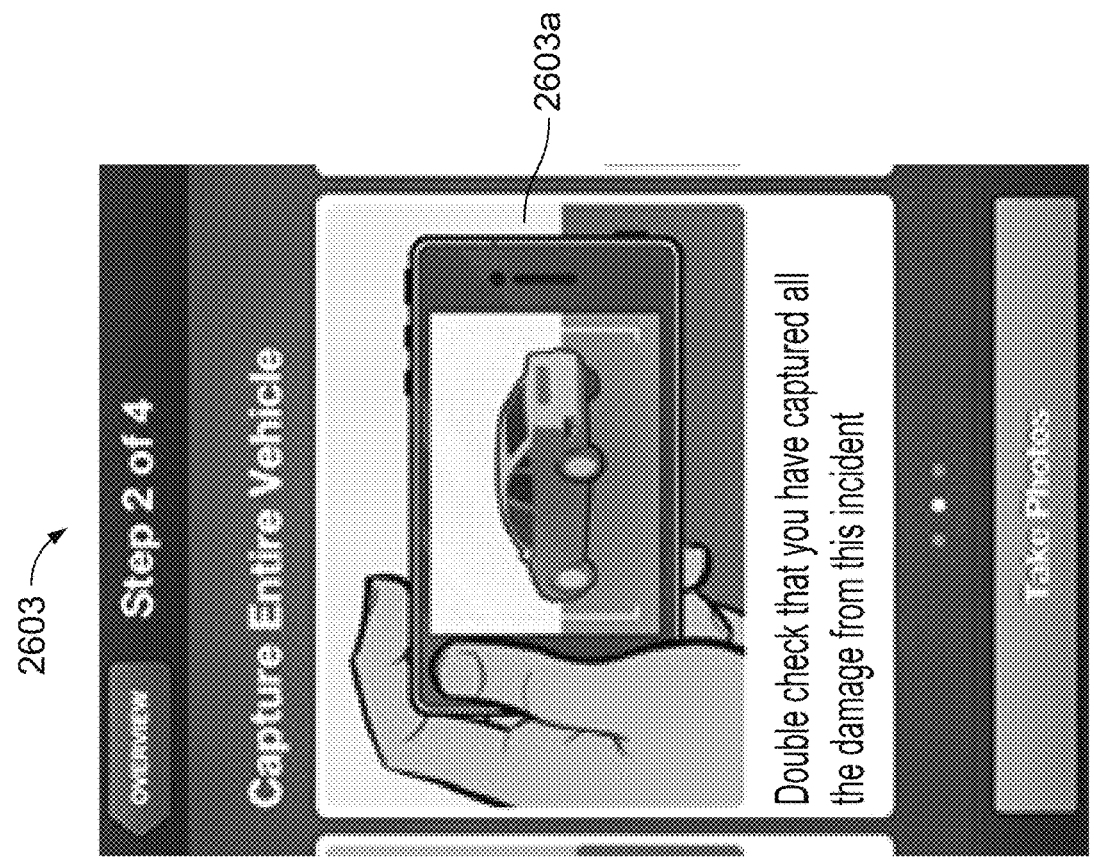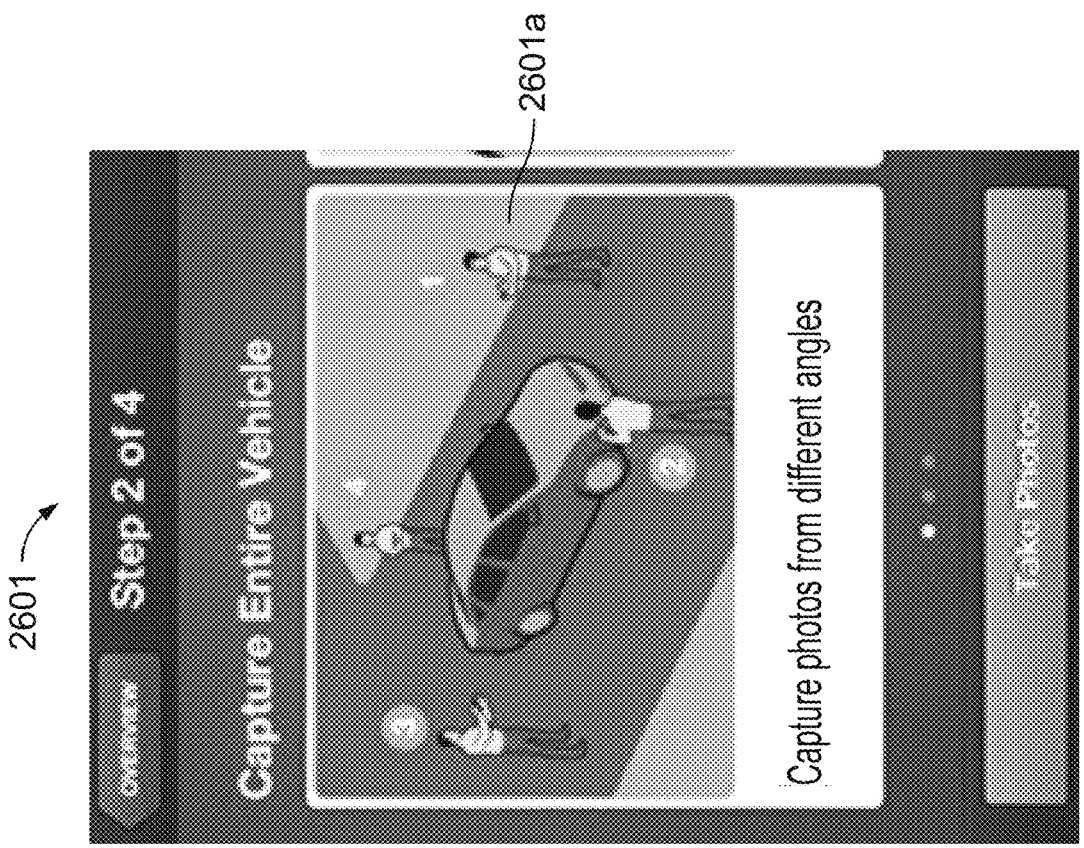
FIG. 26

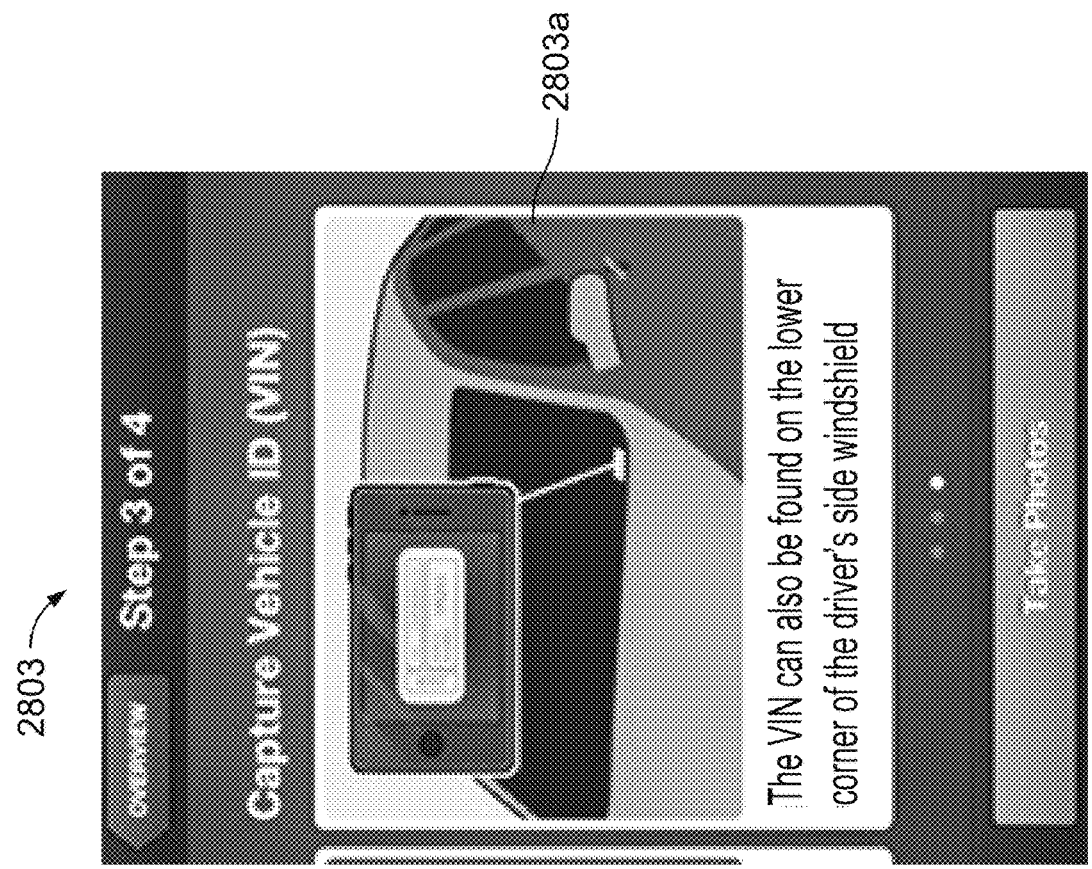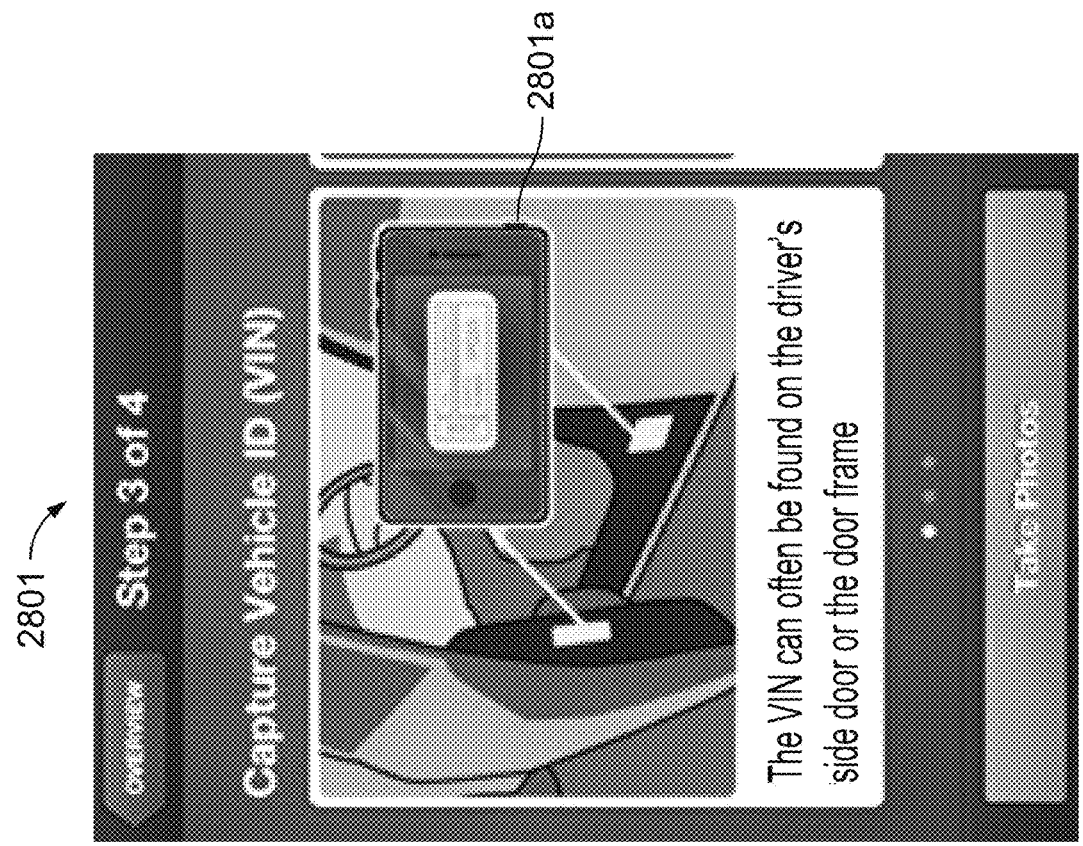
FIG. 28

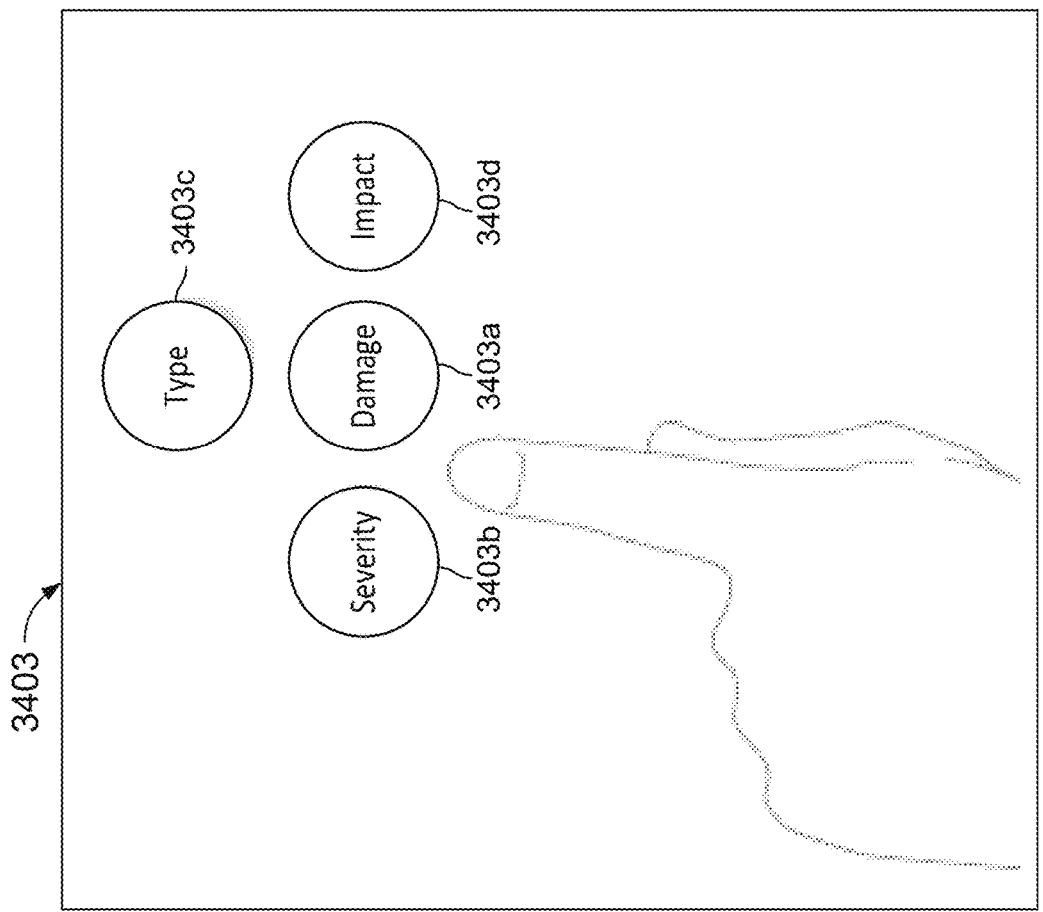
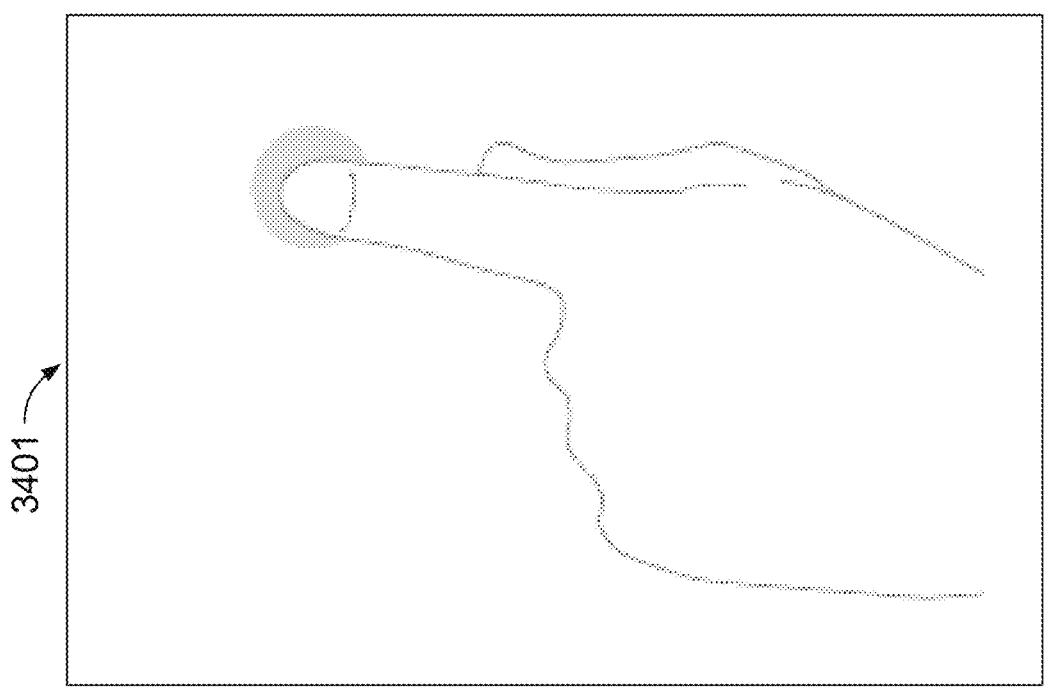
FIG. 34

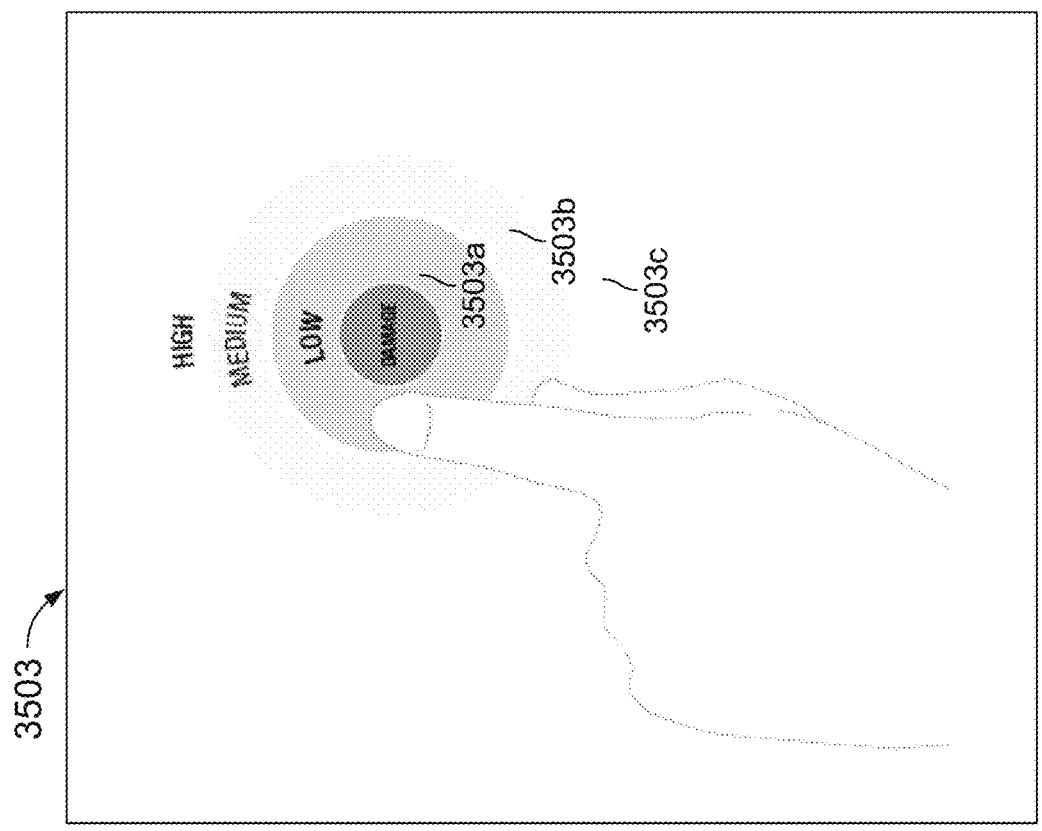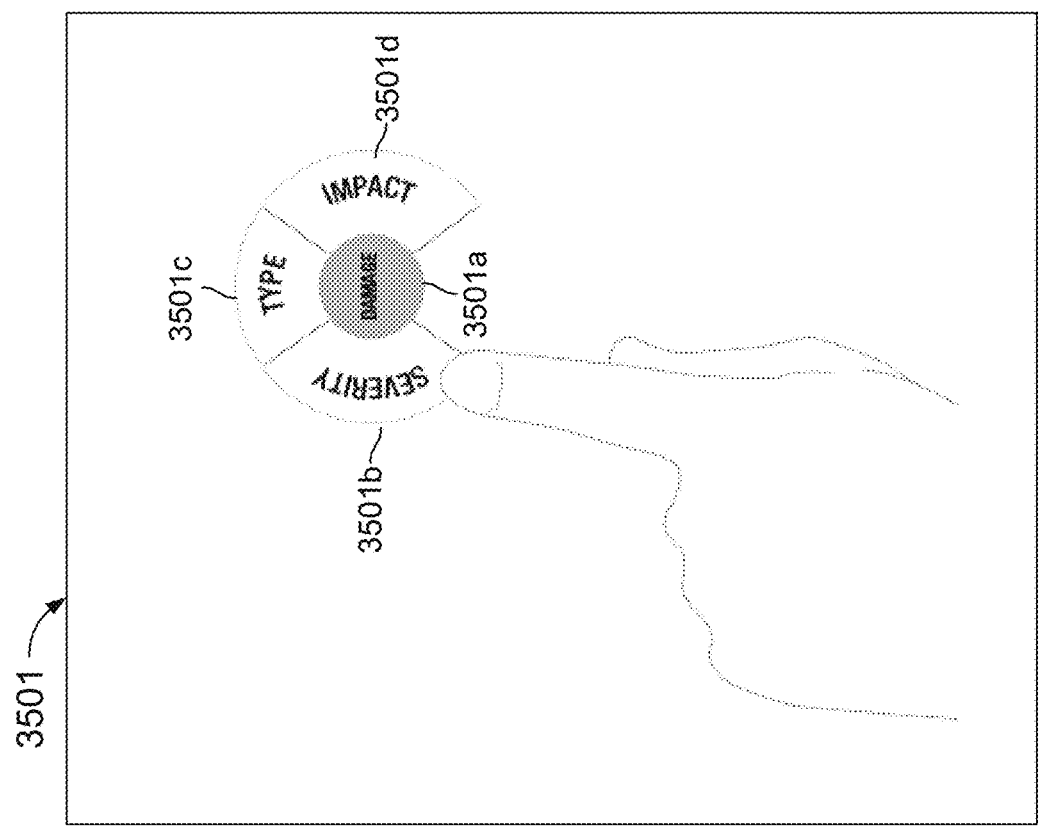
FIG. 35

APPLICATION FACILITATED CLAIMS DAMAGE ESTIMATION

CROSS-REFERENCE TO RELATED-APPLICATIONS

This application is a continuation of U.S. application Ser. No. 14/063,570 filed Oct. 25, 2013, and entitled "Application Facilitated Claims Damage Estimate," which is a continuation-in-part of U.S. application Ser. No. 13/834,161, filed on Mar. 15, 2013, and entitled "Agent-Facilitated Claims Damage Estimation," which is a continuation-in-part of U.S. application Ser. No. 13/587,620 filed on Aug. 16, 2012, and entitled "Feedback Loop in Mobile Damage Assessment and Claims Processing," which issued as U.S. Pat. No. 8,510,196, which is a continuation-in-part of U.S. application Ser. No. 13/834,161 filed Mar. 15, 2013, which is also a continuation-in-part of U.S. application Ser. No. 13/587,630 filed on Aug. 16, 2012, and entitled "User Interactions in Mobile Damage Assessment and Claims Processing." U.S. application Ser. No. 13/834,161 is also a continuation-in-part of U.S. application Ser. No. 13/587,635 filed on Aug. 16, 2012, and entitled "Processing Insured Items Holistically With Mobile Damage Assessment and Claims Processing," which issued as U.S. Pat. No. 10,430,885 All four of these priority applications are herein incorporated by reference in their entirety. This application is related to U.S. application Ser. No. 13/834,170, filed on Mar. 15, 2013, entitled "Pre-Claim Consultations," U.S. application Ser. No. 13/834,193, filed on Mar. 15, 2013, entitled "Third Party Pre-Claim Consultations," and U.S. application Ser. No. 13/834,210, filed on Mar. 15, 2013, entitled "User Devices In Claims Damage Estimation," which are herein incorporated by reference in their entirety. This application is also related to U.S. application Ser. No. 14/063,533, entitled "Claims Processing Using Enhanced Annotation" and U.S. application Ser. No. 14/063,517, entitled "Claims Damage Estimation Using Enhanced Display," and are herein incorporated by reference in their entirety.

TECHNICAL FIELD

The present disclosure relates to systems and methods for analyzing damage to an item for insurance purposes.

BACKGROUND

Conventional insurance claims processing is a complex process that starts with a first notification of loss related to an insured item. Upon notification of loss, the claim may be routed to multiple claims adjusters that analyze different aspects of the damage associated with the insured item in order to determine whether compensation for the loss is appropriate.

In general, conventional claims adjustment can involve paperwork processing, telephone calls, and potentially face-to-face meetings between claimant and adjuster. In addition, a significant amount of time can elapse between a first notice of loss from the claimant and the final settlement of the claim.

In addition, while consumers may take advantage of conventional claims processing to determine if they will receive any compensation for loss associated with an item, consumers have traditionally had very few options for obtaining advice associated with loss prior to submission of an insurance claim. Moreover, traditional claims processing often requires multiple actors sharing numerous documents. Accordingly, there may be a need for efficient claims processing to better serve customers.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the disclosure involve a streamlined and efficient process for claims management and disclose methods, computer-readable media, and apparatuses for automating the processing and settling of claims related to an insured item. A mobile device may transmit data (e.g., images, video, etc.) related to damage associated with an insured item to an enhanced claims processing server. The enhanced claims processing server may manage analysis of damage associated with the insured item and settlement of a claim related to the damage.

In another aspect of the disclosure, an application stored on the mobile device may used to capture the data related to the damage. Once the mobile device transmits the captured data, for instance as a part of a claim submission, one or more portions of the application used to capture the data may be locked.

In another aspect of the disclosure, the enhanced claims processing server may send one or more messages to the mobile device that instruct a user to capture additional data related to the damage. One or more portions of the application used to capture data may be unlocked such that the user may capture additional data in accordance with the instructions.

Aspects of the disclosure also involve receiving data about an insured item, such as photos of a vehicle, and annotating the received data. In an embodiment, damage annotations may be added to received photos that indicate, for example, a type and a severity for damage displayed in the photos. One or more interfaces, such as a filter, may be displayed to a user such that the interfaces adjust the display of the received photos. In an example, a touch screen display may be used to generate one or more annotations.

Aspects of the disclosure also involve receiving data about an insured item, such as photos of a vehicle, receiving annotations associated with the received data, and determining an estimate based on the received data. In an embodiment, received photos and/or received damage annotations may be used to determine one or more parts of an insured item for repairing or replacing. Based on the determined parts, a cost may be calculated for the estimate.

Further aspects of the disclosure may be provided in a computer-readable medium having computer-executable instructions that, when executed, cause a computer, user terminal, or other apparatus to at least perform one or more of the processes described herein.

BRIEF DESCRIPTION OF THE DRAWINGS

All descriptions are exemplary and explanatory only and are not intended to restrict the disclosure, as claimed. The accompanying drawings, which are incorporated in and constitute a part of this specification, illustrate embodiments of the disclosure and, together with the description, serve to explain the principles of the disclosure. In the drawings:

FIG. 10 shows a flow chart for providing pre-claim consultations with a third party entity in accordance with certain aspects of the present disclosure.

FIG. 13 shows two display screens displayed on a user device that allow a user to capture damage information associated with a new claim and/or access information related to claims that have been previously submitted for claims adjustment, in accordance with certain aspects of the present disclosure.

FIG. 14 shows two display screens displayed on a user device for displaying messages associated with a given claim, in accordance with certain aspects of the present disclosure.

FIG. 15 shows a first set of two display screens displayed on a user device for providing user instructions for capturing images related to damage associated with an insured item, in accordance with certain aspects of the present disclosure.

FIG. 16 shows two display screens that display images of damage being captured by a user device, in accordance with certain aspects of the present disclosure.

FIG. 17 shows a second set of two display screens displayed on a user device for providing user instructions for capturing images related to damage associated with an insured item, in accordance with certain aspects of the present disclosure.

FIG. 19 shows two display screens displayed on a user device for displaying instructions related to capturing images for processing a claim associated with damage of an insured item, in accordance with certain aspects of the present disclosure.

FIG. 20 shows two display screens displayed on a user device for reviewing images depicting damage to an insured item, as captured by an imaging device, in accordance with certain aspects of the present disclosure.

FIG. 21 shows a display screen displayed on a user device for displaying claim information associated with damage to an insured item, in accordance with certain aspects of the present disclosure.

FIG. 25 shows multiple display screens displayed on a user device for providing user instructions for capturing images related to damage associated with an insured item at a first stage, in accordance with certain aspects of the present disclosure.

FIG. 26 shows multiple display screens displayed on a user device for providing user instructions for capturing images related to damage associated with an insured item at a second stage, in accordance with certain aspects of the present disclosure.

FIG. 28 shows multiple display screens displayed on a user device for providing user instructions for capturing images related to damage associated with an insured item at a third stage, in accordance with certain aspects of the present disclosure.

FIG. 35 shows multiple display screens for generating an annotation about damage to an insured item using a drag motion in accordance with certain aspects of the present disclosure.

DETAILED DESCRIPTION

In accordance with various aspects of the disclosure, methods, computer-readable media, and apparatuses are disclosed through which insurance claims may be settled through an enhanced automated process. In certain aspects, when an enhanced claims processing server receives data regarding an insured item (e.g., a vehicle, etc.) from a computing device (e.g., a mobile device), the server processes the data and manages settlement of a claim associated with the insured item.

The automated process may utilize various hardware components (e.g., processors, communication servers, memory devices, sensors, etc.) and related computer algorithms to generate image data related to damage associated with an insured item, determine if the image data conforms to a predetermined set of criteria, analyze the image data to assess loss associated with the insured item, and determine if a payment is appropriate to the claimant as compensation for assessed loss.

Figure 1:
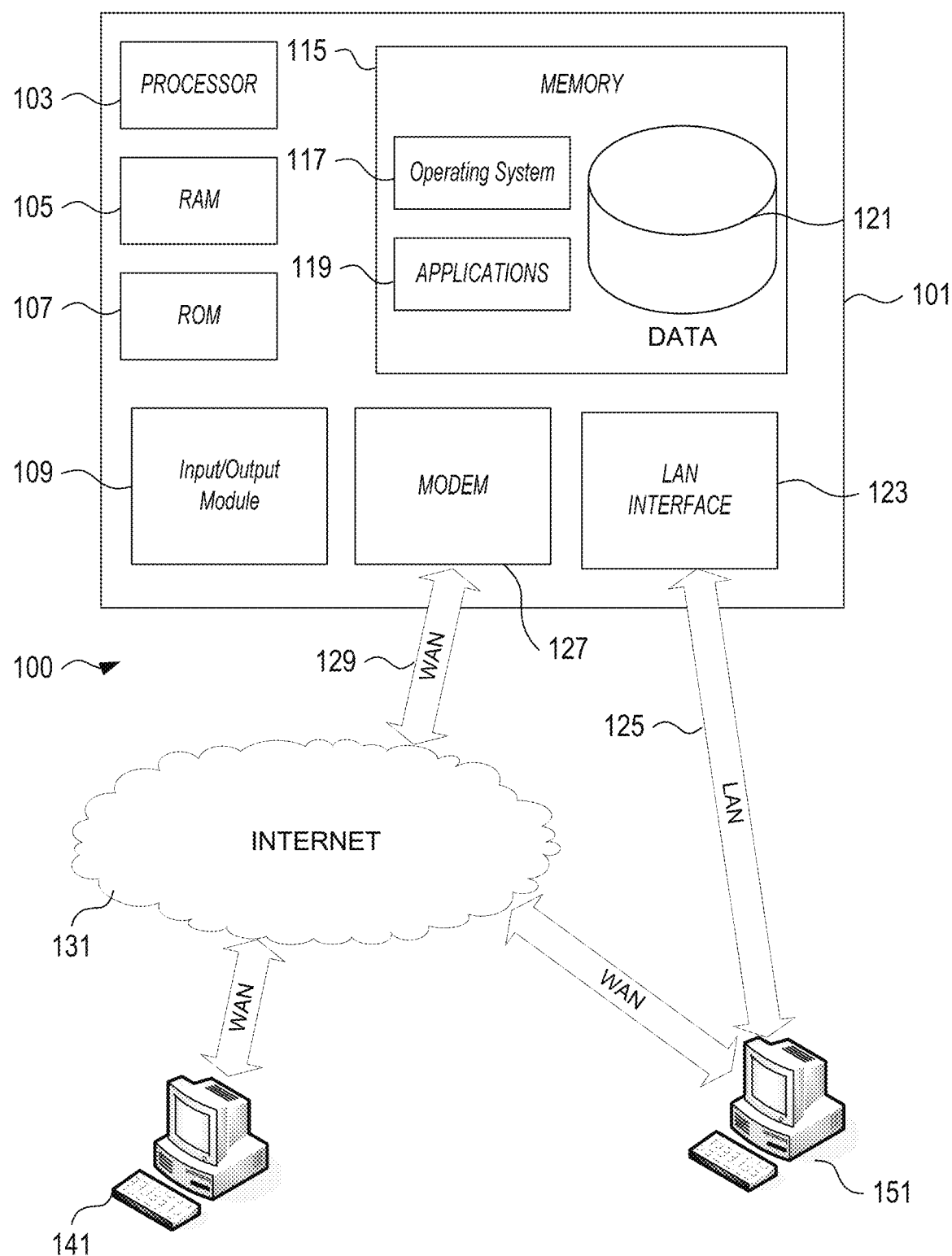
FIG. 1 shows an illustrative operating environment in which various aspects of the disclosure may be implemented.

FIG. 1 illustrates a block diagram of an enhanced claims processing server 101 (e.g., a computer server) in communication system 100 that may be used according to an illustrative embodiment of the disclosure. The server 101 may have a processor 103 for controlling overall operation of the enhanced claims processing server 101 and its associated components, including RAM 105, ROM 107, input/output module 109, and memory 115.

I/O 109 may include a microphone, keypad, touch screen, and/or stylus through which a user of enhanced claims processing server 101 may provide input, and may also include one or more of a speaker for providing audio output and a video display device for providing textual, audiovisual, and/or graphical output. Software may be stored within memory 115 to provide instructions to processor 103 for enabling device 101 to perform various functions. For example, memory 115 may store software used by the device 101, such as an operating system 117, application programs 119, and an associated database 121. Processor 103 and its associated components may allow the device 101 to run a series of computer-readable instructions to analyze image data depicting damage to an insured item (e.g., vehicle, etc.). Processor 103 may determine the general location of damage associated with the vehicle by analyzing images of the vehicle and comparing these images with reference images of a similar vehicle with no damage or with similar damage. In addition, processor 103 may assess the loss associated with the damaged vehicle and transmit terms for settling an insurance claim related to the loss to a user of a mobile device.

The server 101 may operate in a networked environment supporting connections to one or more remote computers, such as terminals 141 and 151. The terminals 141 and 151 may be personal computers or servers that include many or all of the elements described above relative to the server 101. Also, terminal 141 and/or 151 may be data stores for storing image data of insured items that have been analyzed by the enhanced claims processing server 101 in the past. In yet other embodiments, terminals 141 and 151 may represent mobile devices with built-in cameras for capturing image data associated with a damaged item.

The network connections depicted in FIG. 1 include a local area network (LAN) 125 and a wide area network (WAN) 129, but may also include other networks. When used in a LAN networking environment, the server 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the enhanced claims processing server 101 according to an illustrative embodiment of the disclosure may include computer executable instructions for invoking functionality related to calculating an appropriate payment for assessed damage associated with an insured item.

Enhanced claims processing server 101 and/or terminals 141 or 151 may also be mobile terminals including various other components, such as a battery, speaker, camera, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including non-transitory memory storage devices, such as a hard disk, random access memory (RAM), and read only memory (ROM).

Figure 2:
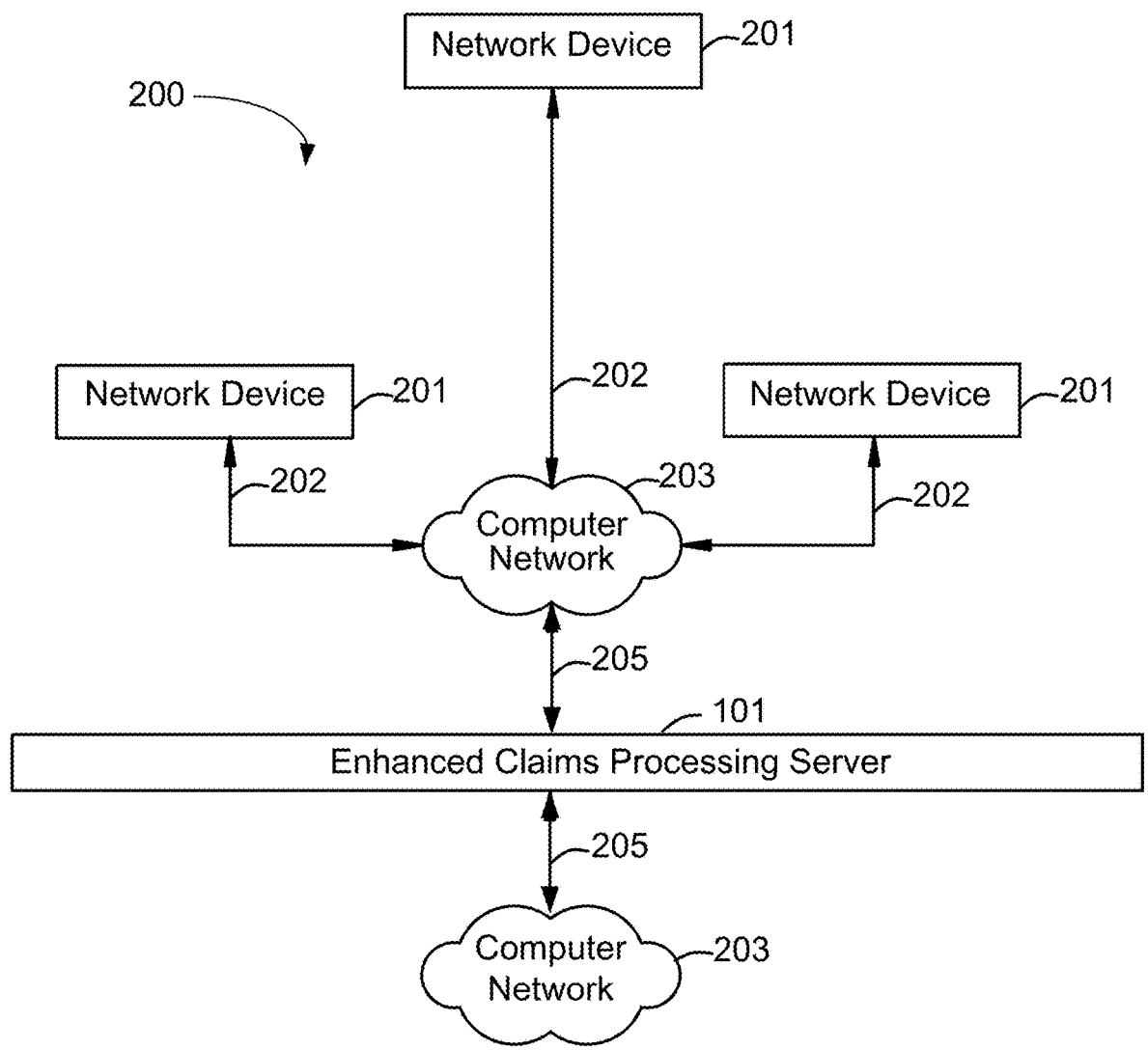
FIG. 2 shows a system of network devices and servers that may be used to implement the processes and functions of certain aspects of the present disclosure.

Referring to FIG. 2, a system 200 for implementing methods according to the present disclosure is shown. As illustrated, system 200 may include one or more network devices 201. Devices 201 may be local or remote, and are connected by one or more communications links 202 to computer network 203 that is linked via communications links 205 to enhanced claims processing server 101. In certain embodiments, network devices 201 may run different algorithms used by server 101 for analyzing image data showing damage associated with an insured item, or, in other embodiments, network devices 201 may be data stores for storing reference image data of insured items. In yet other embodiments, network devices 201 may represent mobile user devices configured to capture image data (e.g., via a camera, etc.) associated with a damaged insured item and to transmit the image data to server 101. In system 200, enhanced claims processing server 101 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between network devices 201 and server 101, such as network links, dial-up links, wireless links, hard-wired links, etc.

The steps that follow in the Figures may be implemented by one or more of the components in FIGS. 1 and 2 and/or other components, including other computing devices.

In accordance with aspects of the disclosure, a user (e.g., a claimant) of a mobile device (e.g., mobile phone, personal digital assistant (PDA), etc.) may take a variety of photos associated with damage to an insured vehicle. The photos may include wide shots of the damaged vehicle, pictures of an identification number associated with the damaged vehicle (e.g., a vehicle identification number (VIN), etc.), current odometer reading, and/or multiple angles/close-up shots of the damage associated with the insured vehicle.

Once the user is satisfied that the appropriate photos have been taken, the user may transmit the photos to an enhanced claims processing server 101. The enhanced claims processing server 101 may be configured to receive and analyze the photos to determine if they meet a predefined set of criteria (e.g., not too blurry, correct angles, etc.) for completeness, accuracy, etc. If the photos do not meet the minimum criteria, server 101 may transmit a message (e.g., via a feedback loop), informing the mobile device that alternative and/or additional photos must be taken. This process of assuring that the photos are compliant for further analysis may be repeated until the user of device 201 has complied with all of the rules set forth by enhanced claims processing server 101. Server 101 may then analyze the photos to generate an output, including a cost estimate to repair the damage associated with the insured vehicle and/or to replace a damaged part of the insured vehicle. In some aspects, to generate this output, server 101 may analyze the photos and determine the location of damage (e.g., exterior parts, etc.), extent of damage, and/or the cost of parts/labor to fix the damage.

In some instances, depending on the amount of damage to the insured vehicle, the cost estimate may represent the cost of replacing the insured vehicle itself. Along with the cost estimate for repair/replacement of the insured vehicle, server 101 may also output various claims documents, including disclosures, brochures, guarantees, etc. If appropriate, server 101 may transmit a payment to the user and/or to an account associated with the user, for the cost of repairing the damage or replacing a part. In addition, server 101 may inform the user approximately how long it will take to repair/replace the insured vehicle.

In some aspects, damage inspection and appraisal in the automated claims processing scheme discussed herein may be completed in thirty minutes or less.

Although embodiments of the disclosure discussed herein relate to an insured vehicle analyzed by enhanced claims processing server 101, one of ordinary skill in the art would recognize that other types of insured items, including homes, may be employed with a similar scheme.

In certain aspects, the use of server 101 may aid in cutting down time between a first notice of loss and settlement of the claim (e.g., real-time settlement of a claim) associated with the loss (e.g., via a payment and/or information regarding repair/replacement of an insured item). In addition, because the methods discussed herein are automated and allow claims adjusters to inspect damages remotely or reduce the involvement of claims adjusters, less time and money may be spent to transport these adjusters to inspection locations. The automated nature of this process may also create the opportunity for remote human inspections of damage associated with insured items.

Also, the technologies used in the claims adjustment processes implemented by server 101 may aid in attracting technology savvy consumers to an entity (e.g., an insurance company) managing server 101.

Figure 3:
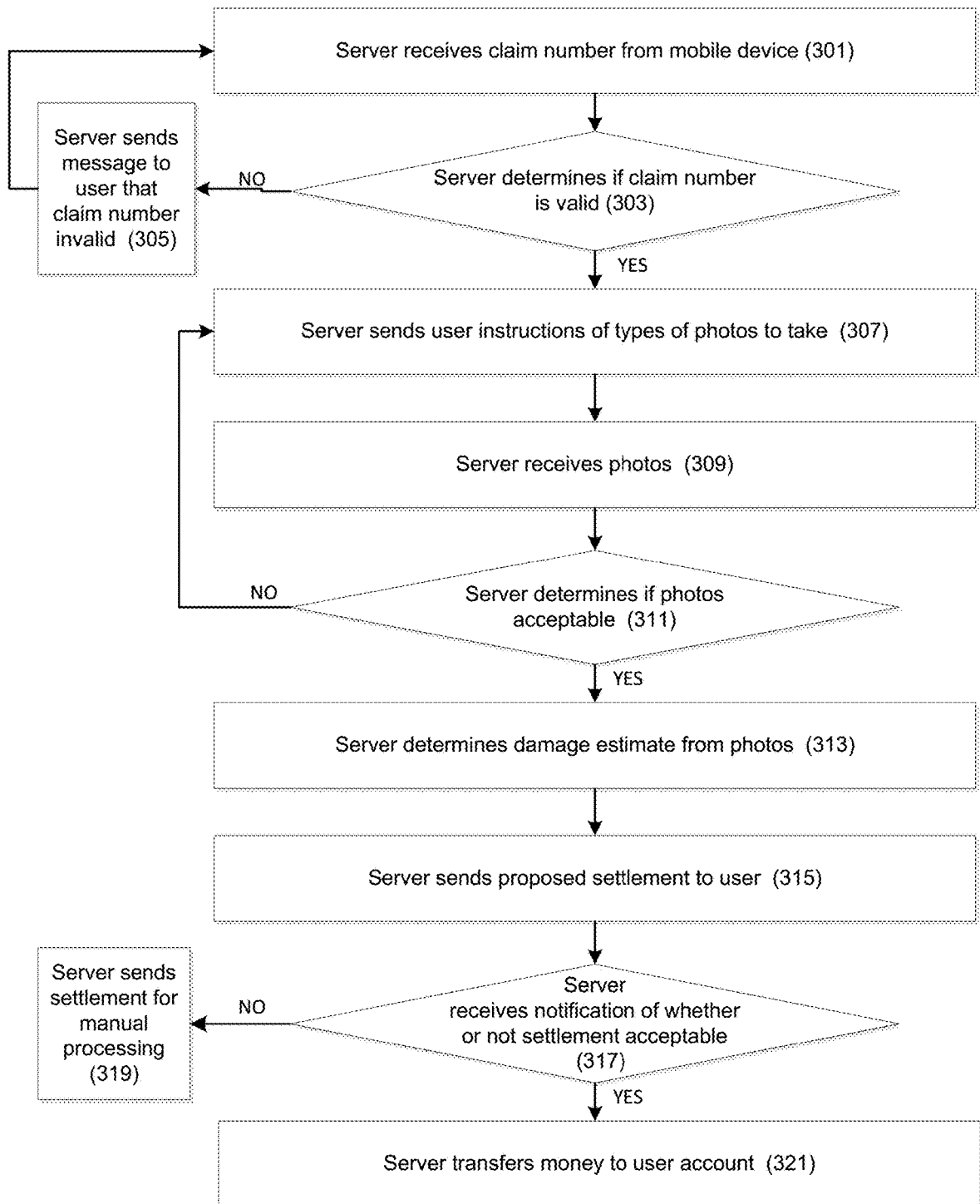
FIG. 3 shows a flow chart for an automated damage assessment process in accordance with certain aspects of the present disclosure.

FIG. 3 shows an automated damage assessment process 300 in accordance with at least one aspect of the present disclosure. In certain aspects, an application related to damage assessment and claims processing may be downloaded onto a mobile device (e.g., iPad™, iPhone™, Android™, etc.) associated with a user (e.g., a customer of an insurance company) to facilitate one or more steps of the process in FIG. 3.

The process of FIG. 3 may start out at step 301 where a user (e.g., a customer) associated with an entity managing enhanced claims processing server 101 (e.g., insurance company) may enter a claim number (e.g., a number related to damage associated with an insured vehicle, etc.) into a damage assessment and claims processing application running on a mobile device (e.g., network device 201). To generate a claim number, a claimant may contact an entity managing enhanced claims processing server 101 (e.g., an insurance company, etc.) with a first notice of loss (FNOL). The claimant may contact the insurance company in any number of ways, including via agent, by phone, by email, via a company website, etc. As part of the FNOL, the claimant may provide basic identifying and/or validating information (e.g., name, age, claim number, etc.) and vehicle information, including the make, model, and year of manufacture. The claimant may also provide the general areas of damage to the vehicle and any other relevant details (e.g., condition of glass, under carriage, engine, wheels, airbags, etc. associated with the vehicle). In one embodiment, this information may be provided from a remote location (e.g., location of an accident, claimant's home, agent's office, etc.) using an application loaded onto a smart phone or tablet (e.g., iPad™, iPhone™, Android™, etc.).

The mobile device may then transmit the entered claim number and related information to enhanced claims processing server 101. The process may then move to step 303 where server 101 may determine if the claim number received in step 301 is valid. If server 101 determines that the claim number is not valid, then server 101 may transmit a message to the mobile device, stating that the claim number is invalid in step 305. The user may then enter another claim number (step 301).

If server 101 determines that the claim number is valid, the process may move to step 307 where server 101 may send the user instructions of the types of image data (e.g., photos, video, etc.) that should be captured of damage associated with the insured vehicle. It should also be noted that in some embodiments server 101 may not receive a claim number and may proceed in providing user instructions on the types of image data that should be captured without receiving a claim number. The user may receive instructions on various types of photos/video, including photos/video of the entire vehicle, VIN door tag, current odometer reading, and/or the damaged areas. In some aspects, the user may capture image data related to at least two different angles of the damage for each panel (e.g., hood, fender, door, bumper, etc.) based on an initial claim description. In some aspects, the instructions may include a notification indicating additional steps that a user may need to perform.

When the user of the mobile device receives these instructions, the user may use a camera associated with the mobile device to take the photos and transmit these photos to the server 101. The user may be allowed to preview each photo before selecting the image. Once a photo has been selected, the image may be shown on a display associated with the mobile device under a photo type (e.g., a photo of the entire vehicle, VIN door tag, current odometer reading, and/or damaged area). If the user is not satisfied with any photo, the user may delete the photo by selecting it and then retake the photo. In some aspects, the user may annotate the photos (e.g., by drawing a line from one end of the dent to the other, etc.) prior to transmitting them to server 101. In yet other embodiments, server 101 may itself annotate any received photos/video.

In some embodiments, any approved photo may not be sent to server 101 until all of the images have been captured. In some aspects, server 101 may support a website interface through which photos may be uploaded by a user of a mobile device. Also, the use of multiple photos (e.g., via stereoscopic techniques), video (e.g., by walking around the vehicle to generate a complete view), and/or three-dimensional photos/video may assist in determining the depth of damage to a vehicle. In some aspects, determining the depth of damage may help in classifying the damage (e.g., a turbulent dent versus a dish dent). In addition, the degree of damage by area and depth may be automatically estimated through tools similar to ultrasound tools. Knowing the depth of damage may also assist in automatically determining the cost of repair or replacement. In addition, as the user is taking video/photos of damage associated with the insured vehicle, a claims adjuster associated with an entity managing server 101 (e.g., an insurance company) may interface with the user in real-time (e.g., via messaging, phone, email, etc.) as the photos are being sent to the adjuster and/or as the video is being streamed to the adjuster and describe to the user the photos/video that still need to be taken and/or where to place a camera as the photos/video are captured.

After server 101 receives image data transmitted from a mobile device in step 309, server 101 (or an individual/group associated with the entity managing server 101) may determine if the photos are acceptable in step 311. For instance, server 101 may determine that the photos are too blurry and/or that the photos do not capture the correct angles to clearly show damage associated with the insured vehicle. As an example, server 101 may employ a bar code scanning mechanism and/or an optical character recognition (OCR) system for detecting the VIN from a submitted photo. In other aspects, the mobile device itself may use a bar code scanning mechanism and/or an OCR system for determining the VIN number. In this example, if the VIN cannot be detected from the photo and/or using these techniques, then the submitted photo may be deemed to be unacceptable. If server 101 determines that that the photos are not acceptable, the process may move back to step 307 where the server 101 may send the user instructions on what types of photos to take and/or what changes need to be made to the previously submitted photos. In yet other embodiments, a dispatcher associated with an entity managing server 101 (e.g., an insurance company) may determine if submitted photos are acceptable. In other embodiments, the mobile device may itself determine if any given photo is blurry and/or inaccurate and prompt the user to retake the photo. In this aspect, the application for damage assessment and claims processing running on the mobile device may have computer-executable instructions stored within a memory of the mobile device for automatically detecting and/or rejecting a photo/video captured within a given category.

If server 101 determines that the photos are acceptable, server 101 may attach the photos to the user's claim in a database associated with server 101. Server 101 may also determine a damage estimate (e.g., an estimate for repairing and/or replacing any damaged parts) after analyzing the photos in step 313 based on predefined rules. The damage estimate may be generated by comparing the photos submitted by the mobile device with photos of similarly damaged vehicles or with photos of non-damaged vehicles of similar make/model. To perform this comparison, server 101 may access a database (e.g., network device 201) of photos of vehicles with various types of damage and/or vehicles with no damage. To initially populate the database with photos for later use, each user may be required to upload various photos of a vehicle upon purchase of the vehicle. Also, as server 101 analyzes recently submitted photos, previously uploaded photos of a given vehicle may be used to determine any pre-existing damage on the vehicle. Once database 201 includes photos/video from many cases of vehicle damage, server 101 may determine a damage estimate for a new case based on the prior cases.

Server 101 may not need to build a new damage estimate piece-by-piece for a given damaged vehicle. In this regard, server 101 (or an individual/group associated with the entity managing server 101) may generate a new damage estimate based on a holistic view of a damaged vehicle. Over time, server 101 may build a database (e.g., network device 201) of specific damage templates (e.g., damages to more than one part of a vehicle that are commonly associated with one another) and estimated/actual costs for repairing damages associated with these templates. Once this database has been built, damage estimates associated with subsequently analyzed vehicles may be generated from a holistic view of the vehicles by accessing information within the historical database.

For instance, if a first type of damage to the front bumper of a vehicle is commonly associated with a second type of damage to the headlights of the same vehicle and this damage template is associated with a predetermined repair cost in the database, server 101 may use this repair cost to generate a new estimate for subsequent vehicles that exhibit damage similar to this damage template.

In one example, the damage estimates retrieved from the historical database may be adjusted based on differences associated with a current case. For instance, the damage estimate may be adjusted based on the average inflation rate (e.g., for parts, labor, etc.) between the date at which the damage estimate within the historical database was generated and the current date. In other embodiments, the damage estimate may be adjusted for small differences such as the make, model, and year of manufacture when the vehicle in the historical database and the currently analyzed vehicle are compared. Similarly, the damage estimate may be adjusted based on differences in the precise damage associated with the vehicle in the historical database and the damage associated with the vehicle currently being analyzed. In yet other examples, the damage estimate may be adjusted based on the terms of an insurance policy that covers damage to the insured vehicle currently being analyzed. One of ordinary skill in the art would understand that any number of factors may be considered when adjusting the damage estimate retrieved for vehicles stored in the historical database to more accurately reflect a damage estimate for a currently analyzed vehicle.

In other aspects, when a vehicle exhibits more than one type of damage, server 101 may access the historical database multiple times (one for each type of damage) and then add one or more interaction terms to the sum of the cost estimates for each type of damage. For instance, extending the example above of damage to a front bumper and to the headlights of a vehicle, server 101 may generate a first damage estimate for repairing the front bumper and a second damage estimate for repairing the headlights. Server 101 may then add these two damage estimates to generate a total damage estimate.

In this embodiment, server 101 may also calculate an interaction term (which may be a positive or a negative value) that represents either an increased (e.g., because the damages taken collectively introduce more complexity and are thus more expensive to repair than if handled individually) or decreased (e.g., because the damages taken collectively have overlapping repair procedures and are thus less expensive to repair than if handled individually) cost of repairing the vehicle when both of these types of damages occur together. The effective total damage estimate may then be the sum of the total damage estimate and the interaction term.

One of ordinary skill in the art would understand that a given damage template may be built based on any number of specific damage types/locations. In addition, server 101 may generate any number of interaction terms for a given analysis. For instance, if a damage estimate is based on damage to three parts of a vehicle, server 101 may generate interaction terms that relate to increased/decreased cost associated with repair to the following part groups: the first two parts, the first and third parts, the second and third parts, and all three parts at once. In other embodiments, server 101 may generate an interaction term for only some of the damaged parts.

In certain aspects, server 101 may also query the claimant with regards to the type of third party service provider (e.g., repair shop, etc.) they would prefer after damage analysis and claims processing is complete.

In other aspects, exterior damage associated with the vehicle may be used to predict (e.g., via predictive modeling using the database of past assessed exterior/interior damage for other similar cases, etc.) the likelihood of interior (e.g., mechanical, cabin, etc.) damage to the vehicle and/or potential difficulties in repairing the vehicle.

Once the image data has been analyzed, server 101 may include computer-executable instructions to recognize the extent of damage to various parts of the vehicle (e.g., chassis, etc.), including various types of dents and edge damage, and to identify various parts of the vehicle.

In some aspects, the detection of damage to the vehicle may be based on object recognition algorithms that compare images (e.g., comparing x, y, and z coordinates of each point on the images) of the vehicle in question to reference images of similar vehicles (e.g., same model, make, year of manufacture, etc.) with no damage. More specifically, server 101 may access a database of images storing the reference images of vehicles of various models and makes. By using object recognition/edge detection algorithms (e.g., involving blur filters, gray-scaling, custom algorithms, etc.), server 101 may determine where damage is located as well as the potential size/area of the damage. Server 101 may also access internal/external databases storing images, damage depth map information (e.g., from previously assessed analyses, etc.), and/or processed claims reports from damaged vehicles that server 101 has assessed previously. In particular, server 101 may access images/depth map information from previously assessed damaged vehicles for use as a guidepost in assessing the damage of a new vehicle. If no reference information (e.g., data, images) exists, axis symmetry information may also be used to identify possible irregularities and/or damage.

In some aspects, the algorithm employed by server 101 may use a comparison of an image of a damaged vehicle with an image of an undamaged version of the same vehicle to "subtract out" and isolate the damaged area of a vehicle. If an exact replica of an undamaged vehicle corresponding to a damaged vehicle under study is not available for this comparison, server 101 may further use various additional image processing algorithms, including blurring filters, etc. to detect a damaged portion of a vehicle.

In additional aspects, server 101 may grayscale all image data to make processing faster. Further, edge filters may be applied to both the image data from the damaged vehicle and its corresponding reference image data so that the edges of a damaged area may be "subtracted out" and identified in the image data of the damaged vehicle. Once the damaged area has been identified in the image data, server 101 may further process the damaged area to sharpen the area, to make the edges more prominent, and to fill any missing links found in the edges. Afterwards, server 101 may color, texture, and/or otherwise "fill in" the damaged area surrounded by the edges and extract the damaged area from the surrounding image data. Once the damaged area has been isolated, server 101 may calculate the precise area of the damage.

Similarly, server 101 may determine the depth of a damaged area (e.g., via stereoscopic methods, etc.) and may analyze raw depth data to further investigate points of interest (e.g., a point that has a much larger depth than surrounding points, etc.). Using this analysis, the damaged area may be further characterized (e.g., a dented area may be detected and if, for example, the general slope of the dent is high, the dent may be characterized as deep and rounded whereas if the slope is low, the dent may be characterized as shallow.)

In addition, if the server 101 retrieves image data or claims reports associated with a similar or the same previously analyzed vehicle that has similar or the same types of damage (e.g., as a result of a similar accident to a similar vehicle or part, etc.) as a vehicle currently being analyzed, server 101 may use a damage analysis or cost estimate of identifying/repairing the damage or replacing a damaged part of the previously analyzed vehicle to generate a damage analysis/cost estimate for the currently analyzed vehicle. In other words, server 101 may perform one or more database queries to match characteristics of the current analysis with previous analyses. For instance, the queries may seek to match the size, depth, and location of a dent on a current vehicle with a similar dent on a vehicle with a similar chassis configuration, make, model, and year of manufacture. For instance, consider a case where the vehicle in question is a new model that has not been analyzed before by server 101. In this scenario, server 101 may attempt to match the vehicle currently being analyzed with its closest match, which in this case may be a similar model from the previous year with the same chassis configuration (e.g., a twin chassis configuration).

In matching a vehicle currently being analyzed with one that has been previously analyzed, server 101 may assign a confidence factor to the match. Server 101 may assign the highest confidence factor (e.g., a confidence factor of 100%) to a comparison between the exact same types of vehicles (e.g., cars of the same make, model, year of manufacture, etc.) having the exact same type of damage (e.g., a predetermined type of dent, etc.). For instance, a comparison between vehicles with two completely different types of damage would have a confidence factor of 0%. As the similarities between the currently analyzed vehicle and previously analyzed vehicles are reduced, server 101 may assign a lower confidence factor to the comparison. For instance, output drawn from comparisons between vehicles of the same make and model but with different years of manufacture may be associated with a slightly lower confidence factor than 100%. In some aspects, confidence factors may decrease further when vehicles of different models and years of manufacture (e.g., vehicles with different chassis configurations, trim line configurations, etc.) but the same make are compared. In one embodiment, server 101 may assign a threshold confidence factor (e.g., 70%, etc.) below which output generated by a comparison performed by server 101 may not be considered reliable. If the confidence factor associated with a comparison between two vehicles falls below this threshold and there is no reliable comparison within the database, server 101 may then use physical details of the damage (e.g., size, location, area, etc.) to provide output such as a cost estimate for damage repair/replacement and/or the amount of time required for repair/replacement.

Server 101 may also use stored data to determine appropriate vendors for repairing/replacing the vehicle and the amount of time for repair/replacement. The wait time for repair/replacement may depend on various factors, including the size (e.g., area, depth, etc.), classification (e.g., turbulent dent, etc.), and location of the damage.

In addition, server 101 may determine if parts nearby to damaged parts may also need to be blended into the damaged area. In other words, if a part of the vehicle needs to be refinished (e.g., repainted) either because it is being replaced or repaired, parts within a predetermined distance of the repaired/replaced part may need to be blended (e.g., color-matched) to the repaired/replaced part.

In some aspects, server 101 may acquire the knowledge of all previous claims processed by server 101, as well as the knowledge of human adjusters, to accurately process future claims. In this way, server 101 may use machine learning to evolve its cost and/or repair estimation procedure based on past experience.

To estimate the cost and repair/replacement time associated with the damage to the vehicle and to determine whether to suggest that the vehicle be replaced or repaired, server 101 may also consider the extent/severity of the damage (area, depth, location, classification, etc.). For instance, damage to a character line (e.g., edge of a door associated with the vehicle) would be more difficult (e.g., more expensive and/or more time-consuming, etc.) to repair than damage to a more central location on the vehicle. Server 101 may also consider the actual cash value and the salvage value of the vehicle and any relevant local, state, and national laws in this analysis. In some aspects, server 101 may generate a rough cost estimate of repairing the damage just based on the extent of the damage; then server 101 may refine this estimate by analyzing previous cost estimates provided by server 101 and/or actual repair data received from third party service providers (e.g., repair shops, etc.) that have repaired similar vehicles with similar damage. In additional aspects, server 101 may generate a basic cost estimate by taking into account factors such as the number of hours predicted for the repair, the labor rate, and the current market conditions. In this aspect, server 101 may compare this basic cost estimate with the cost of merely replacing the vehicle (e.g., a total loss) or the damaged part within the vehicle and based on the comparison, server 101 may suggest the cheaper option. These estimates may also be transmitted to existing platforms (e.g., Audatex®, Mitchell®, etc.) for comparison purposes.

If the analyzed damage to the vehicle is different from the damage indicated by the claimant during the FNOL, server 101 may query the claimant as to the discrepancy. For instance, if the claimant initially provided information relating to damage on the left side of the vehicle but server 101 discovers that the primary damage occurred on the right side, server 101 may question the claimant as to when the damage occurred (e.g., was the damage due to a previous incident or preexisting condition?, is the claimant being truthful?, etc.). Server 101 may also ask the claimant to sign a statement as to the truth of the information provided. The claimant may have the option of answering the questions as they come up or the questions may be queued until the server 101 has finished processing the image analysis of the vehicle. If discrepancies between the claimant's answers and the analyzed damage to the vehicle continue to exist, server 101 may request the involvement of a human claims adjuster.

In other embodiments, a technician associated with an entity managing server 101 (e.g., an insurance company) may analyze the photos to determine a damage estimate. Also, in certain aspects, the process discussed herein may allow a user to upload photos/video that fall into alternative and/or additional categories (e.g., photos for each vehicle part, etc.).

As part of the image/video damage analysis, server 101 may ask the user to compare damage associated with the insured vehicle to damage depicted in a series of photos/video sent by server 101. In other embodiments, server 101 may request that the user classify the type of damage associated with the insured vehicle. For instance, server 101 may ask the user questions such as, "Does the damage to your vehicle look more like the damage shown in photo A or photo B?" Server 101 may ask any number of questions until server 101 has reached a clear understanding of all the damage to the insured vehicle and a damage estimate can be calculated. In some ways, this process may allow the user to estimate the damage to the insured vehicle.

As an example, consider a scenario where a driver's side door is dented and the driver's side window is cracked in a four-door sedan. Assume that the damage is centrally located on the driver's side window and door. Once server 101 receives a valid claim number related to this damaged sedan, server 101 may transmit, to a user device, one or more images depicting various types of damage to the driver's side window and door of four-door sedans that have been previously analyzed and/or stored in memory. The first image or images transmitted to the user device may be based on previously submitted information regarding an accident that caused the damage or any other type of input provided by a claimant and/or related parties. Thus, the first image or images transmitted to the user device may not depict damage that precisely conforms to the damage of the sedan currently being analyzed. For instance, if two images are initially transmitted to the user device, one of the images may depict damage to the corner of the driver's side window and door and the other image may depict damage that is located closer to the center. In this scenario, a user of the user device (e.g., a mobile phone), upon analyzing the two images, may select the image that depicts the centrally-located damage. The mobile device may then transmit the selection to server 101, and server 101 may use this information to generate a damage estimate.

Alternatively, suppose that both images initially transmitted from server 101 depict damage to the corner of the driver's side door and window in a four-door sedan. In this scenario, if both images are equally unrepresentative of the damage to the sedan in question, the user may transmit a message to server 101, stating how the reference images are equally unrepresentative. In response to this message, server 101 may transmit another image or images responsive to the information provided by the user in the message. Once again, the user may select one or more images that most closely depict damage to the sedan in question. Suppose that, on the second pass, server 101 again transmits two images and that, in this instance, both images depict damage to four-door sedans with centrally-located damage to the driver's side door and window. However, suppose that one of the images does not depict damage that is as severe as that exhibited by the sedan in question. In this scenario, the user may choose the image that depicts damage with the severity level consistent with the damage to the sedan in question.

By iterating through multiple rounds of image analysis and data exchange between server 101 and a user device, server 101 may, with each successive round, determine more precisely the damage associated with the sedan in question. When server 101 determines that the damage to the sedan has been fully characterized, server 101 may use the various responses provided by the user device to calculate a damage estimate for the damage to the sedan and transmit a settlement based on the calculated estimate.

In other embodiments, server 101 may transmit an insurance claim to a claims adjuster for manual processing of the claim if server 101 cannot calculate an accurate damage estimate after a predetermined number of question/answer rounds.

In additional embodiments, the user may transmit audio (e.g., by speaking into the mobile device, etc.) and/or an audio file that includes a description of what happened to cause the damage to the vehicle (e.g., the specifics of an accident, etc.). This audio/audio file may be translated into text and incorporated into the photos/video of damage and/or analyzed to determine if the damage matches any narrative description provided by the user. Also, the user may transmit a text file describing damage and/or an accident that caused the damage. In yet other embodiments, the user may capture and transmit the sound of the vehicle being started and/or the sound of the vehicle running to server 101 (e.g., to determine if a muffler associated with the damaged vehicle is broken, etc.).

Based on the analysis and the damage estimate, server 101 may transmit a proposed settlement (e.g., cash compensation, etc.) for the assessed loss to the user of the mobile device in step 315. After the user receives the proposed settlement, the user may notify server 101 whether or not the proposed settlement is acceptable in step 317.

If the settlement terms are not acceptable, then the process may move to step 319 where server 101 may transmit the settlement to a claims adjuster for manual processing. If the settlement terms are acceptable, the process may move to step 321 where server 101 may transfer any funds related to the assessed loss directly to a bank account associated with the user.

In some aspects, users may provide feedback designed to evaluate their experience through process 300. This feedback may be used to improve process 300 for future users and may involve the use of surveys, questionnaires, email, etc.

In other aspects, server 101 may determine and/or transmit supplemental adjustments to an initial damage/repair estimate. For instance, server 101 may determine that there is a 95% chance that repair option A must be performed, a 50% chance that additional repair option B must also be performed, and a 10% chance that additional repair option C must also be performed. When a repair shop examines the damage to a damaged vehicle and notices that there is less/additional damage, server 101 may use this information to revise an initial damage estimate with a supplemental adjustment to the initial estimate. Also, in cases where server 101 predicts that there may be many supplemental adjustments (e.g., above a predetermined threshold number of supplemental adjustments) to the initial estimate of damage, a claims adjuster may manually evaluate the damage and determine the likelihood of each of the supplemental adjustments.

In addition, server 101 may provide the user with a list of repair facilities for repairing the vehicle. Once the vehicle enters the repair process, messages may be pushed to the mobile device of the user to identify where the vehicle is located is in the repair process (e.g., which step of the repair process is the current step, etc.). These messages may identify who is working on the vehicle and/or may include photos/video of the vehicle as it is being repaired. The messages may also identify when the repair process may be completed.

In some aspects, some types of claims may be excluded from the automated process illustrated in FIG. 3. These claims may include comprehensive claims, claims with injuries to any involved parties, claims involving non-drivable vehicles or air bag deployments, claims with loss descriptions that include undercarriage/mechanical damage, claims involving motorcycle and/or recreational vehicle (RV) losses, and claims involving users that already have an estimate for damage associated with an insured vehicle.

Figure 4:
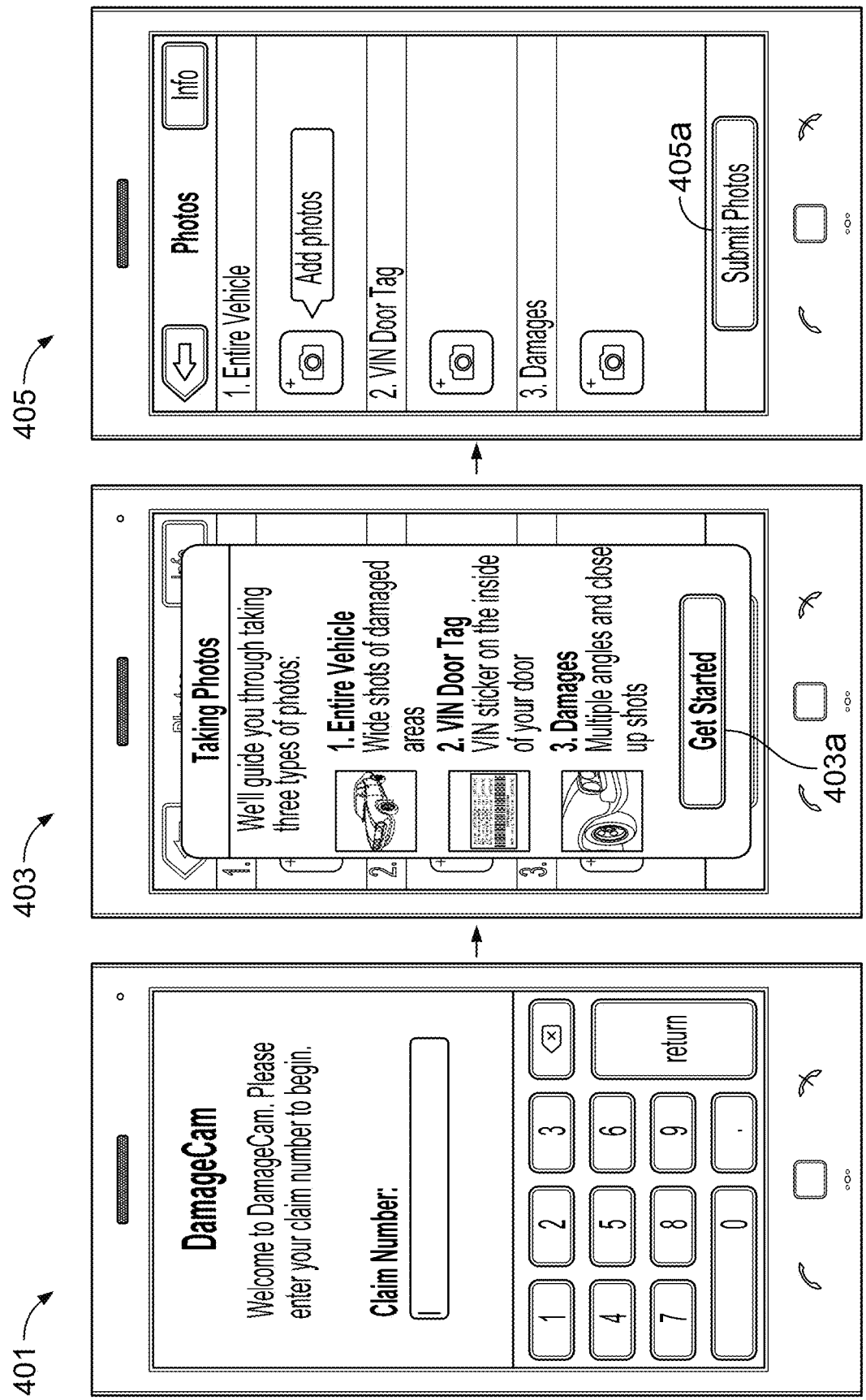
FIG. 4 shows a series of initial display screens displayed when a user starts a damage assessment and claims processing application stored on a mobile device in accordance with certain aspects of the present disclosure.

FIGS. 4-8 show various display screens displayed to a user of a mobile device in accordance with at least one aspect of the present disclosure. FIG. 4 shows a series of initial display screens displayed when a user starts a damage assessment and claims processing application stored on a mobile device (e.g., network device 201) in accordance with at least one aspect of the present disclosure. Screen 401 may be the initial screen that the user views upon starting the application. Screen 401 may allow the user to enter a claim number to begin a damage assessment and claims processing method. In certain aspects, the claim number may be used to compare a damage estimate generated by analysis of photos submitted by the user to a damage estimate generated manually by a claims adjuster using more conventional claims adjustment techniques. Once a user enters a valid claim number, the mobile device may display screen 403, where the user is presented with photo instructions that explain to the user the types of photos that should be taken. Screen 403 may include instructions on taking photos of the entire insured vehicle, VIN door tag, current odometer reading, and any damaged areas of the insured vehicle. When a user presses the "Get Started" button 403a on screen 403, the mobile device may display screen 405, which allows a user to select and start taking any of the types of photos listed in screen 403 (e.g., photos of the entire vehicle, VIN door tag, current odometer reading, and/or damaged areas). The "Submit Photos" button 405a on screen 405 may be inactive until at least one photo of each type is taken by the user.

Figure 5A:
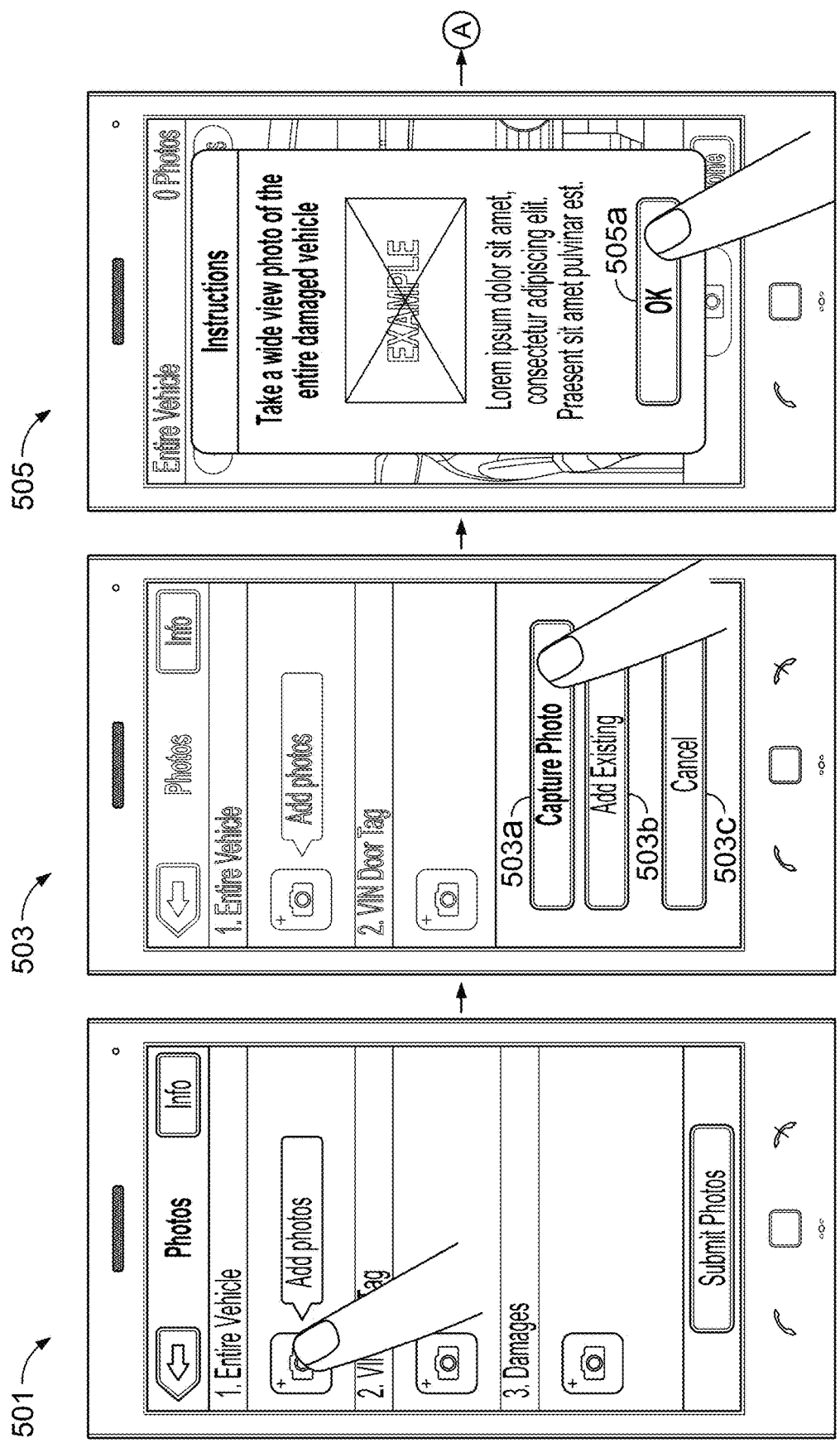
FIG. 5a shows a first series of display screens displayed on a mobile device as a user takes photos of a damaged vehicle in accordance with certain aspects of the present disclosure.
Figure 5A:
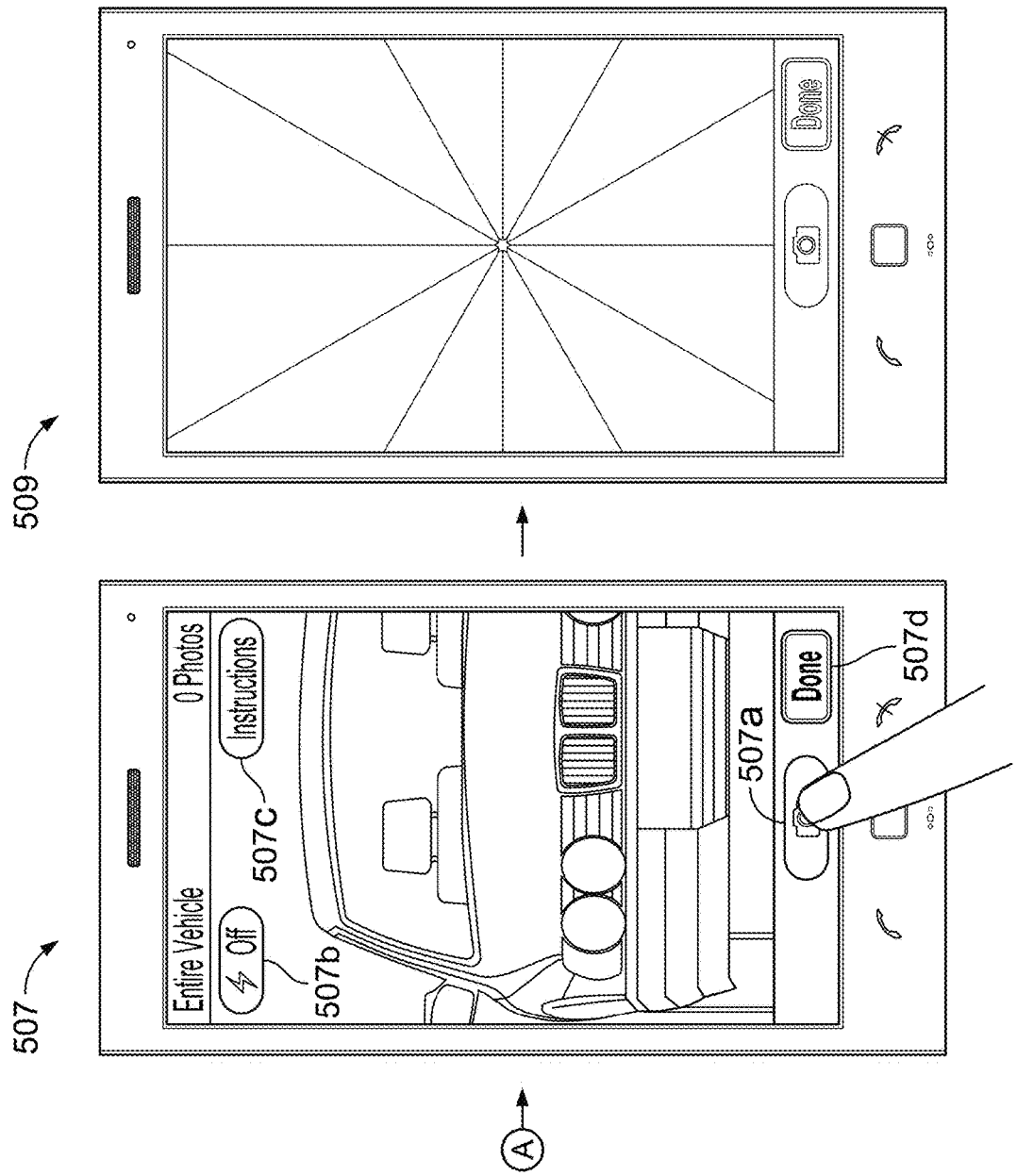

FIG. 5a shows a first series of display screens displayed on a mobile device as a user takes photos of a damaged vehicle in accordance with at least one aspect of the present disclosure. In display screen 501, the user may select to take a photo of the entire vehicle, the VIN door tag, and/or the specific damaged area(s). In the example of FIG. 5a, a user selects to take a photo of the entire vehicle. When a user selects one of the photo categories in screen 501, screen 503 may allow the user to select the "Capture Photo" button 503a to start the camera functionality within the mobile device, the "Adding Existing" button 503b to choose a photo from the photo roll, and/or the "Cancel" button 503c to cancel out of the previous command.

Assuming that the user selects the "Capture Photo" button 503a in screen 503, the mobile device may display screen 505 where instructions related to the current photo type (e.g., a wide view of the entire vehicle) may be overlaid on top of the camera. The user may select the "OK" button 505a on screen 505 to close the overlay and cause display of the camera screen 507. Camera screen 507 may include a camera shutter button 507a (e.g., for taking a photo) and flash button 507b (e.g., for turning the camera flash on/off). The "Instructions" button 507c on screen 507 may open the instructions overlay from screen 505, and the "Done" button 507d on screen 507 may save all photos that have been taken to a memory of the mobile device and may return the user to the main photos screen 501. When the user selects the shutter button 507a in screen 507, the mobile device may display screen 509 to indicate that a photo is being taken. In some aspects, all buttons on screen 509 may be disabled after the user selects the shutter button 507a.

In some aspects, a processor executing program instructions on a mobile device may analyze, in real-time, damage to a vehicle shown in the viewfinder of a camera associated with the mobile device and may provide immediate feedback to a consumer before taking a photo of the damage. For example, the processor may determine that the viewfinder is showing damage to a vehicle and may determine that the entire extent of the damage is not being displayed in the viewfinder (e.g., the extent of a dent in the front fender of a vehicle is only partially displayed). In this scenario, the processor may recommend that a consumer move the camera so that the entire extent of the damage is shown in the viewfinder.

Figure 5B:
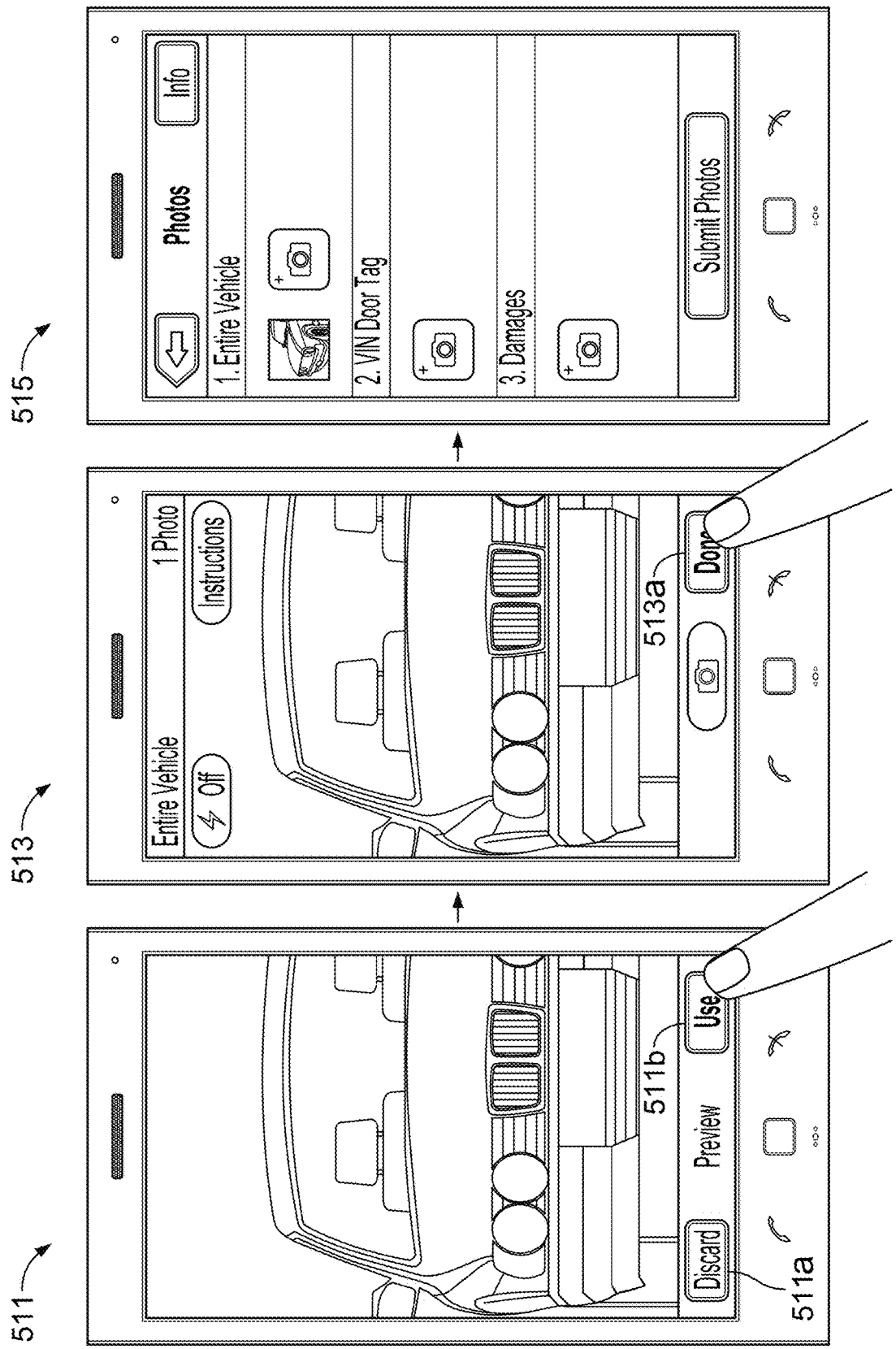
FIG. 5b shows a second series of display screens displayed on a mobile device as a user takes photos of a damaged vehicle in accordance with certain aspects of the present disclosure.

FIG. 5b shows a second series of display screens displayed on a mobile device as a user takes photos of a damaged vehicle in accordance with at least one aspect of the present disclosure. Screen 511 may allow a user to preview a photo that has been taken and take an appropriate action on this photo. In particular, the user may select a "Discard" button 511a to discard the photo or a "Use" button 511b to use the photo for damage assessment and claims processing. Assuming that the user selects "Use" button 511b, the user may proceed to take other photos within the selected photo type. When the user has taken all the photos of a given photo type, the user may select the "Done" button 513a on screen 513. After selecting the "Done" button 513a on screen 513, the mobile device may display screen 515, where thumbnail image(s) of the photo(s) that the user has already taken may be displayed in the corresponding categories.

Figure 6:
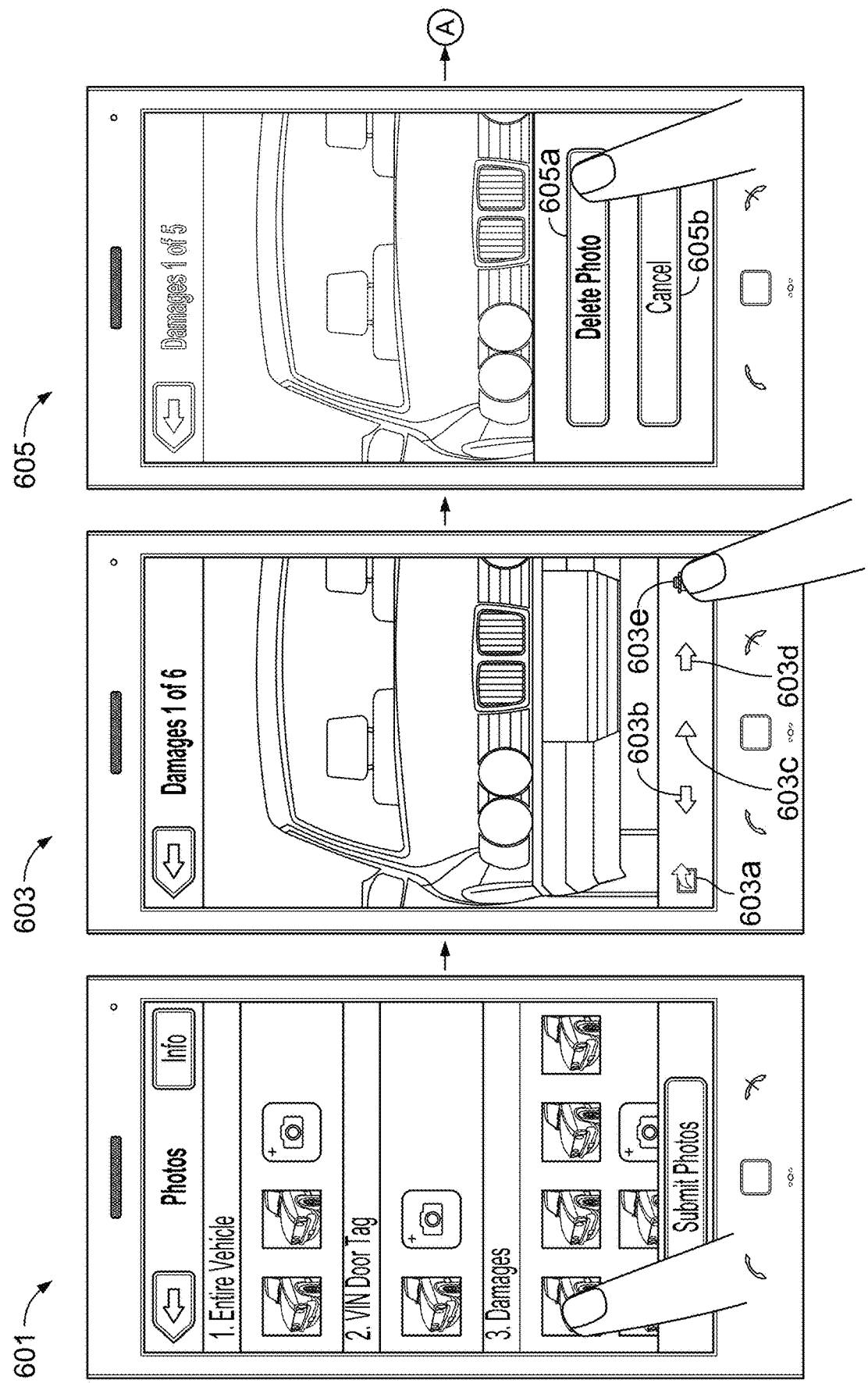
FIG. 6 shows a series of display screens displayed on a mobile device for enabling a user to delete photos that have already been taken in accordance with certain aspects of the present disclosure.
Figure 6:
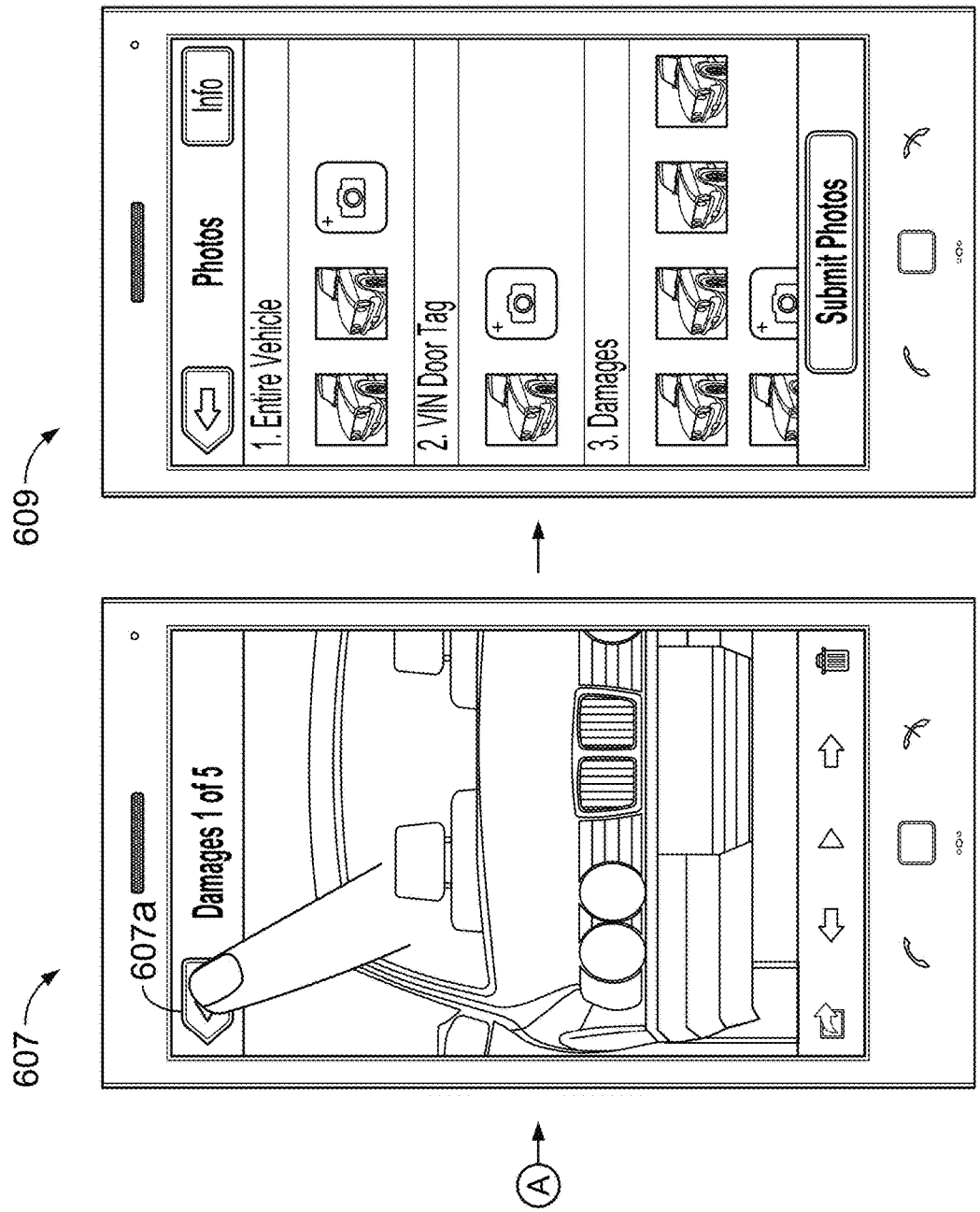

FIG. 6 shows a series of display screens displayed on a mobile device for enabling a user to delete photos that have already been taken in accordance with at least one aspect of the present disclosure. Screen 601 displays thumbnails of all photos that have already been taken. When a user selects one of the thumbnails in screen 601, the mobile device may display screen 603, where a series of buttons may be displayed, including an additional options button 603a for displaying additional options associated with the current photo (e.g., email photo, use photo as wallpaper, etc.), a scroll to previous photo button 603b for scrolling to the previously-viewed photo in the photo reel, a play photo reel button 603c for sequentially displaying each photo in the photo reel, a scroll to next photo button 603d for scrolling to the next photo in the reel, and a delete button 603e for deleting the currently-viewed photo. If the user selects delete button 603e, the photo currently displayed may be queued for deletion and mobile device may display screen 605. Screen 605 includes an action panel with a "Delete Photo" button 605a for confirming that the currently-viewed photo is to be deleted and a "Cancel" button 605b for cancelling deletion of the currently-viewed photo. If the user selects "Delete Photo" button 605a, the currently-viewed photo is deleted and the next photo in the current category is displayed in screen 607. If the user selects a back button 607a on screen 607, the user may back out to return to photos screen 609. Screen 609 may display the remaining thumbnails stored in a memory of the mobile device, with the image that the user deleted in screen 605 removed from the list of thumbnails.

Figure 7:
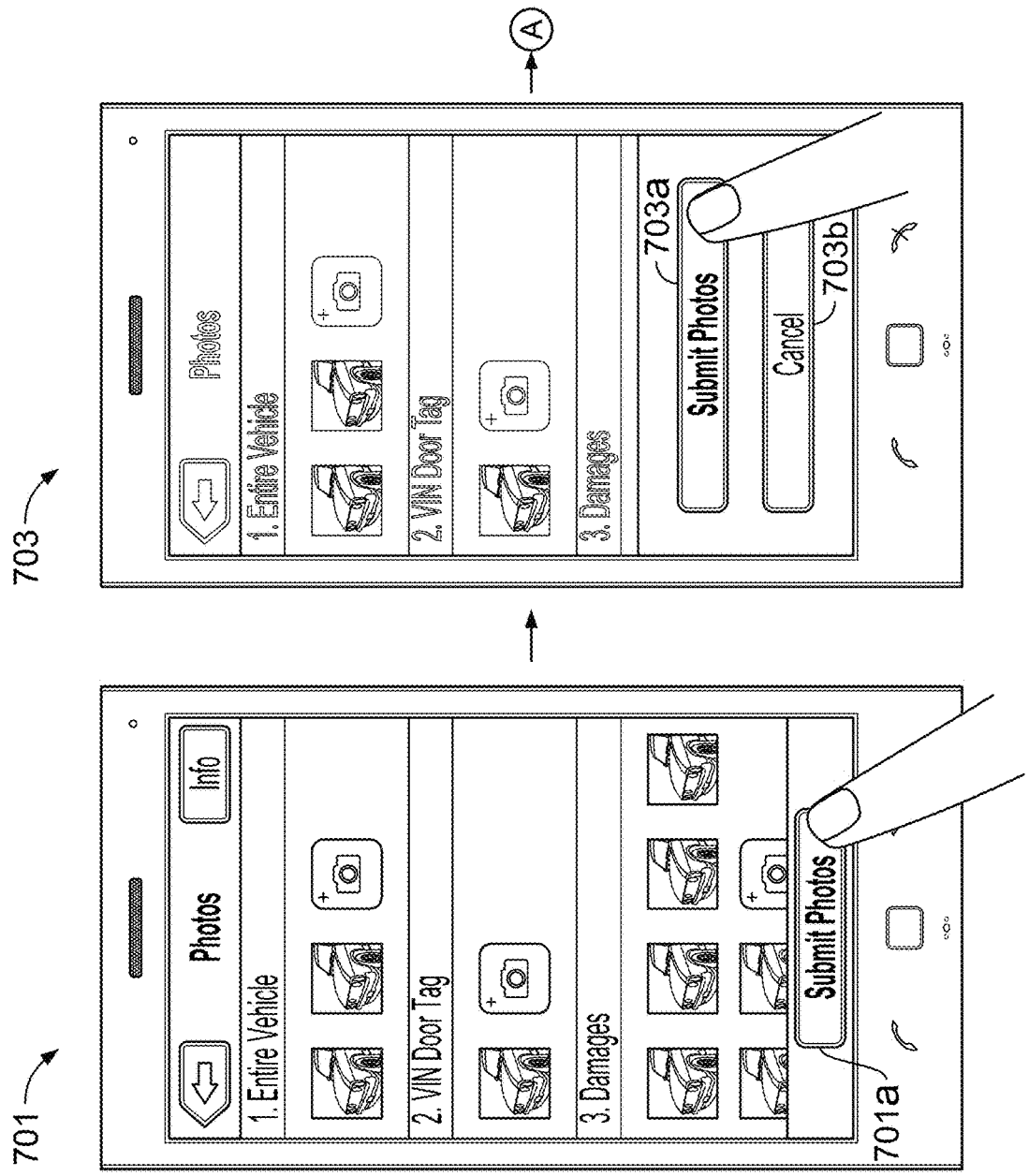
FIG. 7 shows a series of display screens displayed on a mobile device for enabling a user to submit photos for review by an enhanced claims processing server, in accordance with certain aspects of the present disclosure.
Figure 7:
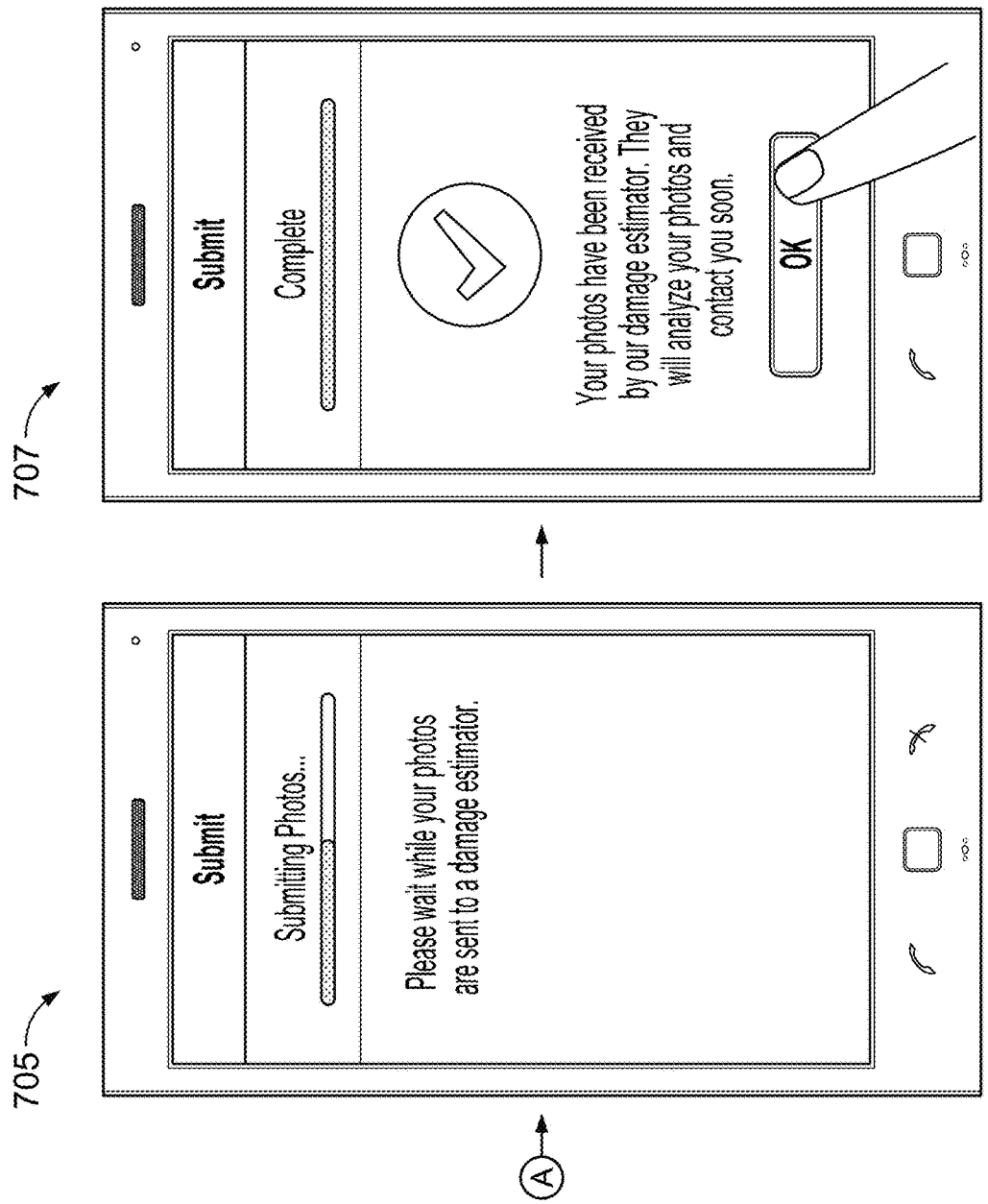

FIG. 7 shows a series of display screens displayed on a mobile device for enabling a user to submit photos for review by an enhanced claims processing server 101, in accordance with at least one aspect of the present disclosure. Screen 701 may include a "Submit Photos" button 701a for submitting photos to server 101 when all photos have been taken. When a user presses "Submit Photos" button 701a, the mobile device may display screen 703, which includes an action panel with the "Submit Photos" button 703a for confirming that the captured photos are to be submitted to server 101 and a "Cancel" button 703b for cancelling the submission. If the user selects "Submit Photos" button 703a, the mobile device may display screen 705 where an upload progress bar may indicate the progress of the photo upload. Once the photos have been fully uploaded, the mobile device may display screen 707, which indicates that the photos have been uploaded and explains any next steps that should be taken.

Figure 8:
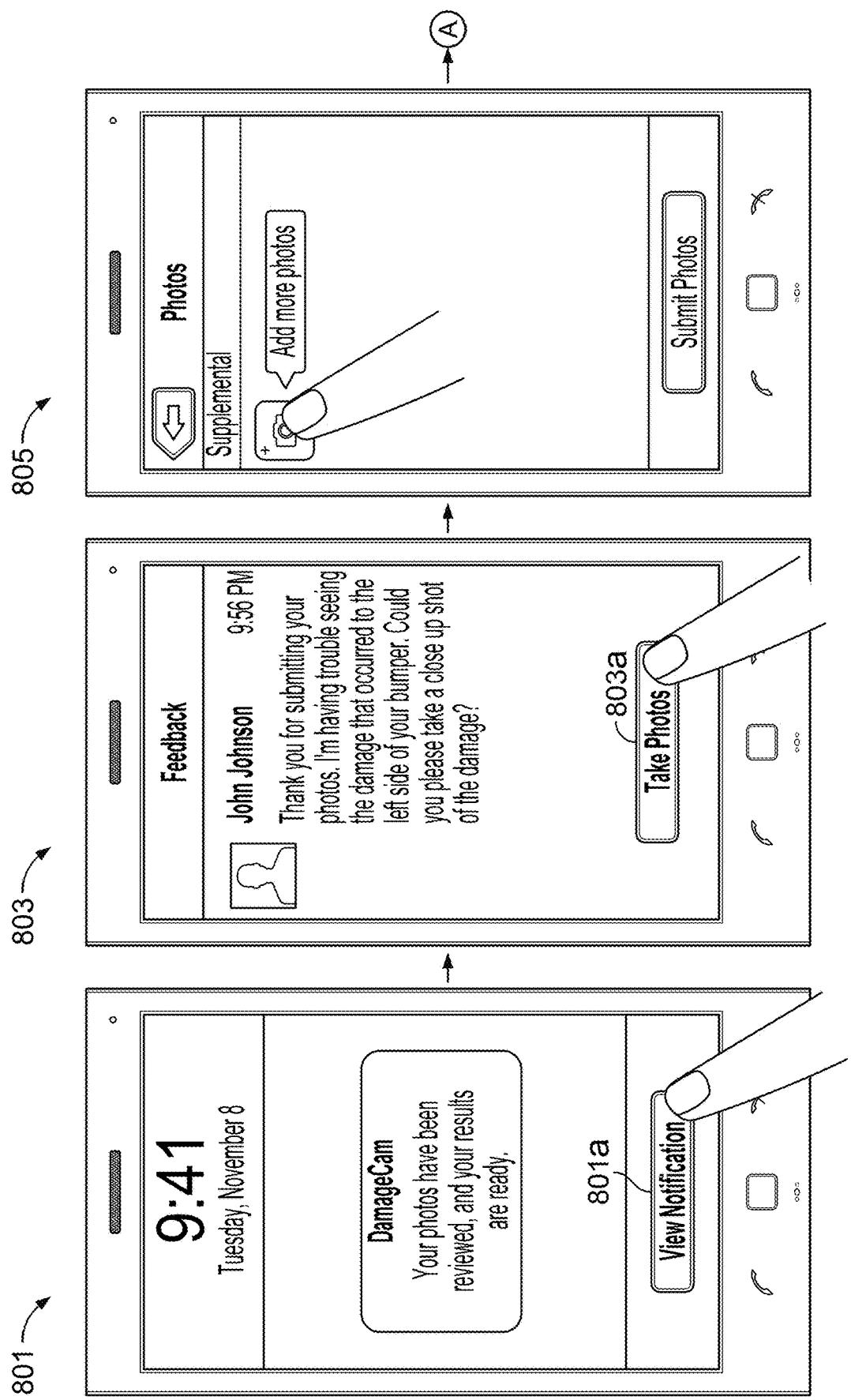
FIG. 8 shows a series of display screens displayed on a mobile device for enabling a user to receive feedback from an enhanced claims processing server regarding previously submitted photos, in accordance with certain aspects of the present disclosure.

FIG. 8 shows a series of display screens displayed on a mobile device for enabling a user to receive feedback from an enhanced claims processing server 101 regarding previously submitted photos, in accordance with at least one aspect of the present disclosure. When enhanced claims processing server 101 completes review of the photos submitted in FIG. 7, server 101 may transmit a notification to the mobile device that feedback is ready for review. When the mobile device receives the notification, screen 801, which includes a notification that feedback is ready, may be displayed. When a user selects the "View Notification" button 801a, the mobile device may display screen 803, which may include a detailed description of any feedback received from server 101. In this case, server 101 has transmitted a message that asks the user to take additional photos (e.g., of the damage to the left side of a bumper). Screen 803 may also include a "Take Photos" button 803a which may allow the user to take additional photos of the damaged vehicle. When the user presses "Take Photos" button 803a, the mobile device may display screen 805 which allows the user to take more photos of the damaged vehicle (e.g., in response to the feedback received in screen 803) using the same process depicted in FIGS. 5a and 5b.

Once all required photos have been taken, the user may press the "Submit Photos" button 807a in screen 807. to submit the photos taken via screen 805 to enhanced claims processing server 101. When the user presses the "Submit Photos" button 807a in screen 807, the mobile device may display screen 809, which includes a progress bar that shows the progress of the photo upload to server 101.

Aspects of the disclosure allow for customers/potential customers of an entity managing enhanced claims processing server 101 (e.g., an insurance company) to obtain advice about the advantages/disadvantages of formally submitting an insurance claim for damage associated with an insured item (e.g., a vehicle, home, etc.). In this regard, enhanced claims processing server 101 may process information that addresses a pre-claim consultation between potential customer/customer and an entity managing server 101. In particular, data analyzed by enhanced claims processing server 101 may be used to assign a projected overall monetary valuation of a submitted claim for a given set of conditions associated with damage to an insured item so that a customer/potential customer may decide whether or not to submit a claim.

In some aspects, a customer/potential customer of an entity managing enhanced claims processing server 101 (e.g., an insurance company) or an agent associated with the entity managing enhanced claims processing server 101 may generate data (photos, video, descriptive text, etc.) associated with damage to an insured item. This data may be transmitted to enhanced claims processing server 101, where the data may be analyzed along with data associated with the terms of an insurance policy associated with (e.g., insuring) the damaged item.

In some aspects, an agent associated with the entity managing enhanced claims processing server 101 may obtain details of an insurance policy associated with a damaged item in one of several ways. For instance, if the damaged item is associated with a customer of the entity managing enhanced claims processing server 101, the agent may access a database associated with enhanced claims processing server 101 for this information. In other aspects, an agent of the entity managing enhanced claims processing server 101 may simply ask a customer/potential customer associated with the damaged item for details such as deductible amounts, premium levels, special provisions, coverage limits, etc. of the relevant insurance policy. The agent may then transmit these details to enhanced claims processing server 101.

Enhanced claims processing server 101 may then analyze information related to damage of the insured item and information related to an associated insurance policy providing insurance coverage for the insured item to determine consequences of formally submitting an insurance claim to seek compensation for the damage. For instance, by analyzing the extent of deductions associated with the insurance policy covering the insured item and the extent that rewards (e.g., safe driver reward, etc.) will be lost for submitting a claim, enhanced claims processing server 101 may calculate the extent that the premium amount associated with the insurance policy covering the damaged item will increase during a subsequent term if the claim is submitted. In addition to calculating an effect on premium and rewards, enhanced claims processing server 101 may also calculate other effects such as a surcharge or probability of renewal. Based on this information, an agent associated with the entity managing enhanced claims processing server 101 may provide advice to the customer/potential customer on whether or not the customer/potential customer stands to benefit by formally submitting the insurance claim. In other aspects, enhanced claims processing server 101 may directly transmit this advice to a customer/potential customer.

In other aspects, this process may also allow enhanced claims processing server 101 and/or an agent associated with the entity managing enhanced claims processing server 101 to offer upsell materials. For instance, by examining details of an accident, the type of insurance maintained by the insured, and other details of the insured, including other assets maintained by the insured and other types of insurance maintained by people similar to the insured, enhanced claims processing server 101 may provide an offer for a new insurance product and/or discounts associated with already purchased insurance products to entice a customer/potential customer to either become a customer of an entity managing enhanced claims processing server 101 and/or to purchase additional products offered by the entity managing enhanced claims processing server 101.

Figure 9:
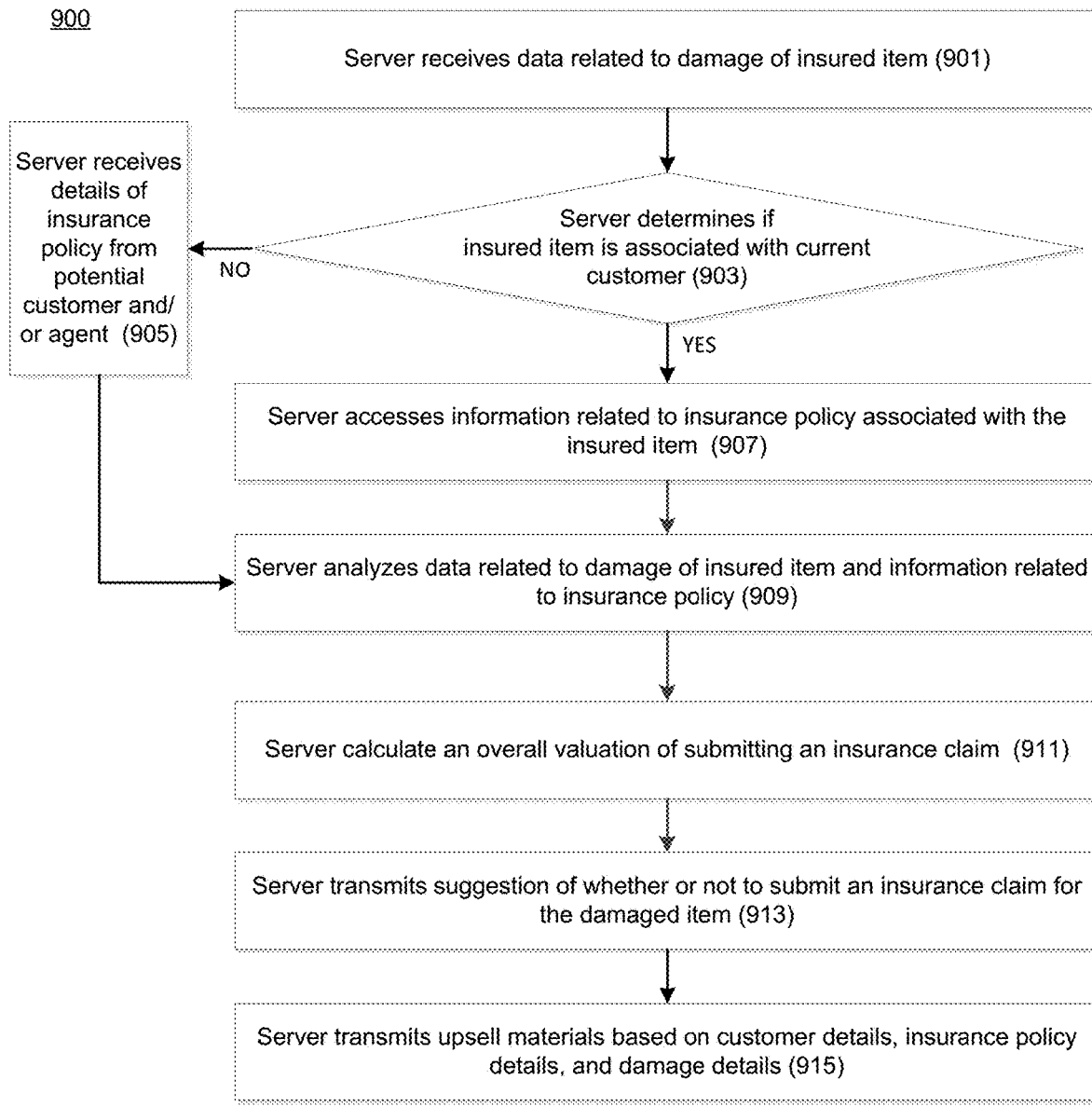
FIG. 9 shows a flow chart for providing pre-claim consultations in accordance with certain aspects of the present disclosure.

FIG. 9 shows a flow chart 900 for providing pre-claim consultations in accordance with at least one aspect of the present disclosure. The process may begin at step 901 where enhanced claims processing server 101 may receive data related to damage of an insured item. Server 101 may receive this data, for example, through a mobile device operated by a user and/or through an agent associated with an entity managing server 101.

Once this data is received, server 101 may determine if the insured item is associated with a current customer of the entity managing server 101 in step 903. If the insured item is not associated with a current customer of an entity managing server 101, server 101 may receive details of an insurance policy insuring the insured item directly from the potential customer (e.g., via a mobile device, etc.) and/or from an agent associated with the entity managing server 101 in step 905. If the insured item is associated with a current customer of an entity managing server 101, server 101 may access information related to details of an insurance policy associated with the insured item from an associated database (e.g., a database of customer information) in step 907.

Either from step 905 or 907, the process may move to step 909 where enhanced claims processing server 101 may analyze data related to damage of the insured item and information related to the relevant insurance policy. Based on this analysis, server 101 may calculate the overall consequences (e.g., overall monetary valuation of benefit/detriment) of submitting an insurance claim for damage to the insured item in step 911. For instance, server 101 may calculate the overall monetary valuation by examining a projected increase in premium amount and a projected refund (e.g., settlement amount) for submitting the claim. Once the overall consequences are calculated, the process may then move to step 913 where server 101 may transmit the calculations to a potential customer/customer. Server 101 may also offer a suggestion or other information to help the potential customer/customer decide whether or not to submit an insurance claim for the damaged item.

The process may also move optionally to step 915 where server 101 may transmit upsell materials (e.g., information about new products/services, special promotions, etc.) based on customer details, insurance policy details, damage details, etc.

As an example, consider a scenario where a customer of an insurance company gets into an at-fault automobile accident that damages the front fender of his car. Assume that the customer drives the car to a branch office of the insurance company where he has an automobile insurance policy. The customer seeks advice on whether or not he should submit a claim for damage to his car. The insurance agent at the branch office may take several photos of the damaged fender and may transmit this information to enhanced claims processing server 101, along with details associated with the customer (e.g., name, age, insurance policy number, etc.).

Once this information is received, server 101 may first determine if the received photos clearly depict damage to the insured vehicle. If they do not clearly depict any damage, server 101 may request additional photos from the customer and/or from the insurance agent. Once all relevant photos have been taken, server 101 may access the relevant insurance policy covering the damaged vehicle.

Assume that in this scenario, the customer pays a $100 monthly premium with a zero deductible to maintain his insurance policy. Also, assume that enhanced claims processing server 101 calculates that the rating plan for his insurance policy dictates a premium increase of $50 a month for a one-year period (accident-free) for the severity of accident that he experienced. Finally, assume that enhanced claims processing server 101 further estimates that the assessed damage to his automobile is $500. Thus, server 101 calculates that he would pay an extra $600 ($50 times 12 months=$600) in premium during the course of the subsequent year and a settlement amount of $500 for assessed damage, if he were to submit the claim.

In this scenario, server 101 may transmit a summary of the monetary valuation and suggest that the customer could choose not to submit the claim, given that the overall increase in premium exceeds the benefit (i.e., settlement amount) from submitting the claim.

Further aspects of the disclosure allow for customers of a given entity managing enhanced claims processing server 101 (e.g., an insurance company) to obtain insurance claim advice from a third party entity prior to submission of a claim for damage to an insured item. The third party entity may be another insurance company, an insurance broker, or some other entity separate from the entity at which the insured is a customer. An enhanced claims processing server 101 associated with a third party entity may obtain details (premium amounts, deductible amounts, coverage limits, etc.) about an insurance policy associated with an insured item and information about damage associated with the insured item from the insured, from the entity at which the insured is a customer, and/or from a public source (e.g., public records databases that store accident information, etc.). In one embodiment, this aspect of the disclosure may allow consumers to obtain insurance advice anonymously (e.g., by entering relevant information related to damage of an insured item through a website).

In some aspects, enhanced claims processing server 101 associated with a third party entity may infer details about an insurance policy associated with the insured based on known details about insurance policies maintained by other consumers with characteristics similar to the insured. For instance, if the third party entity is another insurance company, the third party entity may itself maintain a customer database that stores customer information like age, occupation, income level, etc. and information about insurance policies maintained by these customers. In this scenario, server 101 associated with the third party entity may match characteristics of the insured to characteristics of current customers of the third party entity. Once matched, server 101 associated with a third party entity may infer that characteristics of insurance policies maintained by customers similar to the insured are also associated with an insurance policy maintained by the insured.

If the third party entity is not an insurance company and/or if the third party entity does not have access to customer information storing insurance policy details, enhanced claims processing server 101 associated with a third party entity may use other methods to infer insurance policy details associated with the insured. For instance, server 101 associated with a third party entity may run algorithms that approximate insurance policy details associated with a given consumer based on inputs such as age, gender, income level, the insured item under consideration, etc.

Once enhanced claims processing server 101 associated with a third party entity has calculated details about an insurance policy that insures a damaged item that is associated with a consumer that is not currently a customer of the third party entity, server 101 associated with a third party entity may analyze the information related to the damage associated with an insured item and other information related to the insurance policy that insures the damaged item to calculate an overall monetary valuation of submitting an insurance claim for damage to the insured item.

Based on the overall monetary valuation, enhanced claims processing server 101 associated with a third party entity may suggest whether or not to submit an insurance claim for damage to the insured item. As before, the monetary valuation may consider information such as a projected amount by which a premium of an insurance policy maintained by the insured will increase and a projected settlement amount that will be paid to the insured for damage associated with assessed loss to the insured item, among other things.

In other aspects, enhanced claims processing server 101 associated with a third party entity may provide other incentives/services to a consumer when the consumer seeks advice prior to formal submission of an insurance claim for damage associated with an insured item. For instance, after transmitting, to the consumer, a suggestion of whether or not to submit an insurance claim for damage to an insured item, server 101 associated with a third party entity may offer to pay for the assessed loss (or a portion thereof) associated with damage to the insured item, if the consumer will agree to become a customer of the third party entity. In this regard, enhanced claims processing server 101 associated with a third party entity may offer a customized insurance product that may better cover damage to the insured item and/or that may result in a better overall monetary valuation of formally submitting a claim for damage to the insured item.

FIG. 10 shows a flow chart 1000 for providing pre-claim consultations with a third party entity in accordance with at least one aspect of the present disclosure. The process may start out at step 1001 where an enhanced claims processing server 101 associated with a third party entity may receive data related to damage of an insured item. Server 101 may receive this data in a variety of ways, such as via a mobile device of a consumer associated with the damaged item, via an agent associated with the third party entity, etc. The process may then move to step 1003 where server 101 associated with the third party entity may evaluate information related to an insurance policy associated with the insured item. As outlined above, server 101 may evaluate this information in a variety of ways. Because the insured is not a customer of the third party entity, server 101 associated with the third party entity may determine information related to an insurance policy associated with the insured item directly from the insured, by evaluating known insurance policy details of people similar to the insured, by running an algorithm that uses publicly available information related to insurance purchasing tendencies of those with predetermined characteristics, etc.

The process may then move to step 1005 where server 101 associated with a third party entity may analyze the data related to damage of the insured item and the information related to an insurance policy of the insured. Based on this analysis, enhanced claims processing server 101 associated with a third party entity may calculate an overall valuation of submitting an insurance claim for damage associated with the insured item in step 1007. This valuation may consider information such as a projected premium increase for maintaining an insurance policy associated with the damaged item and a projected settlement amount for assessed damage associated with the insured item, if a claim for the damage is actually submitted.

Next the process may move to step 1009 where enhanced claims processing server 101 may transmit, to either an agent associated with a third party entity and/or the consumer in question, a suggestion or other information to help the consumer decide whether or not to submit an insurance claim for damage associated with the insured item. Finally, in step 1011, enhanced claims processing server 101 may transmit, to either an agent associated with a third party entity and/or the consumer in question, one or more incentives based on consumer details (age, gender, etc.), insurance policy details (level of coverage, premium levels, deductible amounts, etc.), and/or details associated with a damaged item. These incentives may relate to an offer for insurance that better covers the assessed loss for damage to the insured item and/or an offer to pay for the assessed loss (or a portion thereof), if the insured agrees to become a customer of the third party entity. Also, if the insured agrees to purchase an insurance policy offered by the third party entity, these incentives may also relate to an extension of accident forgiveness for an accident related to the pre-claim consultation in question.

As an example, consider a scenario where a consumer goes to an insurance company for a second opinion on damage associated with her insured vehicle. Assume also that she is dissatisfied with the advice given to her by the insurance company at which she is a customer, and so she arrives at a third party insurance company to determine if other options might be available to her.

An insurance agent associated with the third party entity may obtain demographic details associated with the consumer and may transmit these details to an enhanced claims processing server 101 associated with the third party insurance company. These details may include information related to age, income level, and address of the consumer in question, among other things. The insurance agent associated with the third party entity may also help the consumer take a few photos of her damaged vehicle and may transmit these images to server 101 associated with the third party entity.

In this particular scenario, assume that the consumer is reluctant to divulge the details of her insurance policy with the third part insurance agency. Therefore, server 101 associated with the third party insurance company may cross-reference her demographic characteristics with those of people similar to her that are already customers of the third party insurance company. Server 101 associated with the third party entity may then evaluate characteristics of insurance policies maintained by people similar to the consumer in question and may infer that these characteristics are also characteristics of an insurance policy maintained by the consumer in question.

Server 101 associated with the third party entity may then analyze the image data depicting damage to her damaged vehicle to assess the loss associated with the damage. This analysis, combined with inferred details about the insurance policy maintained by the consumer, may be used to estimate an overall monetary valuation of submitting an insurance claim for damage associated with her vehicle. Assume that in this case, the consumer in question pays a $50 monthly premium to maintain her automobile insurance policy and has a $500 deductible associated with this policy. Assume also that enhanced claims processing server 101 associated with the third party entity determines that the assessed loss associated with her vehicle is $300 and that her monthly premium will increase by $20 per month for a six month period (after which it will return to $50 per month) if she were to submit a claim for her loss. Thus, server 101 associated with the third party entity may estimate that the consumer in question stands to benefit very little by submitting a claim for her loss (as the assessed loss is less than her deductible and her premium would increase as a result of the submitted claim). Therefore, enhanced claims processing server 101 associated with the third party entity may suggest that she could choose not to submit a claim for this loss.

In this scenario, enhanced claims processing server 101 associated with the third party entity may further suggest additional insurance products to the consumer. These insurance products may be tailored to better cover the type of damage associated with her vehicle. For example, enhanced claims processing server 101 associated with the third party entity may suggest an insurance product that has a lower deductible (e.g., a $100 deductible) with a smaller increase in premium for accidents of the nature experienced by the consumer. To further incentivize this insurance product, enhanced claims processing server 101 associated with the third party insurance company may offer to pay for the assessed loss (i.e., $300) if the consumer in question agrees to become a customer of the third party insurance company.

In both the processes discussed in FIG. 9 and FIG. 10, an agent of an entity managing enhanced claims processing server 101 may perform a manual calculation to estimate any effects of formally submitting an insurance claim for loss associated with an insured item.

Aspects of the disclosure enable a user device (e.g., mobile phone, tablet, etc.) to serve as a portal for efficiently providing access to services provided by third party entities to consumers (e.g., customers, potential customers) who are undergoing a claims adjustment process as a result of damage to an insured item. In this aspect, a consumer and/or an agent associated with an entity (e.g., an insurance company) managing enhanced claims processing server 101 may transmit, to server 101, images, video, and/or data related to damage associated with an insured item, and server 101 may stream this information to a third party entity (e.g., a preferred partner of the entity managing server 101) in real-time as server 101 is analyzing this information to assess damage associated with the insured item.

A third party entity may provide any of various types of services that may be of interest to a consumer. For instance, a third party entity may represent a repair agency for repairing damage to damaged vehicles. By viewing the damage to a damaged vehicle as the claims adjustment process is still on-going, the repair agency may be able to estimate an approximate cost and best strategy for repairing the damage, thereby allowing an entity managing enhanced claims processing server 101 and associated consumers to plan the repair process much more efficiently. Enhanced claims processing server 101 may also transmit information related to damage of an insured item to multiple repair agencies, for example, to compare repair cost estimates and repair strategies.

Moreover, server 101 may use feedback received from third party entities such as repair agencies in the claims adjustment process itself (e.g., for generating a settlement value for settling claims related to the damage). For instance, enhanced claims processing server 101 may generate (e.g., by analyzing data related to damage of an insured item and other information related to an insurance policy maintained by a consumer associated with the insured item) a first cost estimate for repairing damage associated with an insured item and may receive a second cost estimate for this repair from a third party repair shop. If the first cost estimate and the second cost estimate differ by a predetermined threshold, server 101 may then compare the two values to calculate a final cost estimate for repairing the damage to the insured item and thereby settling an insurance claim related to the damage.

Third party entities may also represent other entities such as junkyards, vehicle dealers, governmental agencies, etc. For instance, consumers may be interested in allowing junkyards to view damage associated with an insured car to estimate how much compensation they would receive for the car if the car was declared a total loss. Similarly, a consumer may be interested in allowing vehicle dealers to view damaged vehicles to estimate trade-in values if the consumer were interested in trading in a damaged vehicle for another vehicle. Moreover, consumers may be interested in transmitting information related to damage of an insured item to governmental agencies such as police stations to allow these agencies to process items such as accident reports, etc. related to the damage.

Using this process, rather than taking pictures with a phone and then submitting the pictures to a third party entity such as a repair agency, the repair agency may obtain damage information in real-time while an agent or consumer associated with an entity managing enhanced claims processing server 101 is holding the phone and gathering image data from different angles around the damaged item. In other aspects, third party entities such as repair agencies may analyze streamed data, images, and video as it is being sent and save only those portions that are of interest (e.g., those portions that clearly depict damage to the insured item). In yet other aspects, customers/potential customers/agents associated with an entity managing enhanced claims processing server 101 may transmit audio information (e.g., a description that explains video and images being streamed) related to damage associated with an insured item in real-time to third party entities.

In additional aspects, a third party entity receiving information related to damage of an insured item may, upon viewing the information, request additional information and/or images. Enhanced claims processing server 101 may transmit the request to a user device and may receive the requested information from the user device for transmission to the third party entity.

Figure 11:
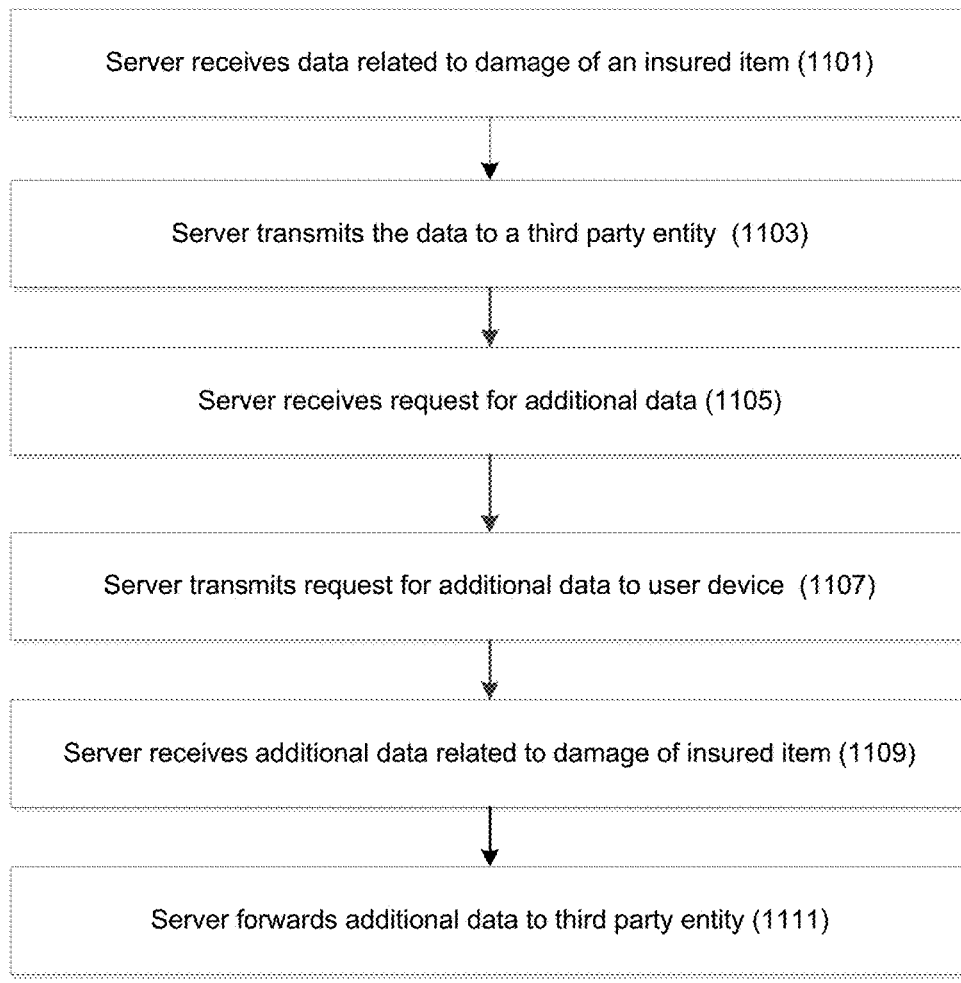
FIG. 11 shows a flow chart for using a user device to allow a third party entity to learn about damage to an insured item while the damage is still being assessed through a claims adjustment process in accordance with certain aspects of the present disclosure.

FIG. 11 shows a flow chart 1100 for using a user device to allow a third party entity to learn about damage to an insured item while the damage is still being assessed through a claims adjustment process in accordance with at least one aspect of the present disclosure. The process may start out at step 1101 where enhanced claims processing server 101 may receive data related to damage of an insured item. Once the data is received, server 101 may immediately (e.g., in real-time) forward the data to a third party entity in step 1103. The third party entity may analyze the data and, if additional data is required, may transmit a request for this additional data in step 1105.

Enhanced claims processing server 101 may transmit this request for additional data to a user device in step 1107 and may receive a response with the additional data in step 1109. The request for additional data may include a link for providing the requested additional data using the application. The user may select the link to access a portion of the application in which the user may input the additional data. In some aspects, the request may directly display the portion of the application in which the user may input the additional data. Finally, in step 1111, server 101 may forward this additional data to the third party entity.

As an example, consider a scenario where a customer of an insurance company drives his car to a local branch office so that the agent at the branch office can assist him in filing a claim for an accident which caused damage to the front windshield of his car.

The insurance agent at the branch office may use his tablet computer to take images of the damaged windshield and may transmit this information to enhanced claims processing server 101. As the insurance agent is taking photos of the damaged windshield, enhanced claims processing server 101 forwards the image data in real-time to a preferred repair shop.

The repair shop analyzes the information as it is being sent and generates a cost estimate for repairing the broken windshield. The repair shop then transmits this cost estimate to enhanced claims processing server 101 so that the insurance agent and the customer can use this information in assessing the damage and deciding on a vendor for repairing the broken windshield.

In additional aspects of the disclosure, an agent associated with an entity managing enhanced claims processing server 101 (e.g., an insurance company) may use a user device (e.g., mobile device, tablet, etc.) to capture damage data (e.g., images, video, text, etc.) associated with damage to an insured item so that a customer/potential customer of the entity managing enhanced claims processing server 101 may review the data for completeness and accuracy. This particular aspect of the disclosure may reduce the number of potential errors and likelihood of fraud associated with capturing images related to damage of an insured item (e.g., because an agent associated with the entity managing enhanced claims processing server 101 is capturing images rather than the customer/potential customer of the entity managing enhanced claims processing server 101). In addition, a potential customer/customer of an entity managing enhanced claims processing server 101 may not have to wait at the entity managing enhanced claims processing server 101 (e.g., an insurance company) for a claims adjuster to review and analyze damage data, because an agent may submit captured damage data to enhanced claims processing server 101 once appropriate images have been captured. Furthermore, as some potential customers/customers of an entity managing enhanced claims processing server 101 may not possess a user device (e.g., mobile device, tablet, etc.) configured to capture damage data, this aspect of the invention facilitates access of services to these customers/potential customers, as an agent associated with the entity managing enhanced claims processing server 101 may use his or her own user device to capture damage data.

In general, damage data may depict damage using various technologies (e.g., 3-dimensional images for depth information, panoramic images, video data, etc.) to allow different types of information to be gleaned. In addition to video and image data generated by an agent and/or a customer/potential customer associated with an entity managing enhanced claims processing server 101, agents and customers/potential customers may also transmit a verbal description of damage to enhanced claims processing server 101.

If a customer/potential customer of an entity managing enhanced claims processing server 101 finds no problems with the damage data, the data may be forwarded to enhanced claims processing server 101 (e.g., via an agent, directly from a customer/potential customer of an entity managing enhanced claims processing server 101, etc.). If a customer/potential customer of an entity managing enhanced claims processing server 101 determines that there are problems, the customer/potential customer may transmit these concerns to the agent so that the agent can address them prior to transmitting the damage data to enhanced claims processing server 101. In some aspects, a customer/potential customer of an entity managing enhanced claims processing server 101 may certify that damage data shows only damage from a most recent accident (and excludes prior damage).

In some aspects, a customer/potential customer of an entity managing enhanced claims processing server 101 may receive an Internet link (e.g., as part of a message) to damage data captured by an agent associated with the entity managing enhanced claims processing server 101. A customer/potential customer of an entity managing enhanced claims processing server 101 may then review the received damage data and, if required, may add information to the received data set and/or modify the received data set before transmitting the received data and any additional/modified data back to a user device associated with the agent. In yet other aspects, an agent associated with an entity managing enhanced claims processing server 101 may request additional damage data from a potential customer/customer and upon receipt of this request, a potential customer/customer may capture the requested data prior to transmitting the data for review by the agent.

A customer/potential customer of an entity managing enhanced claims processing server 101 may also receive other types information from a user device associated with an agent of an entity managing enhanced claims processing server 101. For instance, if an entity managing enhanced claims processing server 101 is an insurance company, an agent associated with the insurance company may use a user device to transmit information about insurance products, discounts, and/or rewards offered by the insurance company. A customer/potential customer of the insurance company may review this information and transmit to the agent an indication of whether or not he wants to take further action (e.g., purchase, request more information, etc.) on products presented to the customer/potential customer.

Figure 12:
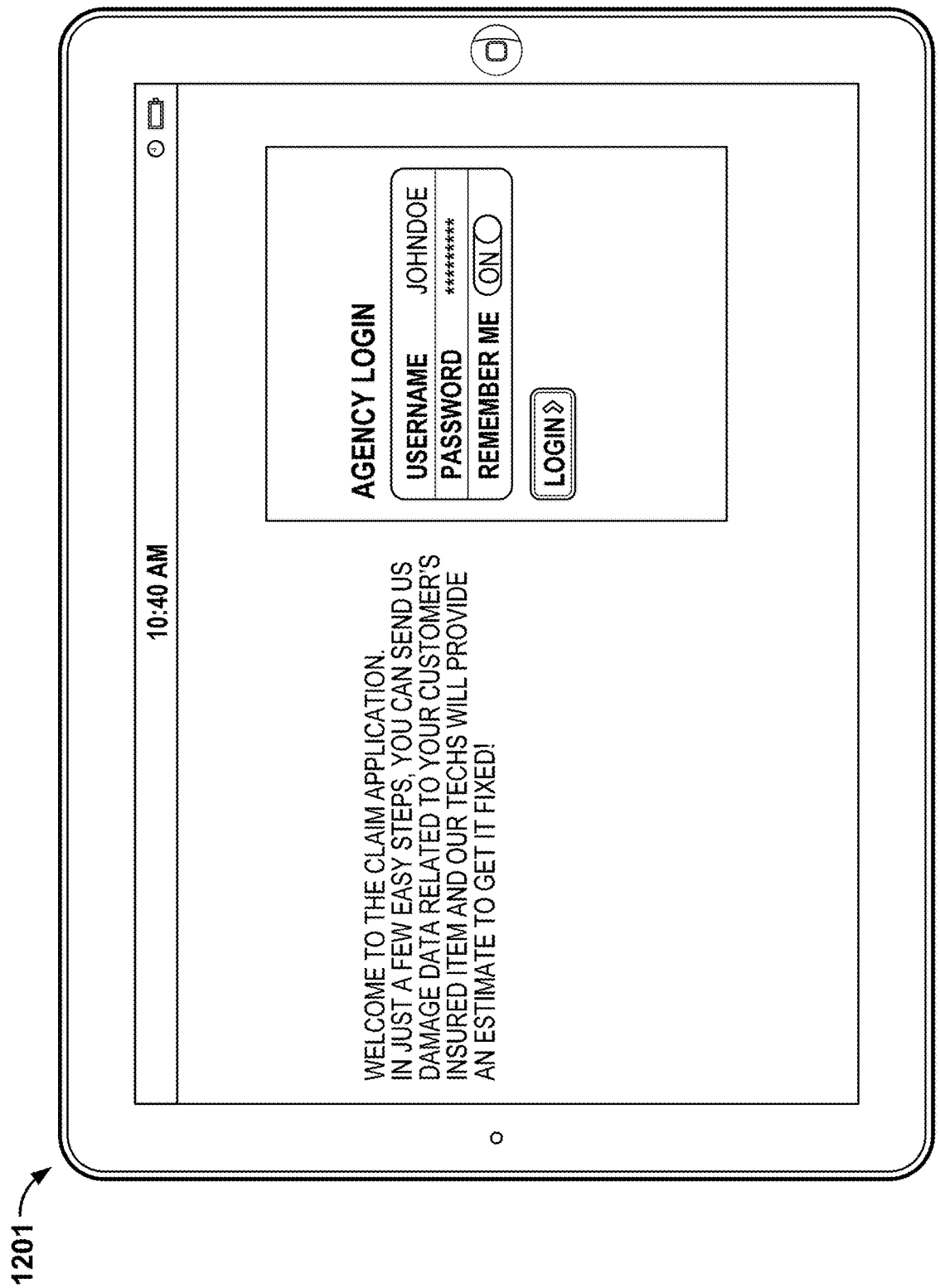
FIG. 12 shows a login screen displayed on a user device in accordance with certain aspects of the present disclosure.

FIG. 12 shows a login screen displayed on a user device (e.g., mobile phone, tablet, etc.) in accordance with at least one aspect of the present disclosure. Login screen 1201 may allow an agent associated with an entity managing enhanced claims processing server 101 to enter a username and password to login to an application and access capabilities related to capturing damage data associated with an insured item owned/operated by a potential customer/customer of an entity managing enhanced claims processing server 101.

FIG. 13 shows two display screens displayed on a user device that allow a user to capture damage information associated with a new claim and/or access information related to claims that have been previously submitted for claims adjustment, in accordance with at least one aspect of the present disclosure. In some aspects, screens 1301 and 1303 and future display screens discussed herein may be displayed only after a user enters login information (e.g., through screen 1201). If an entity managing enhanced claims processing server 101 is an insurance company, an insurance agent associated with the insurance company may access screen 1301 to create a new claim (e.g., for a damaged vehicle) for claims adjustment by selecting the "Get Started" button in section 1301*a*, view a summary of claims that have been initiated by the insurance agent and that are currently being analyzed by a claims adjuster (e.g., "active estimates") by selecting section 1301*b*, and view a summary of claims that have been initiated by the insurance agent and that have already been analyzed by a claims adjuster (e.g., "complete estimates") by selecting section 1301*c*.

Meanwhile, screen 1303 shows an alternative arrangement of information for allowing an insurance agent to create new claims for claims adjustment and/or view claims that have already been submitted. By selecting the "Get Started" button in section 1303*a*, an insurance agent may be directed to other screens that will allow him to capture damage information related to a new claim. In addition, section 1303*b* shows a summary of active claims initiated by the insurance agent in question. Section 1303*b* includes information such as a customer name to which a given claim corresponds, an insurance policy number associated with the claim, a claim number, the name of the insurance agent associated with the claim, the name of a claims adjuster processing the claim, contact information for the claims adjuster, the status of the claim, and the time/date of the last status update, along with a link to any new messages received in connection with the processing of a given claim. Screen 1303 may also include section 1303c, which includes a summary of all claims initiated by the insurance agent in question and that have completed the claims adjustment process.

FIG. 14 shows two display screens displayed on a user device for displaying messages associated with a given claim, in accordance with at least one aspect of the present disclosure. Screen 1401 shows a message history in section 1401a between two people associated with a given claim (e.g., an insurance agent who initiated the claim and a claims adjuster reviewing claim information, etc.). New messages may be entered by using the keypad shown in section 1401c and by selecting the "Send" button 1401b.

Screen 1403 shows a second display screen with a message history 1403a between people involved with a claim. The message history 1403a shown in screen 1403 also includes enhanced features such as a "Retake VIN Photo" button 1403b that may allow one of the participants of the conversation to retake a photo associated with a vehicle identification number (VIN) of a vehicle that is being processed in related to the claim. In addition, screen 1403 also includes a "Send" button 1403c to allow one of the participants of the conversation to send a new message.

FIG. 15 shows a first set of two display screens displayed on a user device for providing user instructions for capturing images related to damage associated with an insured item, in accordance with at least one aspect of the present disclosure. Screen 1501 includes a window 1501a and instructions 1501b for capturing a predetermined type of image of the damage associated with an insured item. For instance, in this particular example, window 1501a and instruction 1501b both relate to capturing a close-up image of damage associated with an insured vehicle. After reviewing the image in window 1501a and the related hint specified by instruction 1501b, an insurance agent associated with an entity managing enhanced claims processing server 101 may capture an appropriate type of image with a user device by selecting the "Take Photos" button 1501c. In addition, an insurance agent may request further instructions on how to capture relevant images by selecting the "Next Hint" button 1501d.

Meanwhile, screen 1503 includes a second window 1503a and associated instruction 1503b for capturing a second type of image associated with damage to an insured item. For instance, window 1503a and instruction 1503b relate to capturing damage to an insured vehicle from different angles. If a user (e.g., an insurance agent) is ready to capture, with a user device, the type of images specified by window 1503a and hint 1503b, the user may select the "Take Photos" button 1503c. Alternatively, if the user needs further instructions on capturing relevant images, the user may select the "Next Hint" button 1503d. It should be noted that the type of images specified by screen 1501 and 1503 are exemplary, and any number of other types of images may also be requested.

FIG. 16 shows two display screens that display images of damage being captured by a user device, in accordance with at least one aspect of the present disclosure. Screen 1601 includes a viewfinder window 1601a where a given type of image specified by instruction 1601b (e.g., a close-up view of a damaged area) is put into focus with an imaging device (camera, etc.) associated with a user device on which an application supporting this functionality is running. Once a user is ready to capture the image seen in viewfinder window 1601a, the user may capture the photo by selecting the "Take Photo" button 1601c.

Meanwhile, screen 1603 includes a different viewfinder window 1603a where a different type of image specified by instruction 1603b (e.g., a view of a damaged area from a different angle) is put into focus with an imaging device (e.g., camera) associated with a user device. Again, once a user is ready to capture the image seen in viewfinder window 1603a, the user may capture the image by selecting the "Retake Photo" button 1603c (assuming a first version of the photo has already been taken).

FIG. 17 shows a second set of two display screens displayed on a user device for providing user instructions for capturing images related to damage associated with an insured item, in accordance with at least one aspect of the present disclosure. Screen 1701 includes a window 1701a and associated instruction 1701b for capturing a given type of image. In this particular example, window 1701a and instruction 1701b direct a user to capture images of each corner of an insured vehicle. If a user is ready to capture the images, the user may select the "Take Photos" button 1701c. Alternatively, if a user needs further instructions on capturing relevant images, the user may select the "Next Hint" button 1701d.

Screen 1703 includes a window 1703a and associated instruction 1703b for capturing a different type of image. In this example, window 1703a and instruction 1703b direct a user to take images of an entire vehicle. As before, if a user is ready to capture the images, the user may select the "Take Photos" button 1703c. Alternatively, if a user needs further instructions on capturing relevant images, the user may select the "Next Hint" button 1703d.

Figure 18:
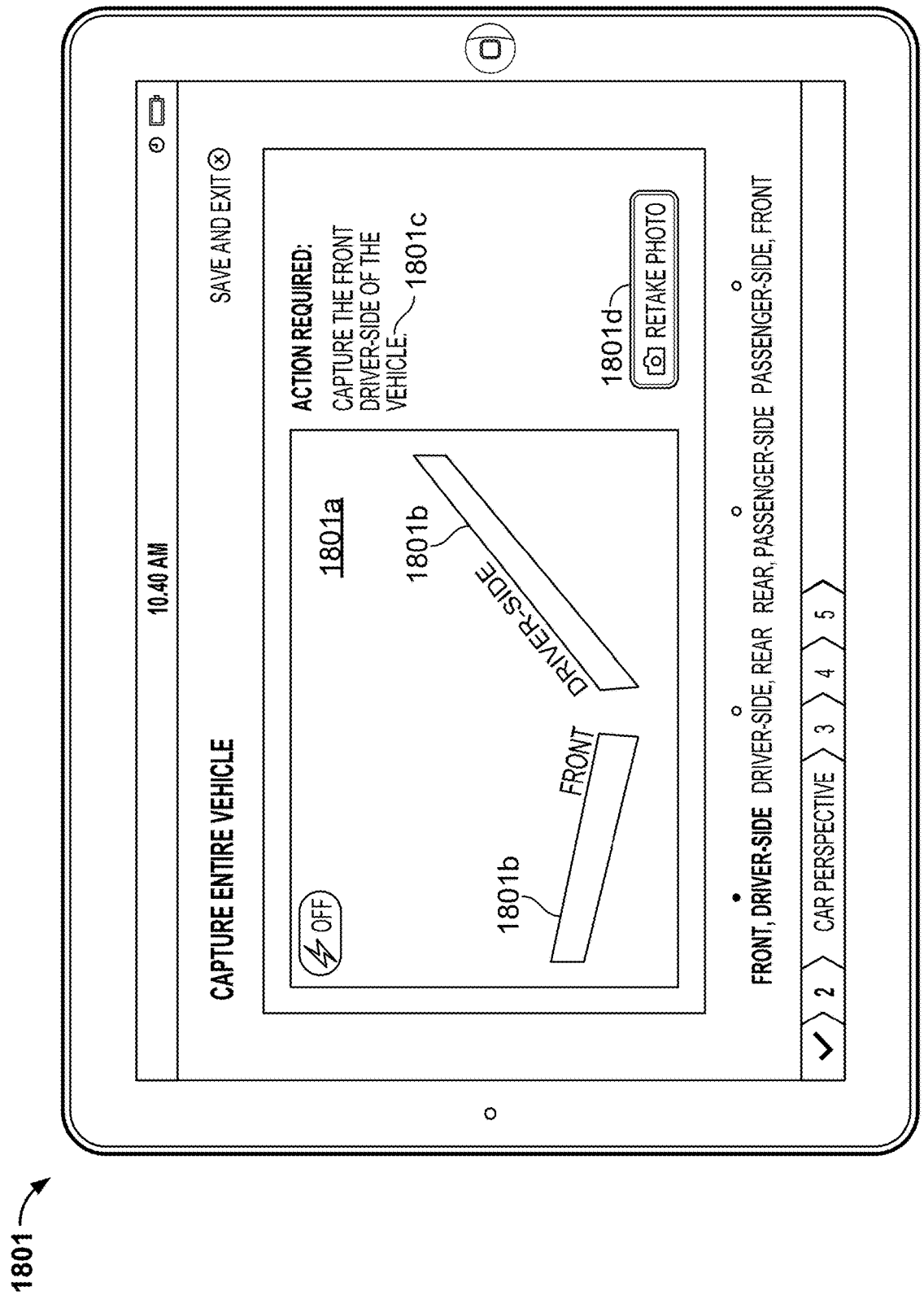
FIG. 18 shows a display screen with visual aids for aiding a user in properly positioning an imaging device associated with a user device to capture images related to damage of an insured item, in accordance with certain aspects of the present disclosure.

FIG. 18 shows a display screen with visual aids for aiding a user in properly positioning an imaging device associated with a user device to capture images related to damage of an insured item, in accordance with at least one aspect of the present disclosure. Screen 1801 may include a window 1801a with visual aids 1801b to aid a user in positioning an imaging device (e.g., a camera) associated with a user device (e.g., tablet, mobile phone, etc.) so that the imaging device correctly captures an image associated with instruction 1801c. In this particular example, window 1801a includes markers for positioning a camera so that the front and driver's side of a damaged vehicle appear in the proper location of an image. Once a camera is properly positioned, a user (e.g., an insurance agent associated with an entity managing enhanced claims processing server 101) may select the "Retake Photo" button 1801d (assuming a first but somehow defective version of this image had already been taken).

FIG. 19 shows two display screens displayed on a user device for displaying instructions related to capturing images for processing a claim associated with damage of an insured item, in accordance with at least one aspect of the present disclosure. In this particular example, screens 1901 and 1903 include images associated with a vehicle identification number (VIN) and odometer reading associated with a damaged vehicle. Screen 1901 includes a viewfinder window 1901a displaying an image of a VIN tag associated with a damaged vehicle. Screen 1901 also includes an instruction 1901b for capturing the VIN tag displayed in window 1901a. If a user (e.g., an insurance agent) is ready to capture an image displayed in viewfinder window 1901a, the user may select the "Retake Photo" button 1901c (assuming a first but somehow defective version of this image had already been taken). In alternative embodiments, a user may enter in a VIN through a keypad on a user device and/or may scan the VIN optically (e.g., as a barcode).

Meanwhile, screen 1903 includes a viewfinder window 1903a displaying an odometer reading associated with a damaged vehicle. Screen 1903 also includes an instruction 1903b for capturing the odometer reading displayed in window 1903a. If a user (e.g., an insurance agent) is ready to capture an image displayed in viewfinder window 1903a, the user may select the "Retake Photo" button 1903d (assuming a first but somehow defective version of this image had already been taken). Alternatively, if a user is satisfied with the image already captured for this step, the user may move to the next step by selecting the "Next Step" button 1903c.

FIG. 20 shows two display screens displayed on a user device for reviewing images depicting damage to an insured item, as captured by an imaging device, in accordance with at least one aspect of the present disclosure. Screen 2001 includes an image 2001a and instructions 2001b related to user review of captured images. Once a user (e.g., an insurance agent associated with an entity managing enhanced claims processing server 101, a potential customer/customer of an entity managing enhanced claims processing server 101) has reviewed and understood instructions 2001b, the user may select the "Continue" button 2001c.

Meanwhile, screen 2003 includes an image 2003a that depicts an insured item (e.g., a vehicle) and that has already been captured by an imaging device associated with a user device (e.g., a mobile phone, tablet, etc.). Screen 2003 also includes various options related to image 2003a; for instance, screen 2003 includes a "Remove" button 2003b for deleting image 2003a from a memory associated with the user device on which image 2003a is stored, a "Retake" button 2003c for recapturing image 2003a, and an "Add Photo" button 2003d for adding another photo related to damage associated with an insured item.

FIG. 21 shows a display screen displayed on a user device for displaying claim information associated with damage to an insured item, in accordance with at least one aspect of the present disclosure. Screen 2101 includes a section 2101a for entering contact information associated with a claim, such as a customer name 2101b and a submitter name 2101c (e.g., an insurance agent associated with an entity managing enhanced claims processing server 101). Screen 2101 also includes a section 2101d for entering claim information such as a claim number 2101e associated with damage to an insured item and a section 2101f for entering policy information such as a policy number 2101g associated with an insurance policy covering damage to the insured item. Finally, screen 2101 may also include a section 2101h for adding additional details associated with the claim in question. These additional details may relate to special processing instructions, information on any of the images captured in relation the claim, etc. Once all information has been entered, a user may select the "Submit for Estimate" button 2101i for submitting the claim for review by a claims adjuster.

Figure 22:
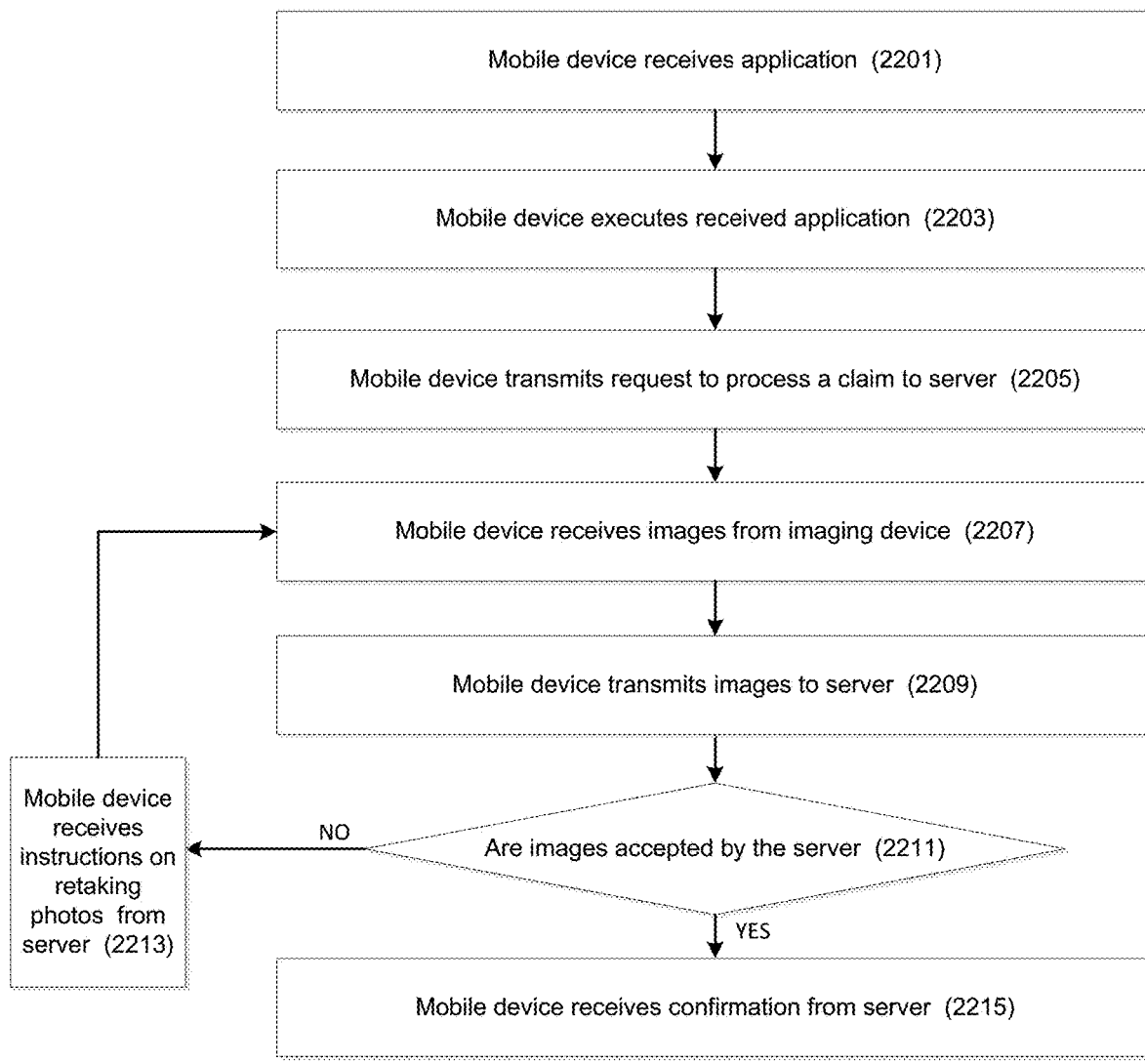
FIG. 22 shows a flow chart for an automated damage assessment process on a mobile device in accordance with certain aspects of the present disclosure.

FIG. 22 shows an automated damage assessment process 2200 in accordance with at least one aspect of the present disclosure. In certain aspects, a mobile device (e.g., iPad™, iPhone™, Android™, etc.) associated with a user (e.g., a customer of an insurance company) may interact with a server, such as server 100, to facilitate one or more steps of the process in FIG. 22. For example, a mobile device that implements the process of FIG. 22 may interact with a server that implements the process of FIG. 3.

The process of FIG. 22 may start out at step 2201 where a user (e.g., a customer) associated with an entity managing enhanced claims processing server 101 (e.g., insurance company) may receive, at a mobile device (e.g. network device 201), an application associated with the entity (e.g., by downloading the application from an application store). The application may be configured to allow the user to submit information about an insurance claim event (e.g., a vehicle accident) to server 101.

The process may then move to step 2203 where the mobile device may execute the received application. The application may be configured with the user's information, such as a customer identification number (e.g., policy number) for the user within the entity's customer database (e.g., database 203).

The process may then move to step 2205 where the mobile device transmits a request to process a claim to server 101. For instance, the user may enter a claim number (e.g., a number related to damage associated with an insured vehicle) into the application running on the mobile device. To generate a claim number, a claimant may contact an entity managing enhanced claims processing server 101 (e.g., an insurance company, etc.) with a first notice of loss (FNOL). The claimant may contact the insurance company in any number of ways, including via agent, by phone, by email, via a company website, etc. As part of the FNOL, the claimant may provide basic identifying and/or validating information (e.g., name, age, claim number, etc.) and vehicle information, including the make, model, and year of manufacture. The claimant may also provide the general areas of damage to the vehicle and any other relevant details (e.g., condition of glass, under carriage, engine, wheels, airbags, etc. associated with the vehicle). In one embodiment, this information may be provided by the claimant from a remote location (e.g., location of an accident, claimant's home, agent's office, etc.) using the application loaded onto the mobile device, or any other suitable application. In certain aspects, the user may log into the application (e.g., by providing a username and password), and the device may download all of the user's claims automatically.

The mobile device may then transmit the entered claim number and related information to server 101. Server 101 may determine if the claim request is valid by, for example, validating the received claim number. If server 101 determines that the claim number is not valid, then server 101 may transmit a message to the mobile device, stating that the claim number is invalid and the user may then enter another claim number. In certain aspects, server 101 may determine whether a user may be required to submit images for a valid claim. For instance, a user may not be required to submit images to server 101 for certain claims (e.g., claims indicating that a car is completely totaled), but may be required to submit images to server 101 for other types of claims (e.g., claims indicating that there has been minor damage to a car). Server 101 may be able to determine whether a user is required to submit images based upon the FNOL.

If server 101 determines that the claim request is valid, the process may move to step 2207 where the mobile device may receive images about the claim event from an imaging device (e.g., a camera operatively connected to the mobile device). For instance, once a claim request is validated, the running application may be configured to display user instructions about the types of image data (e.g., photos, video, etc.) that should be captured for any damage associated with the claim event (e.g., vehicle accident). It should also be noted that in some embodiments server 101 may not receive a claim number and the application may be configured to proceed in providing user instructions on the types of image data that should be captured without transmitting a claim number. The user may receive instructions on various types of photos/video, including photos/video of the entire vehicle, VIN door tag, current odometer reading, and/or the damaged areas. In some aspects, the user may capture image data related to at least two different angles of the damage for each panel (e.g., hood, fender, door, bumper, etc.) based on an initial claim description.

The user of the mobile device may use a camera associated with the mobile device to take the photos and/or video and transmit these photos and/or video to the server 101 (step 2209). The user may be allowed to preview each photo before selecting the image. Once a photo has been selected, the image may be shown on a display associated with the mobile device under a photo type (e.g., a photo of the entire vehicle, VIN door tag, current odometer reading, and/or damaged area). If the user is not satisfied with any photo, the user may delete the photo by selecting it and then retake the photo. In some aspects, the user may annotate the photos (e.g., by drawing a line from one end of the dent to the other, etc.) prior to transmitting them to server 101. In yet other embodiments, server 101 may itself annotate any received photos/video.

In some embodiments, any approved photo may not be sent to server 101 until all of the images have been captured. In some other embodiments, approved photos may be sent to server 101 at any time, without waiting for all of the images to be captured. In some aspects, server 101 may support a website interface through which photos may be uploaded by a user of a mobile device. Also, the use of multiple photos (e.g., via stereoscopic techniques), video (e.g., by walking around the vehicle to generate a complete view), and/or three-dimensional photos/video may assist in determining the depth of damage to a vehicle. In some aspects, determining the depth of damage may help in classifying the damage (e.g., a turbulent dent versus a dish dent). In addition, the degree of damage by area and depth may be automatically estimated through tools similar to ultrasound tools. Knowing the depth of damage may also assist in automatically determining the cost of repair or replacement. In addition, as the user is taking video/photos of damage associated with the insured vehicle, a claims adjuster associated with an entity managing server 101 (e.g., an insurance company) may interface with the user in real-time (e.g., via messaging, phone, email, etc.) as the photos are being sent to the adjuster and/or as the video is being streamed to the adjuster and describe to the user the photos/video that still need to be taken and/or where to place a camera as the photos/video are captured.

After server 101 receives image data transmitted from a mobile device in step 2209, server 101 (or an individual/group associated with the entity managing server 101) may determine if the photos are acceptable and the mobile device may receive, from server 101, a message indicating the acceptability of the photos in step 2211. For instance, server 101 may determine that the photos are too blurry and/or that the photos do not capture the correct angles to clearly show damage associated with the insured vehicle. If the mobile device receives a message that indicates the photos are not acceptable, the process may move to step 2213 where the server 101 (or, e.g., an individual or group associated with the server 101) may send the user instructions on what types of photos to take and/or what changes need to be made to the previously submitted photos. In this example, the process may move from step 2213 back to step 2207, where the user may take or retake photos in accordance with the received instructions.

In yet other embodiments, a dispatcher associated with an entity managing server 101 (e.g., an insurance company) may determine if submitted photos are acceptable. In other embodiments, the mobile device may itself determine if any given photo is blurry and/or inaccurate and prompt the user to retake the photo. In this aspect, the application for damage assessment and claims processing running on the mobile device may have computer-executable instructions stored within a memory of the mobile device for automatically detecting and/or rejecting a photo/video captured within a given category.

If the mobile device receives a message that indicates the photos are acceptable, the process may move to step 2215 where the mobile device may receive confirmation from server 101 that the claim request is complete. For example, the mobile device may receive a message from server 101 indicating that the claim request has been successfully completed.

FIGS. 23-31 show display screens displayed to a user of a mobile device in accordance with some aspects of the disclosure. The display screens may be used to implement a process similar to the process described in FIG. 22. In some embodiments, one or more display screens described in the disclosure may be combined and/or may be used in combination.

Figure 23:
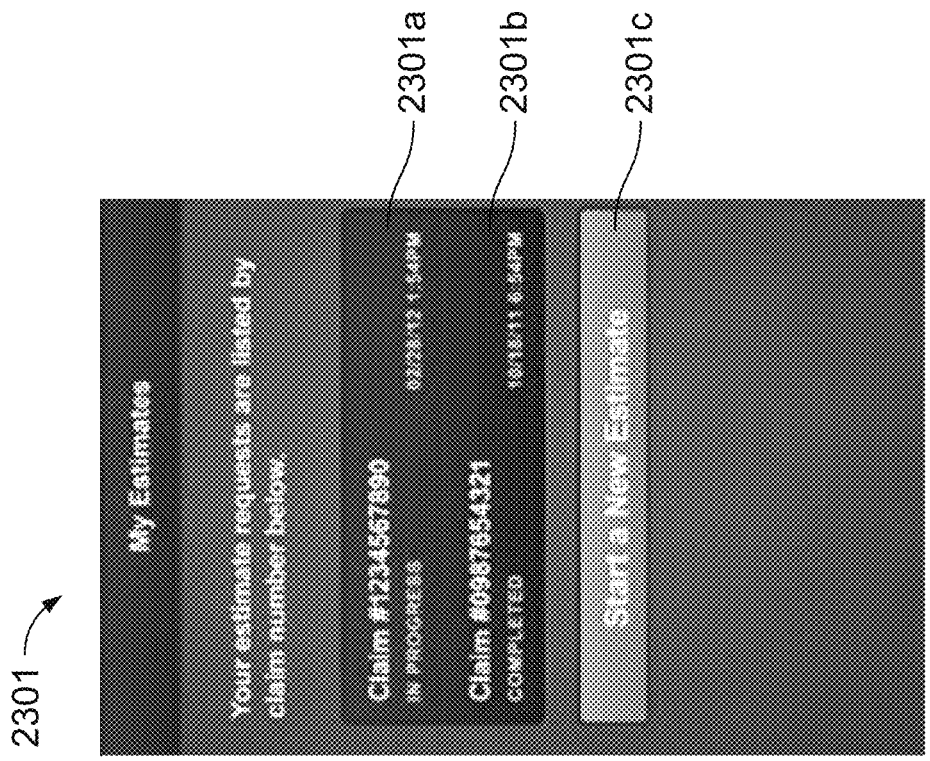
FIG. 23 shows a display screen with claim estimates for a user in accordance with certain aspects of the present disclosure.

FIG. 23 shows a display screen displayed to a user of a mobile device in accordance with at least one aspect of the present disclosure. Screen 2301 shows an initial display screen displayed when a user launches a damage assessment and claims processing application stored on a mobile device (e.g., network device 201) in accordance with at least one aspect of the present disclosure. In certain aspects, a user may have a plurality of claim estimates pending, where the claims may be at various stages of completion. For example, screen 2301 displays that user interface element 2301a is associated with a first claim, and the claim status is indicated as "in progress." Accordingly, element 2301a may be selected so that the first claim may be completed by the user. User interface element 2301b is associated with a second claim, and the claim status is indicated as "completed." Accordingly, element 2301a may not be selectable, as the claims has already been completed. The "Start a New Estimate" button 2301c on screen 2301 may be selected in order to start a new claim estimate.

Figure 24:
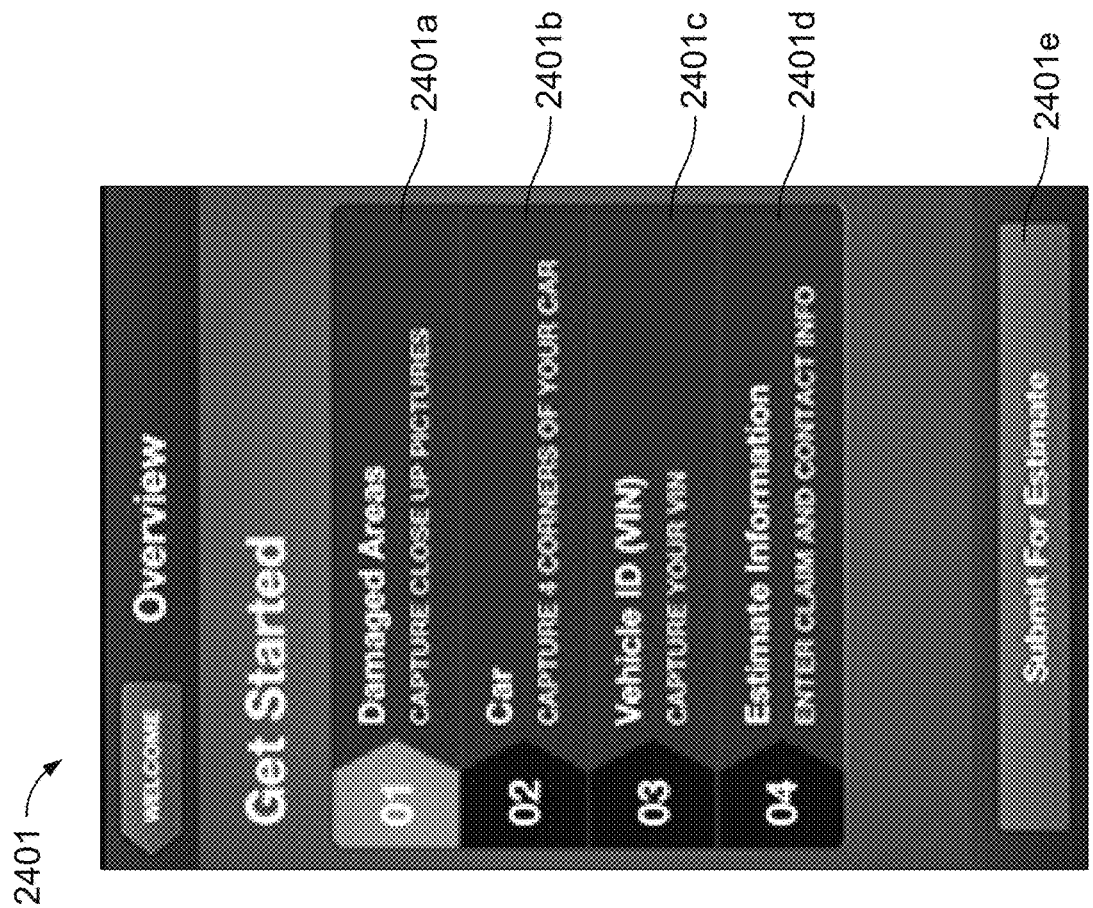
FIG. 24 shows a display screen with multiple stages that enable a user to submit a damage claim, in accordance with certain aspects of the present disclosure.
Figure 27:
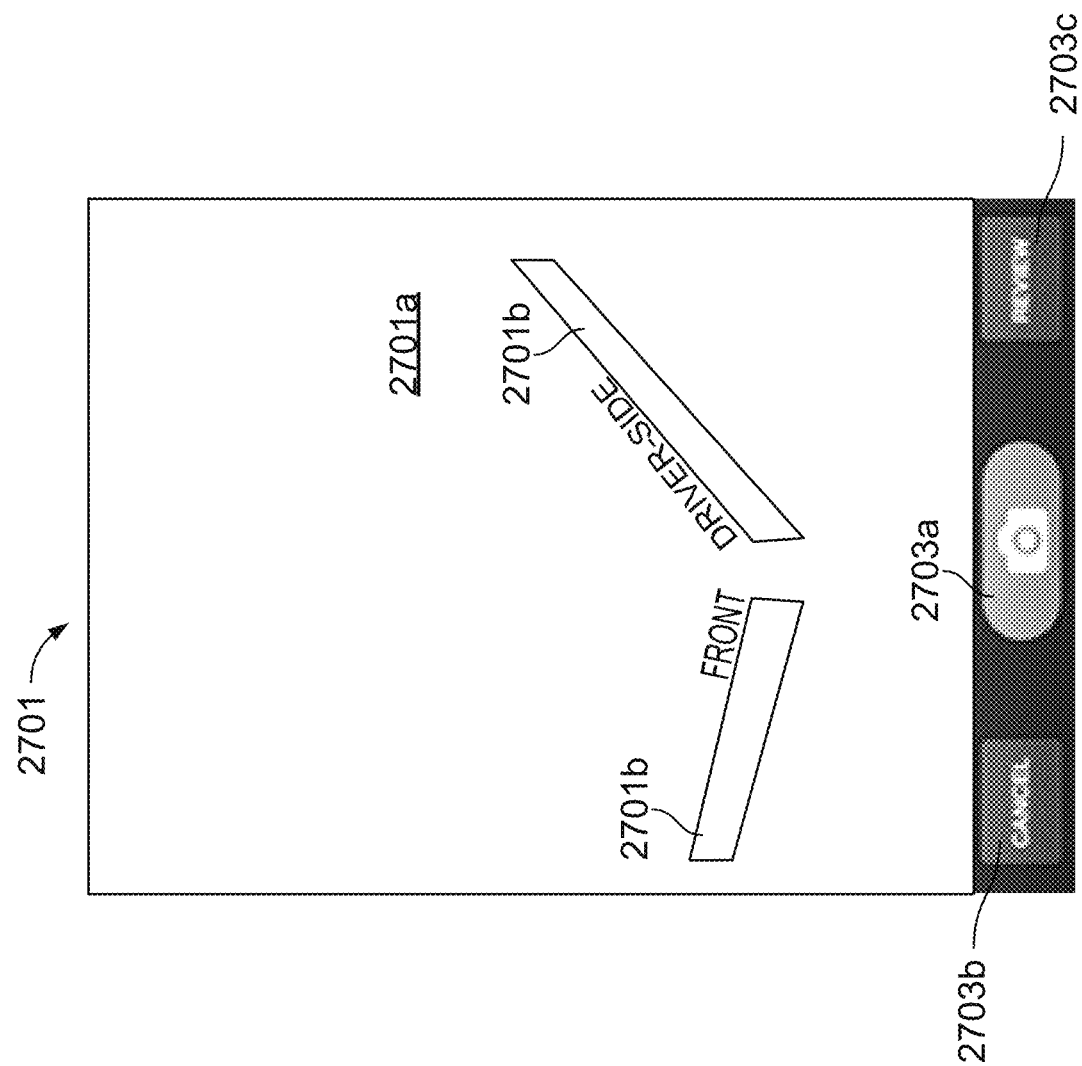
FIG. 27 shows a display screen with visual aids for aiding a user in properly positioning an imaging device associated with a user device to capture images related to damage of an insured item, in accordance with certain aspects of the present disclosure.

FIG. 24 shows a display screen displayed to a user of a mobile device in accordance with at least one aspect of the present disclosure. Screen 2401 shows an initial display screen displayed when a user starts a new claim estimate with the application in accordance with at least one aspect of the present disclosure. For example, screen 2401 may be displayed when button 2301c of FIG. 2301 is selected.

Screen 2401 displays various stages for the claim estimate. User interface element 2401a may be associated with a "Damaged Areas" stage, user interface element 2401b may be associated with a "Car" stage, user interface element 2401c may be associated with a "Vehicle ID" stage, and user interface element 2401d may be associated with a "Estimate Information" stage. In certain aspects, these user interface elements may be selectable based on the status of the claim estimate. For example, element 2401b may be selectable, and upon selection, the user may be guided to complete the "Damaged Areas" stage of the claim estimate. However, elements 2401b, 2401c, and 2401d may not be selectable until the "Damaged Areas" stage is completed. A "Submit for Estimate" button 2401e on screen 2401 may be inactive until each of the stages is completed. In certain aspects, the claim estimate may comprise additional stages, one or more described stages may be omitted, and/or an order for the stages may be any suitable order or the stages may be unordered.

FIG. 25 shows display screens displayed to a user of a mobile device in accordance with at least one aspect of the present disclosure. Screens 2501, 2503, 2505, and 2507 show instruction display screens displayed to a user in accordance with at least one aspect of the present disclosure. For example, screens 2501, 2503, 2505, and 2507 may be displayed when a user selects element 2401a of FIG. 24, and the user is guided to complete the "Damaged Areas" stage of the claim estimate. Screens 2501a, 2503a, 2505a, and 2507a may comprise frames that display instructions to the user on how to complete the "Damaged Areas" stage of the claim estimate. A user may scroll from screen 2501a to screen 2503a, and so on, with a gesture that interacts with the display of the mobile device, such as a finger swipe. Upon reaching the conclusion of the instructions for the "Damaged Areas" stage of the claim estimate, the user may be directed to a screen for taking photos and/or video of the damaged areas for the vehicle. For instance, the user may be directed to a screen similar to screen 507 of FIG. 5a.

In certain aspects of the disclosure, the application may instruct the user to take several photos of damaged areas on a vehicle, as described above. The user may be prompted to preview and approve the photos. If the user does not approve of the photo, the photo may be retaken. In an example, the user may be instructed to take at least three photos of each damaged area. In this example, one or more screens may instruct the user to take three photos of a first damaged area. Once three photos have been taken and have been approved by the user for the first damaged area, the application may proceed by asking the user if there are additional damaged areas. If the user indicates an additional damaged area, the application may direct the user to a plurality of screens that instruct the user to take at least three photos of the additional damaged area. Once three photos have been taken and have been approved by the user for the additional damaged area, the application may proceed by again asking the user if there are additional damaged areas. If the user indicates that there are no additional damaged areas, the application may direct the user to the next stage of the claim estimate. For example, the user may be directed to the "Car" stage of the claim estimate. In another embodiment, the user may be directed to a screen similar to screen 2401 of FIG. 24, and element 2401b may be selectable because the "Damaged Areas" stage of the claim estimate has been previously completed. In this embodiment, the user may select element 2401b and may further be directed to complete the "Car" stage of the claim estimate.

FIG. 26 shows display screens displayed to a user of a mobile device in accordance with at least one aspect of the present disclosure. Screens 2601 and 2603 show instruction display screens displayed to a user in accordance with at least one aspect of the present disclosure. For example, screens 2601 and 2603 may be displayed when a user selects element 2401b of FIG. 24, and the user is guided to complete the "Car" stage of the claim estimate. Screens 2601a and 2603a may comprise frames that display instructions to the user on how to complete the "Car" stage of the claim estimate. A user may scroll from screen 2601a to screen 2603a with a gesture that interacts with the display of the mobile device, such as a finger swipe. Upon reaching the conclusion of the instructions for the "Cars" stage of the claim estimate, the user may be directed to a screen for taking photos and/or video of the damaged areas for the vehicle. For instance, the user may be directed to a screen similar to screen 507 of FIG. 5a.

In certain aspects of the disclosure, the application may instruct the user to take several photos of the vehicle, as described above. The user may be prompted to preview and approve the photos. If the user does not approve, the photo may be retaken. In an example, the user may be instructed to take at least four photos of the vehicle, each from a different angle. In this example, one or more screens may instruct the user to take the four photos of the vehicle. Screen 2701 may comprise a display screen where the user may select to take a photo of the vehicle. Screen 2701 may allow the user to select button 2703a to start the camera functionality within the mobile device and the "Cancel" button 2703b may be selected to cancel out of Screen 2701.

In an embodiment, when a user selects button 2703a in screen 2701, the mobile device may display a shutter screen to indicate that a photo is being taken. When a user selects button 2703c a photo that has been taken may be reviewed, as previously described. In some aspects of the disclosure, screen 2701a comprises a display portion of screen 2701 that displays a view finder for a camera functionality within the mobile device. For example, the image displayed on screen 2701a may indicate the picture that will be taken when button 2703a is selected. Screen 2701a may include on or more guides 2701b. For example screen 2701a displays guides for orienting a user that is taking a picture from an angle that captures the front and driver-side portions of a vehicle. In aspects of the disclosure, screen 2701a may include guides for taking pictures of a vehicle from various angles, for taking pictures of a certain portions of a vehicle, for instance pictures of damaged portions or pictures of a VIN number, or for any other suitable purpose.

Once the photos of the vehicle from various angles have been taken and have been approved by the user, the application may direct the user to the next stage of the claim estimate. For example, the user may be directed to the "Capture Vehicle ID" stage of the claim estimate. In another embodiment, the user may be directed to a screen similar to screen 2401 of FIG. 24, and element 2401c may be selectable because the "Damaged Areas" stage and the "Car" stage of the claim estimate have been previously completed. In this embodiment, the user may select element 2401c and may further be directed to complete the "Capture Vehicle ID" stage of the claim estimate.

FIG. 28 shows display screens displayed to a user of a mobile device in accordance with at least one aspect of the present disclosure. Screens 2801 and 2803 show instruction display screens displayed to a user in accordance with at least one aspect of the present disclosure. For example, screens 2801 and 2803 may be displayed when a user selects element 2401c of FIG. 24, and the user is guided to complete the "Capture Vehicle ID" stage of the claim estimate. Screens 2801a and 2803a may comprise frames that display instructions to the user on how to complete the "Capture Vehicle ID" stage of the claim estimate. A user may scroll from screen 2801a to screen 2803a with a gesture that interacts with the display of the mobile device, such as a finger swipe. Upon reaching the conclusion of the instructions for the "Capture Vehicle ID" stage of the claim estimate, the user may be directed to a screen for taking photos and/or video of the damaged areas for the vehicle. For instance, the user may be directed to a screen similar to screen 507 of FIG. 5a. In some embodiments, the vehicle ID may be entered by the user, for example, using one or more text input fields included in the application.

Once the vehicle ID has been entered, the application may direct the user to the next stage of the claim estimate. For example, the user may be directed to the "Enter Claim Information" stage of the claim estimate. In another embodiment, the user may be directed to a screen similar to screen 2401 of FIG. 24, and element 2401d may be selectable because the "Damaged Areas" stage, the "Car" stage, and the "Enter Vehicle ID" stage of the claim estimate have been previously completed. In this embodiment, the user may select element 2401d and may further be directed to complete the "Enter Claim Information" stage of the claim estimate.

Figure 29:
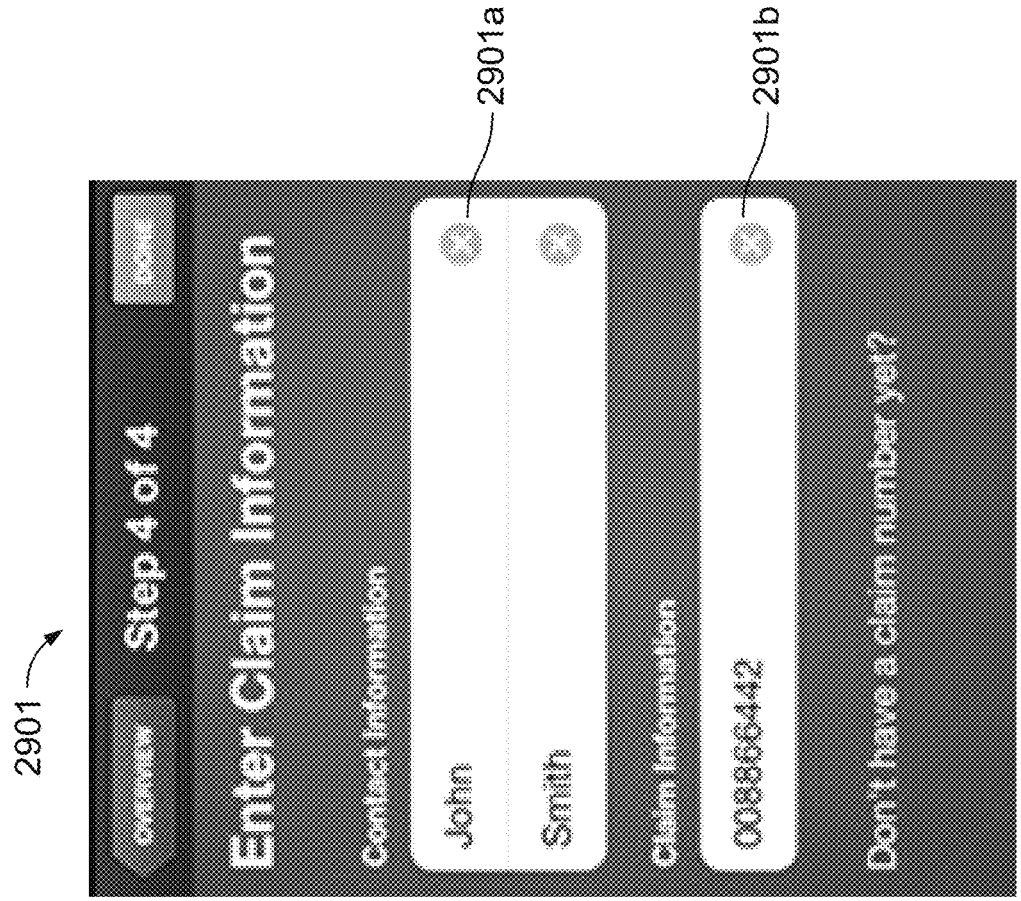
FIG. 29 shows a display screen displayed on a user device for providing user instructions for inputting data related to a claim associated with an insured item at a fourth stage, in accordance with certain aspects of the present disclosure.

FIG. 29 shows a display screen displayed to a user of a mobile device in accordance with at least one aspect of the present disclosure. Screen 2901 shows an input display screen displayed to a user in accordance with at least one aspect of the present disclosure. For example, 2901 may be displayed when a user selects element 2401d of FIG. 24, and the user is guided to complete the "Enter Claim Information" stage of the claim estimate. Screen 2901 may comprise text fields that may be used to input claim information to the application. For example, screen 2901 may comprise one or more text input fields 2901a used to input a name for the claim and text input field 2901b used to input a claim number for the claim. In some embodiments, claim information may be omitted and any suitable identification information used to identify the claimant can be used.

Once the claim information has been entered, the application may direct the user to the next stage of the claim estimate. For example, the user may be asked to submit the completed estimate. In an embodiment, the user may be directed to a screen similar to screen 2401 of FIG. 24, and element 2401e may be selectable because the "Damaged Areas" stage, the "Car" stage, the "Enter Vehicle ID" stage, and the "Enter Claim Information" stage of the claim estimate have been previously completed. In this embodiment, the user may select element 2401e and the application may accordingly submit the claim estimate for processing.

Figure 30:
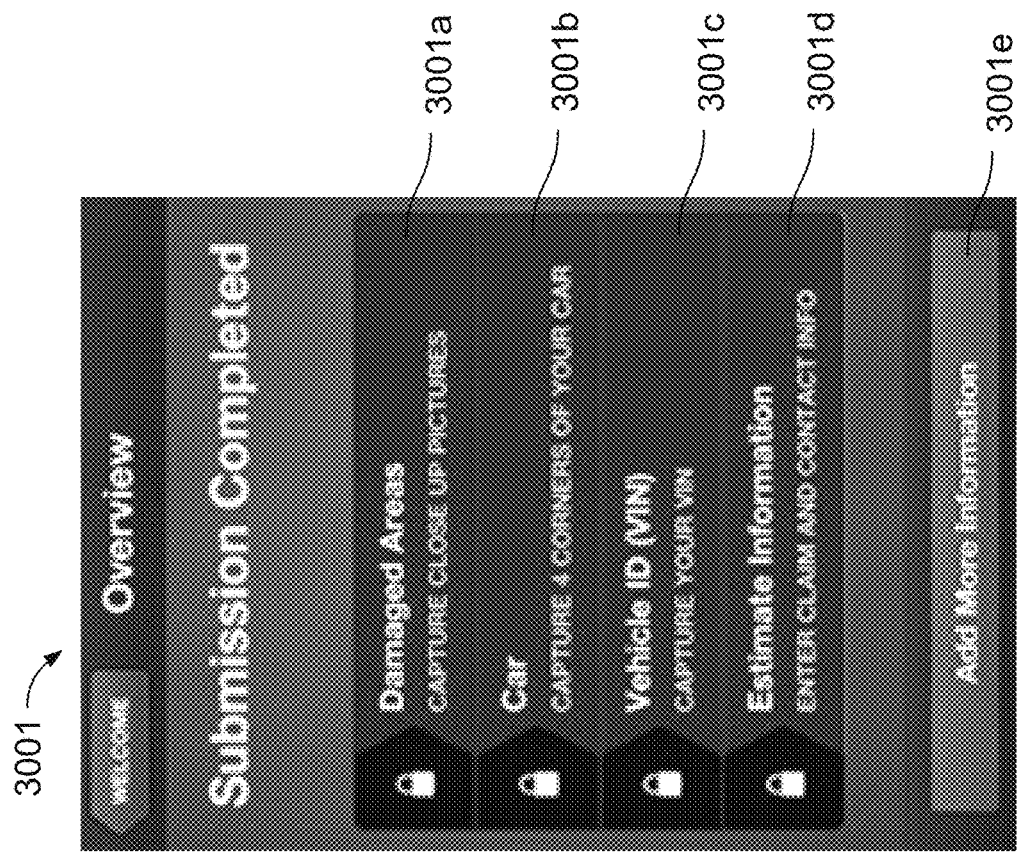
FIG. 30 shows a display screen displayed on a user device for submitting a claim associated with an insured item, in accordance with certain aspects of the present disclosure.

In some aspects of the disclosure, once a claim has been submitted for processing, one or more portions of the application may be locked. FIG. 30 shows a display screen displayed to a user of a mobile device in accordance with at least one aspect of the present disclosure. Screen 3001 may be similar to screen 2401 of FIG. 24, as described above. In an embodiment, screen 3001 may display locked portions of the application. For example, User interface element 3001a may be associated with a "Damaged Areas" stage, user interface element 3001b may be associated with a "Car" stage, user interface element 3001c may be associated with a "Vehicle ID" stage, and user interface element 3001d may be associated with a "Estimate Information" stage, and, in some aspects of the disclosure, one or more of these elements may not be selectable because one or more of the stages for the claim estimate may be locked. Display 3001 may indicate that one or more stages are locked by displaying a lock, or any other suitable indication, next to the user interface element corresponding to the stage. In addition, user interface element 3001e may also be locked based on the submission of the claim estimate.

In some aspects of the disclosure, the claim estimate may be submitted to, for example, server 101 for processing. The processing may include a review of the submitted claim estimate, such as a review of the information submitted for the claim estimate and the photos and/or videos submitted for the claim estimate. In an embodiment, the review may comprise a user reviewer that reviews the submitted claim estimate.

In some embodiments, a review may determine that one or more portions of the submitted claim estimate are unacceptable. For example, a review may determine that one or more submitted photos for the claim estimate are unacceptable, as described above. The photos may be unacceptable based on a determination that they are blurry, they do not capture the damage, they were not taken in accordance with instructions, or any other suitable considerations. In some aspects of the disclosure, server 101 may send one or more messages to the mobile device about the claim estimate.

Figure 31:
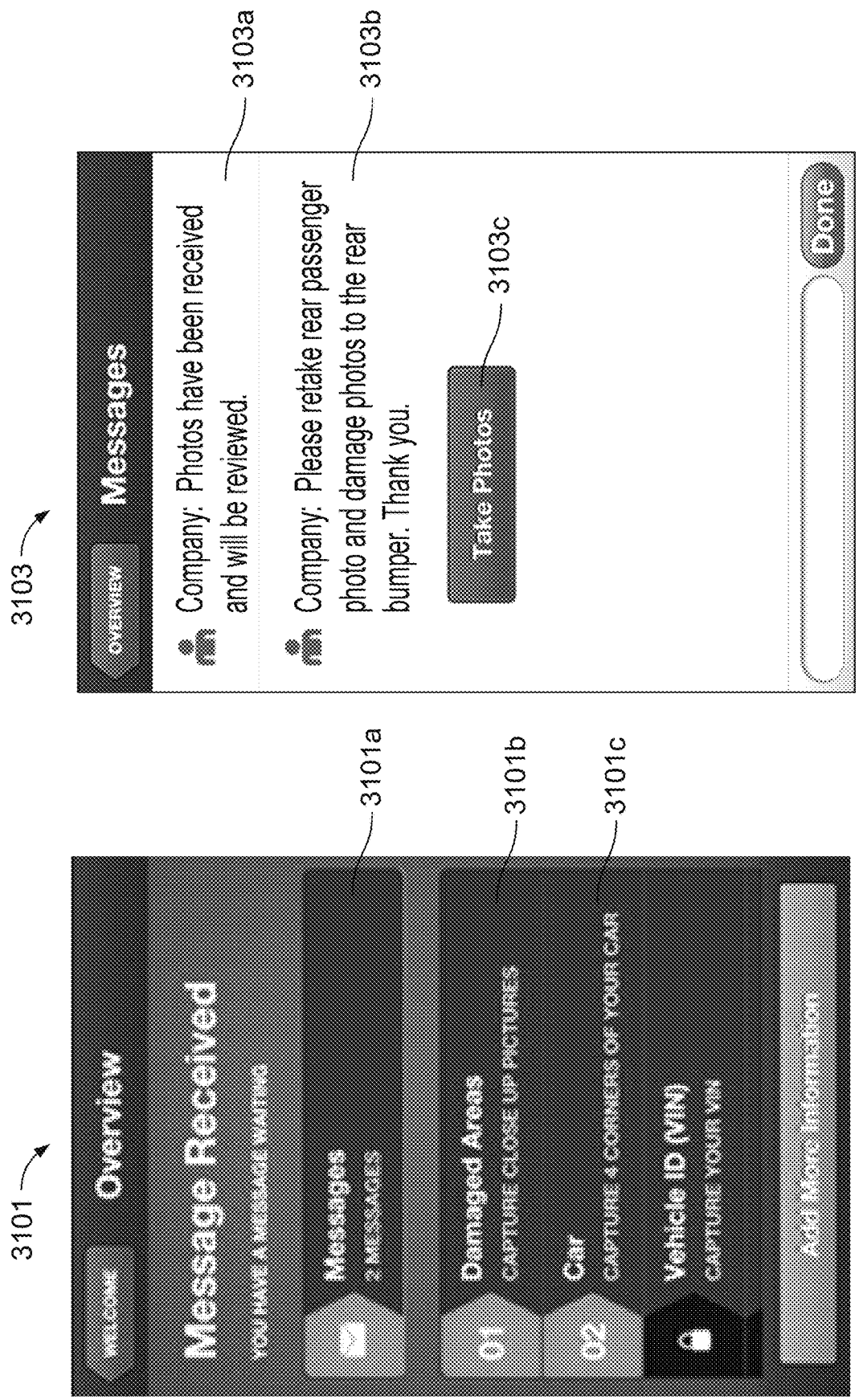
FIG. 31 shows multiple display screens displayed on a user device for displaying a message to a user about a submitted claim, in accordance with certain aspects of the present disclosure.

FIG. 31 shows display screens displayed to a user of a mobile device in accordance with at least one aspect of the present disclosure. Screens 3101 and 3103 show messaging display screens displayed to a user in accordance with at least one aspect of the present disclosure. For example, screens 3101 and 3103 may be displayed when a mobile device receives a message about a submitted claim estimate. Screen 3101 may comprise user interface element 3101a, that indicates one or more messages have been received. The user may select element 3101a to launch a messaging display such as screen 3103. Screen 3103 may display one or more message to a user. For example, screen 3103 displays message 3103a and 3103b. Message 3103b may comprise a message that instructs the user to take additional actions for the claim estimate. In this example, message 3103b instructs the user to retake a car photo from the angle of the rear passenger and a damage photo of the rear bumper.

In some aspects, based on a received message that instructs the user to take additional photos, one or more portions of a locked application may be unlocked. For example, based on received message 3103b, user interface element 3101b and user interface element 3101c may be selectable. Selecting user interface element 3101b may direct a user to the "Damages" stage of the claim estimate so that one or more damages photos may be taken. Selecting user interface element 3101b may direct a user to the "Car" stage of the claim estimate so that one or more vehicle photos may be taken. Accordingly, based on received message 3103b, the "Damages" stage and/or the "Car" stage of the claim estimate may be unlocked. In some aspects, the mobile device may ping server 101 to unlock one or more portions of a locked application.

In an embodiment, message 3103b may include button 3103c that guides the user to take the one or more photos that message 3103b instructs the user to take. For example, selecting button 3013c may guide the user to one or more the "Damages" stage of the claim estimate and/or the "Car" stage of the claim estimate so that the user may take additional photos.

Once the user takes the additional photos, the user may submit the claim estimate. In an embodiment, the user may be directed to a screen similar to screen 2401 of FIG. 24, and element 2401e may be selectable because the "Damaged Areas" stage, the "Car" stage, the "Enter Vehicle ID" stage, and the "Enter Claim Information" stage of the claim estimate have been previously completed. For example, the additional photos request in a received message may have been taken. In this embodiment, the user may select element 2401e and the application may accordingly submit the claim estimate for processing.

In some aspects of the disclosure, once a claim has been submitted for processing, one or more portions of the application may be re-locked. For example, a screen similar to screen 3001 of FIG. 30 may be displayed to the user. After received message 3103b of FIG. 31 unlocked portions of the application, such as the "Damages" stage of the claim estimate and the "Car" stage of the claim estimate, these portions may be re-locked based on the newly submitted claim estimate.

Figure 32:
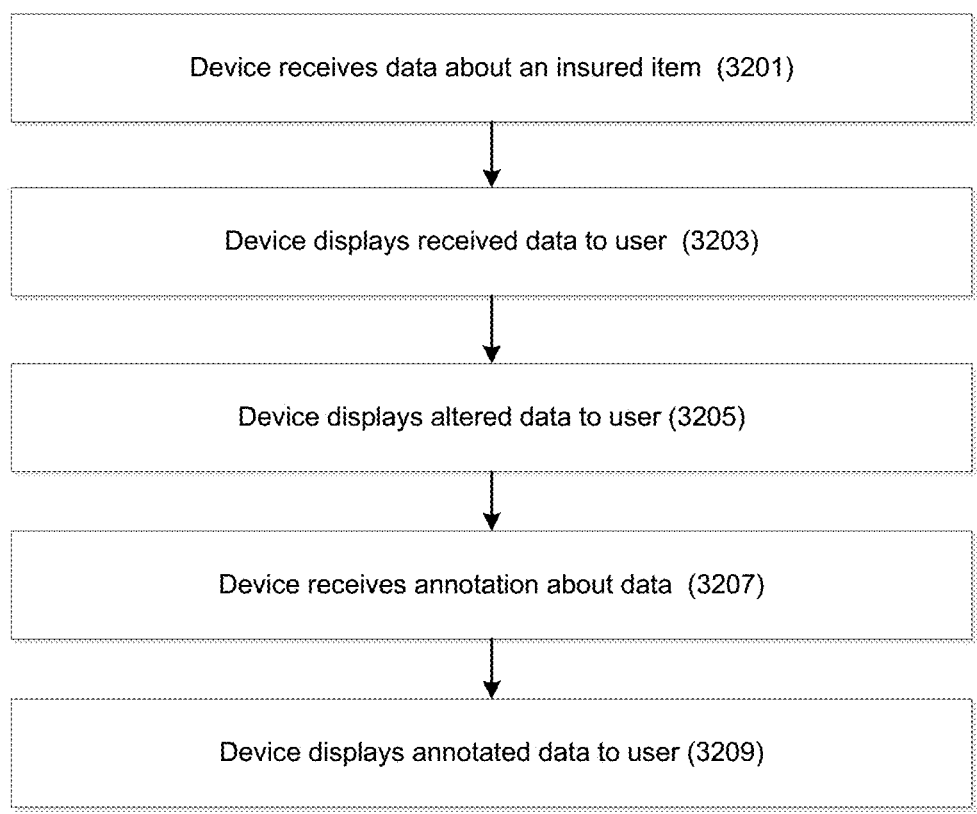
FIG. 32 shows a flow chart for displaying and annotating received data in accordance with certain aspects of the present disclosure.

FIG. 32 shows an annotation process 3200 in accordance with at least one aspect of the present disclosure. In certain aspects, a mobile device (e.g., iPad™, iPhone™ Android™, etc.) may transmit data to a server, such as server 101, to facilitate one or more steps of the process in FIG. 32. For example, a mobile device that implements the process of FIG. 22 may interact with a server that implements the process of FIG. 3. The transmitted data may comprise photos and/or video of an insured item (e.g., a vehicle). The process of FIG. 32 may be implemented to annotate and/or alter photos and/or video received about the insured item. In an example, server 101, terminal 141, and/or terminal 151 may implement the process of FIG. 32. In some aspects of the disclosure, the device implementing the process of FIG. 32 may comprise a multi-touch screen (e.g., a tablet computer).

The process of FIG. 32 may start out at step 3201 where a device (e.g., server 101, terminal 141, and/or terminal 151) may receive data (e.g., photos and/or video) about an insured item (e.g., a vehicle). In an example, the data may be received based on the processes of FIG. 3 and/or FIG. 22. In some aspects of the disclosure, the data may comprise photos of a vehicle that has been involved in an accident.

The process may then move to step 3203 where the device displays the data to a user. For example, a device (e.g., server 101, terminal 141 and/or terminal 151) may display received data (e.g., photos and/or video) to a user. In an example, the user may comprise a claims processor, an administrator, or any other suitable user.

The process may then move to step 3205 where the device displays altered data to a user. For example, a device (e.g., server 101, terminal 141 and/or terminal 151) may display altered data (e.g., photos and/or video) to a user (e.g., claims processor, administrator, and the like). In an example, the altered data may comprise the received photos and/or videos that have been altered, for example, by the user. As described below, displaying altered data may comprise displaying a received photo using one or more filters that alter the photo.

The process may then move to step 3207 where the device receives annotations about the received data. For example, a device (e.g., server 101, terminal 141 and/or terminal 151) may receive annotations about data (e.g., photos and/or video) from a user (e.g., claims processor, administrator, and the like). In an example, the annotations may comprise annotations about received photos and/or videos. In some aspects of the disclosure, the annotations may comprise data about damage to an insured item (e.g., a vehicle) displayed in a received photo. As described below, the annotations may comprise damage data and may further include a severity for the damage, a type for the damage, the estimated cost to repair or replace a damaged part, an indication of whether the damage has resulted from a previous but unrelated incident, an indication of whether the damage has resulted from a previous but related incident (e.g., indicating that the same part was damaged in a prior incident as well as the current incident), and an impact for the damage. The process may then move to step 3209 where the device displays the annotated data to the user. For example, the device may display a received photo to the user, and the device may also display received annotations about the photo along with the photo (e.g, on top of the photo and/or near the photo) to the user.

In some aspects of the disclosure, the device implementing the process of FIG. 32 may comprise a multi-touch screen (e.g., a tablet computer) and alterations to the data and/or annotations about the data may be received from the user via the multi-touch screen. In some embodiments, the process of FIG. 32 may comprise additional steps, may omit described steps, and/or may be performed in a different order.

Figure 33:
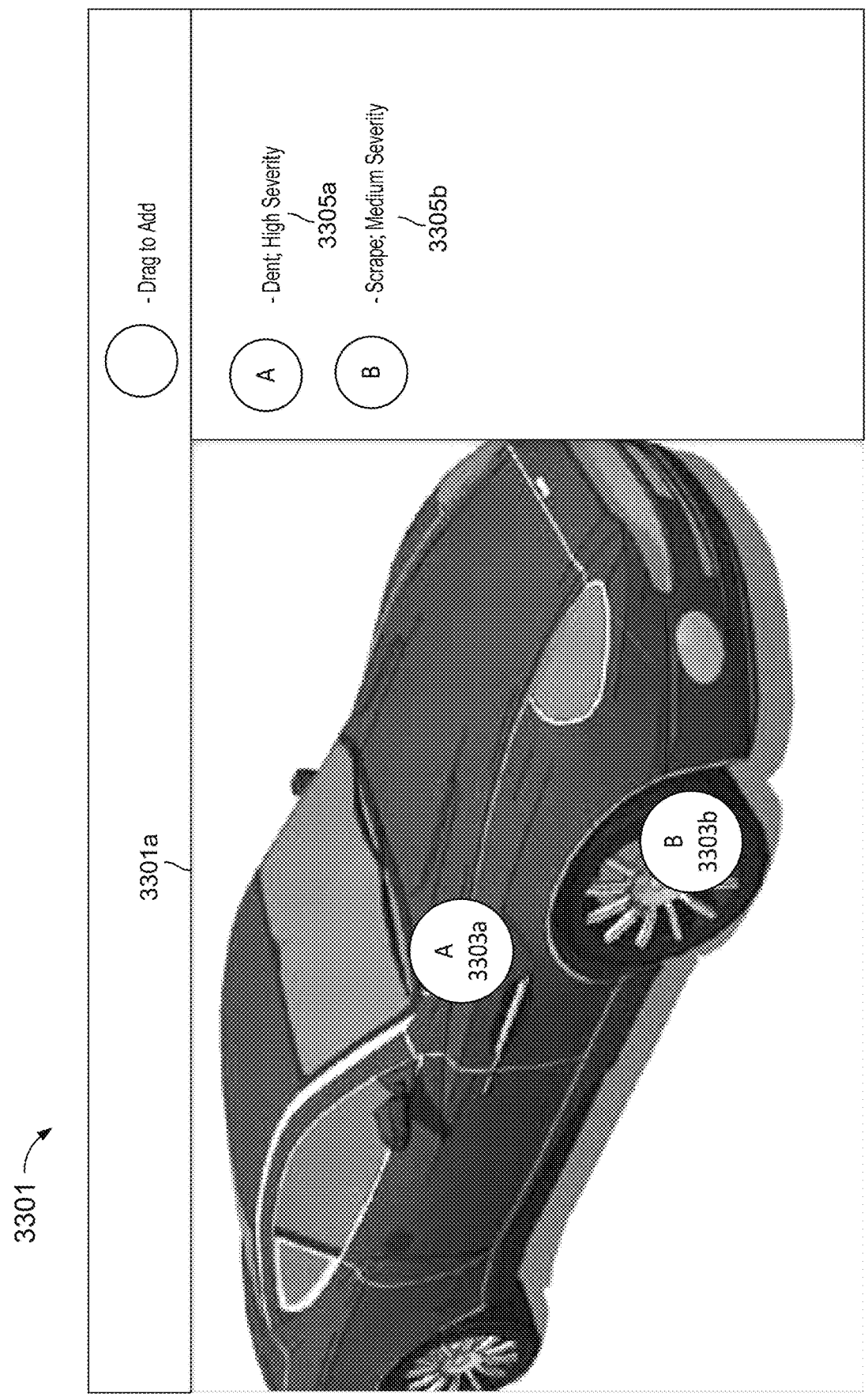
FIG. 33 shows a display screen for displaying and annotating received data in accordance with certain aspects of the present disclosure.

FIG. 33 shows a display screen displayed to a user of a device in accordance with at least one aspect of the present disclosure. Screen 3301 shows an annotation display screen displayed to a user in accordance with at least one aspect of the present disclosure. For example, screen 3301 may display photo 3301a, such as a photo about an insured item (e.g., a vehicle). Photo 3301a may comprise a photo of a vehicle that has been in an accident may show damage to the vehicle. In an embodiment, annotations 3303a and 3303b may comprise damage annotations that indicate the damage displayed at a portion of the photo. Annotations 3305a and 3305b may comprise descriptions for damage annotations, such as damage annotations 3303a and 3303b.

In an embodiment, damage annotation 3303a may indicate damage at a portion of photo 3301a and annotation 3305a may describe the damage indicated by damage annotation 3303a. In this example, damage annotation 3303a comprises a dent of high severity, as described by annotation 3305a. In another example, damage annotation 3303b may indicate damage at a portion of photo 3301a and annotation 3305b may describe the damage indicated by damage annotation 3303b. In this example, damage annotation 3303b comprises a scrape of medium severity, as described by annotation 3305b.

In certain aspects of the disclosure, the damage annotations displayed in FIG. 33 may be generated using a touch display, such as a tablet, a touch screen laptop, or any other suitable device. For example, a display similar to the displays illustrated in FIGS. 34 through 35.

Figure 34:
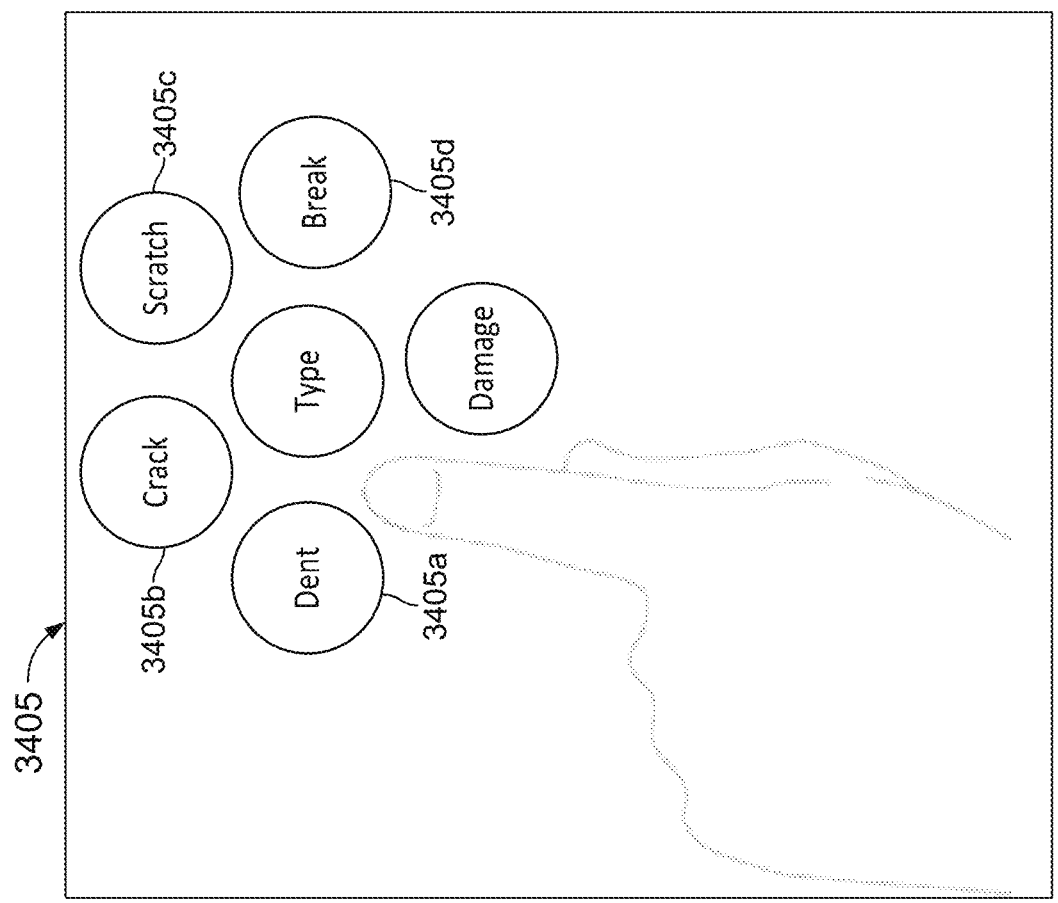
FIG. 34 shows multiple display screens for generating an annotation about damage to an insured item in accordance with certain aspects of the present disclosure.
Figure 34:
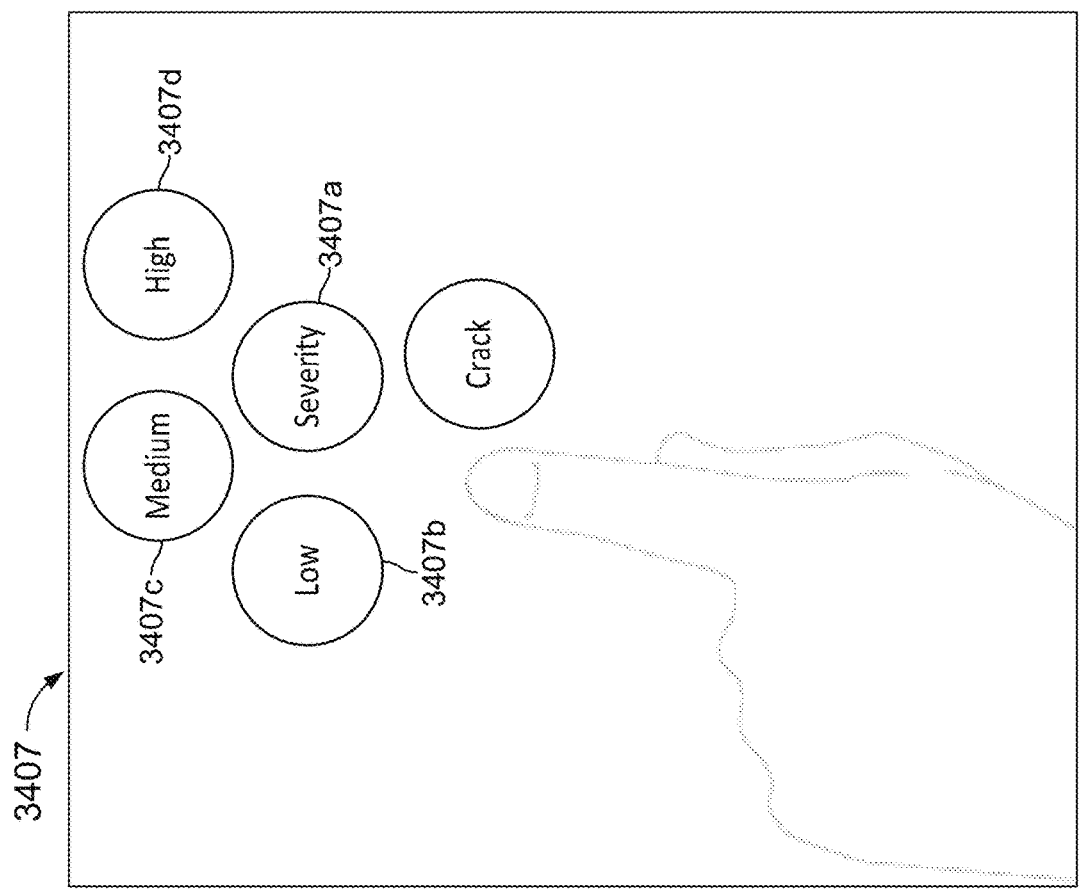

FIG. 34 shows display screens in accordance with at least one aspect of the present disclosure. Screen 3401 shows an annotation display screen that may receive input from a user in accordance with at least one aspect of the present disclosure. For example, screen 3401 may display to a user a screen similar to screen 3301 of FIG. 33. A user may interact with screen 3401, for example by touch, to input an annotation, as described above with reference to FIG. 33.

In an embodiment, once a user touches the display, a display screen such as screen 3403 may be displayed. For example, one or more interfaces, such as interfaces 3403a, 3403b, 3403c, and 3403d may be displayed. Interface 3403a may comprise a damage interface that indicates a damage annotation. Interfaces 3403b, 3403c, and 3403d may comprise interfaces that allow input of additional damage information. For example, a user may select interface 3403b to input severity information, 3403c to input type information, and 3403d to input impact information. A user may select an interface by touching the display.

In an example, when a user selects the type interface 3403c, a display screen such as screen 3405 may be displayed to the user. For example, one or more interfaces, such as interfaces 3405a, 3405b, 3405c, and 3405d may be displayed. Interfaces 3405a, 3405b, 3405c, and 3405d may comprise interfaces that allow input of additional damage information about the type of damage. For example, a user may select interface 3405a to indicate a dent type damage, 3405b to indicate a crack type damage, 3405c to indicate a scratch type damage, and 3405d to indicate a break type damage. In some embodiments, any other suitable interfaces that indicate any suitable damage type may be included.

In an example, when a user selects the crack interface 3405*b*, a display screen such as screen 3407 may be displayed to the user. For example, one or more interfaces, such as interfaces 3403*a*, 3403*b*, 3403*c*, and 3403*d* may be displayed. Interface 3403*a* may comprise a severity interface that indicates a severity for the damage annotation. Interfaces 3407*b*, 3407*c*, and 3407*d* may comprise interfaces that allow input of additional information about the severity of the damage. For example, a user may select interface 3407*b* to indicate low severity, 3407*c* to indicate medium severity, and 3407*d* to indicate high severity. In some embodiments, any other suitable interfaces that indicate any suitable damage severity may be included.

In an example, a user may select type interface 3403*c* from display screen 3403, crack interface 3405*b* from display screen 3405, and severity interface 3407*d* from display screen 3407 to indicate a high severity. In this example, a damage annotation may be generated, where the annotation comprises a crack type damage with a high severity.

FIG. 35 shows a display screen in accordance with at least one aspect of the present disclosure. Screen 3501 shows an annotation display screen that may receive input from a user in accordance with at least one aspect of the present disclosure. For example, screen 3501 may display to a user a screen similar to screen 3301 of FIG. 33. A user may interact with screen 3501, for example by touch, to input an annotation, as described above with reference to FIG. 33.

In an embodiment, once a user touches the display, a display screen such as screen 3501 may be displayed. For example, one or more interfaces, such as interfaces 3501*a*, 3501*b*, 3501*c*, and 3501*d* may be displayed. Interface 3501*a* may comprise a damage interface that indicates a damage annotation. Interfaces 3501*b*, 3501*c*, and 3503*d* may comprise interfaces that allow input of additional damage information. For example, a user may select interface 3501*b* to input severity information, 3501*c* to input type information, and 3501*d* to input impact information. In some embodiments, a user may select an interface by touching the display with a member, such as a finger, and holding the member on the display until interfaces 3501*a*, 3501*b*, 3501*c*, and 3501*d* are displayed, for example, by the device. Interface 3501*a* may be displayed near the member, and the user may drag the member to one of interfaces 3501*b*, 3501*c*, and 3501*d* to select the interface.

In an example, when a user selects the severity interface 3501*b*, a display screen such as screen 3503 may be displayed to the user. For example, one or more interfaces, such as interfaces 3503*a*, 3503*b*, and 3503*c* may be displayed. Interfaces 3503*a*, 3503*b*, and 3503*c* may comprise interfaces that allow input of additional damage information about the severity of damage. Here the interfaces may be displayed as concentric circles, as shown in FIG. 35, and the user may drag a member to the corresponding concentric circle to select a severity (e.g., low, medium, high). In some embodiments, any other suitable interfaces that indicate any suitable damage type may be included.

Figure 36:
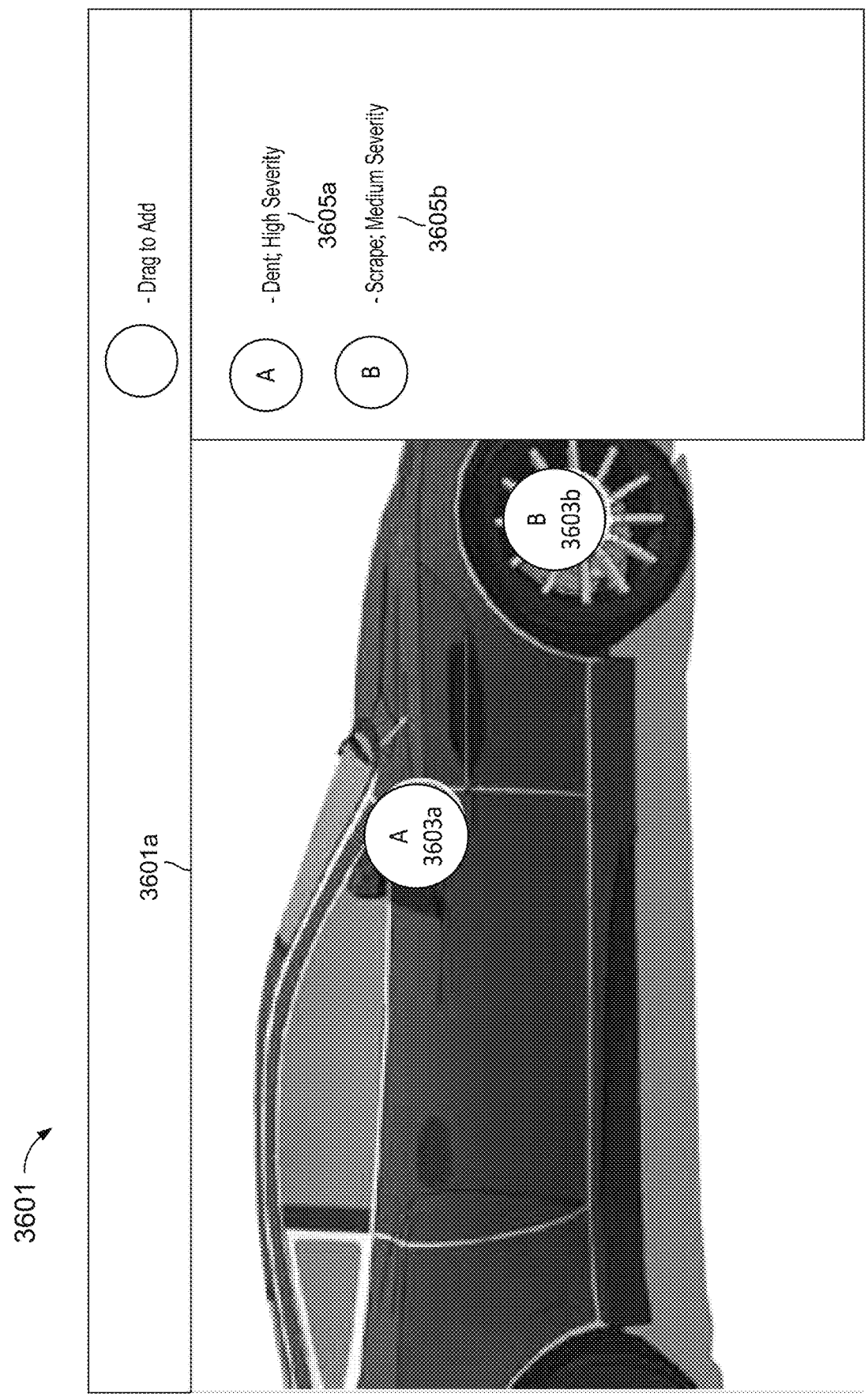
FIGS. 36 and 37 show display screens for displaying received data and displaying annotations describing the received data in accordance with certain aspects of the present disclosure.

FIG. 36 shows a display screen displayed to a user of a device in accordance with at least one aspect of the present disclosure. Screen 3601 shows an annotation display screen displayed to a user in accordance with at least one aspect of the present disclosure. Screen 3601 may be similar to screen 3301 of FIG. 33. For example, screen 3601 may display photo 3601*a*, such as a photo about an insured item (e.g., a vehicle). In this example, the displayed photo 3601*a* may be related to the displayed photos 3301*a*. For instance, photos 3301*a* and 3601*a* may display photos from the same event (e.g., an accident) and of the same insured item (e.g., a vehicle). Photos 3301*a* and 3601*a* comprise photos from different angles of the insured item and may display various damages to the insured item. In an embodiment, annotations 3603*a* and 3603*b* may comprise damage annotations that indicate the damage displayed at a portion of the photo. Annotations 3605*a* and 3605*b* may comprise descriptions for damage annotations, such as damage annotations 3603*a* and 3603*b*.

Figure 37:
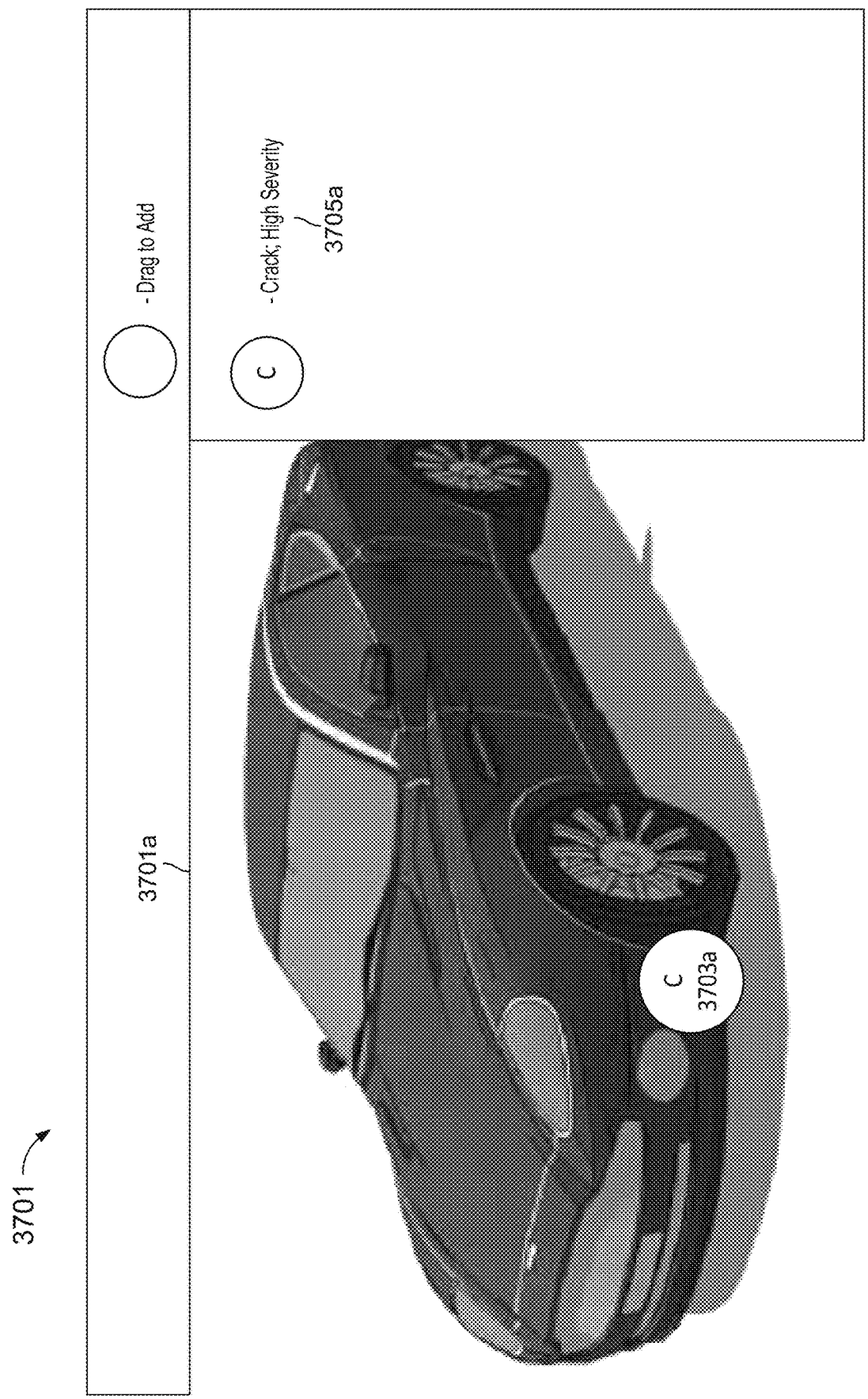

FIG. 37 shows a display screen displayed to a user of a device in accordance with at least one aspect of the present disclosure. Screen 3701 shows an annotation display screen displayed to a user in accordance with at least one aspect of the present disclosure. Screen 3701 may be similar to screen 3301 and 3601. For example, screen 3701 may display photo 3701*a*, such as a photo about an insured item (e.g., a vehicle). In this example, the displayed photo 3701*a* may be related to the displayed photos 3301*a* and 3601*a*. For instance, photos 3301*a*, 3601*a*, and 3701*a* may display photos from the same event (e.g., an accident) and of the same insured item (e.g., a vehicle). Photos 3301*a*, 3601*a*, and 3701*a* may comprise photos from different angles of the insured item and may display various damages to the insured item. In an embodiment, annotation 3703*a* may comprise a damage annotation that indicates the damage displayed at a portion of the photo. Annotations 3705*a* may comprise descriptions for damage annotations, such as damage annotations 3703*a*.

In an embodiment, damage annotation 3703*a* may indicate damage at a portion of photo 3701*a*. For example, a damage annotation may be generated using one or more screens of FIGS. 34 and 35. In this example, damage annotation 3703*a* comprises a crack of high severity, as described by annotation 3705*a*. Screens 3301*a* and 3601*a* may also show damage annotations related to, for example, an insured item displayed in photo 3701*a*.

Figure 38:
FIG. 38 shows a display screen for adjusting the display of received data using an interface in accordance with certain aspects of the present disclosure.

In an embodiment, one or more photos displayed to a user may be altered. FIG. 38 shows a display screen displayed to a user of a device in accordance with at least one aspect of the present disclosure. Screen 3801 shows an annotation display screen displayed to a user in accordance with at least one aspect of the present disclosure. Screen 3801 may be similar to screen 3301 of FIG. 33. For example, screen 3801 may display photo 3801*a*, such as a photo about an insured item (e.g., a vehicle). Screen 3801 may also display an interface, such as a lens, that alters the display of photo 3801*a*. In this example, interface 3803*a* comprises a lens interface that adjusts the brightness of displayed photo 3801*a*. Accordingly, a portion of photo 3801*a* may be displayed with a first brightness, and the portion of photo 3801*a* displayed within lens 3803*a* may be displayed with a second brightness different from the first brightness, where the second brightness is based on how interface 3803*a* is configured.

In an embodiment, a lens may be generated using interface 3803*b*. Interface 3803*b* may comprise elements 3805*a*, 3805*b*, 3805*c*, and 3805*d*. For example, a user may select one of elements 3805*a*, 3805*b*, 3805*c*, and 3805*d* with a member, for example a finger, by touching the display. The user may then drag from interface 3803*b* to photo 3801*a* to generate an interface similar to interface 3803*a*, such as a lens. In an embodiment, interface 3805*a* may be selected to generate a contrast interface. A contrast interface may display the portion of photo 3801*a* displayed within the contrast interface with a different contrast, similar to interface 3803*a*. In an embodiment, interface 3805*b* may be selected to generate a brightness interface, similar to interface 3803*a*. In an embodiment, interface 3805*c* may be selected to generate a tint interface. A tint interface may display the portion of photo 3801a displayed within the tint interface with a different tint, similar to interface 3803a. In an embodiment, interface 3805d may be selected to generate a zoom interface. A zoom interface may display the portion of photo 3801a displayed within the zoom interface with a different zoom, similar to interface 3803a.

Figure 39:
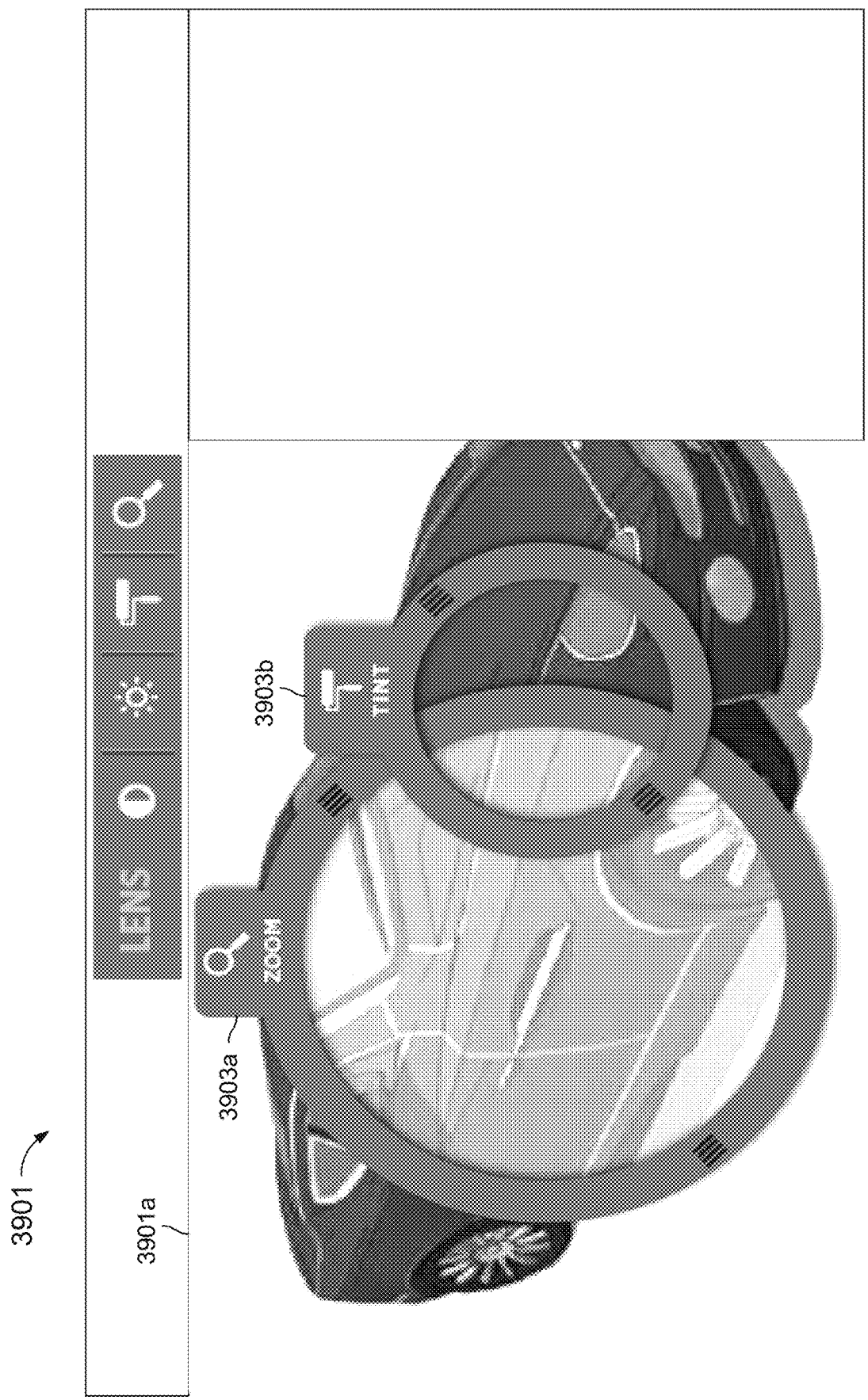
FIG. 39 shows a display screen for adjusting the display of received data using multiple interfaces in accordance with certain aspects of the present disclosure.

FIG. 39 shows a display screen displayed to a user of a device in accordance with at least one aspect of the present disclosure. Screen 3901 shows an annotation display screen displayed to a user in accordance with at least one aspect of the present disclosure. Screen 3901 may be similar to screen 3801. For example, screen 3901 may display photo 3901a, such as a photo about an insured item (e.g., a vehicle). Screen 3901 may display a plurality of interfaces 3903a and 3903b that comprise lens interfaces. In this example, interface 3903a comprises a zoom interface, and the portion of photo 3901a displayed within the lens interface displays photo 3901a with a different zoom, as previously described. Interface 3903b comprises a tint interface, and the portion of photo 3901a displayed within the tint interface displays photo 3901a with a different tint, as previously described.

In an embodiment, lens interfaces 3903a and 3903b may overlap such that a portion of photo 3901a is displayed within both interfaces 3903a and 3903b. In this example, the portion of photo 3901a that is displayed within both interfaces 3903a and 3903b may displayed with a different zoom and a different tint. Accordingly, the effect of both lens interfaces 3903a and 3903b may be applied to the portion of photo 3901a that is displayed within the interfaces.

Figure 40:
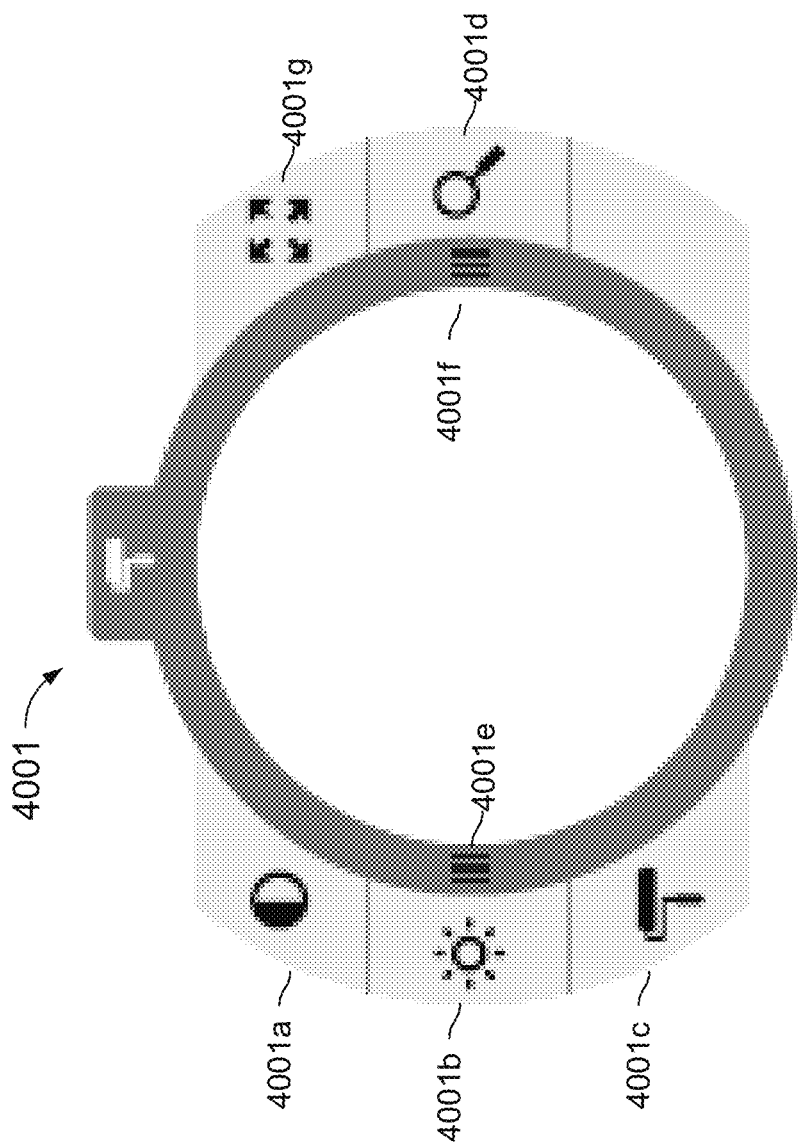
FIG. 40 shows an interface used to adjust the display of received data in accordance with certain aspects of the present disclosure.

In an embodiment, a user may select an interface, such as a lens interface, and a menu may be displayed to configure the interface. FIG. 40 shows an example lens interface in accordance with at least one aspect of the present disclosure. Lens interface 4001 comprises a menu to configure the lens interface in accordance with at least one aspect of the present disclosure. Elements 4001a, 4001b, 4001c, and 4001d may be selected in order to alter the effect of the lens interface (e.g., display a portion of a photo with a different contrast, brightness, tint, or zoom). Elements 4001e and 4001f may be selected to adjust the size of the lens interface. For example, one or more of elements 4001e and 4001f may be selected by a user with a member, for example a finger, by touching the display and the elements may be dragged to enlarge or shrink the lens interface.

Element 4001g may be selected to enlarge the lens to full screen mode. In this embodiment, a full screen lens may adjust the display of a photo, such as photo 3901a, such that the effect of the lens is displayed across the entire photo. For example, a tint lens may be displayed, where a portion of photo 3901a may be displayed with a first tint, and a portion of photo 3901a displayed within a tint lens, such as lens 3903b, may be displayed with a second tint different from the first tint. When a tint lens such as lens 3903a is enlarged to full screen mode, the entire portion of photo 3901a may be displayed with the second tint. In this example, another lens, such as lens 3903a, may also be displayed, and the portion of photo 3901a displayed within lens 3903a when tint lens 3903b is in full screen mode may comprise the effect of both 3903a and 3903b, such as when lenses overlapped as described above.

Figure 41:
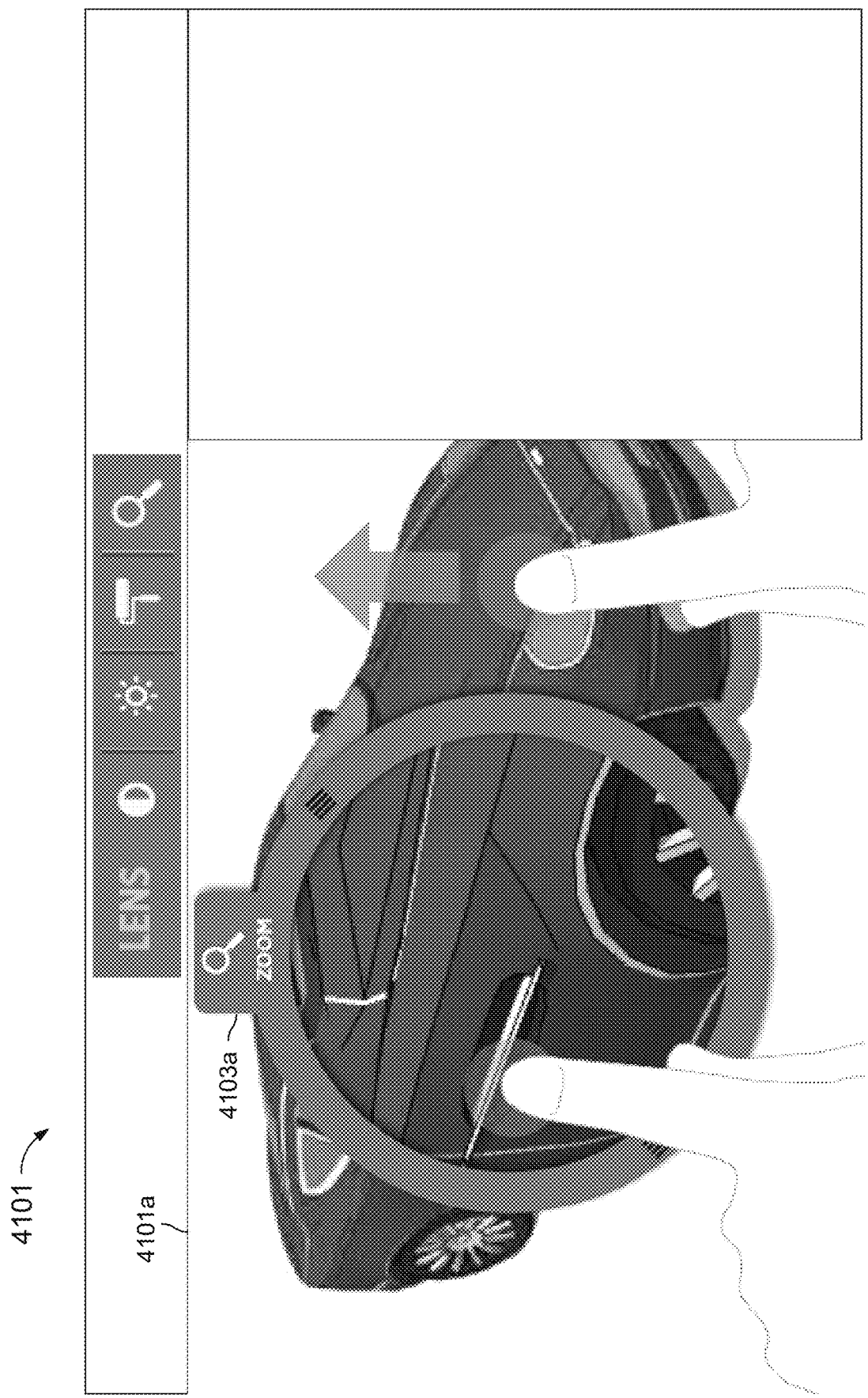
FIG. 41 shows a display screen for configuring an interface used to adjust the display of received data in accordance with certain aspects of the present disclosure.

FIG. 41 shows a display screen displayed to a user of a device in accordance with at least one aspect of the present disclosure. Screen 4101 shows an annotation display screen displayed to a user in accordance with at least one aspect of the present disclosure. Screen 4101 may be similar to screen 3901. For example, screen 4101 may display photo 4101a, such as a photo about an insured item (e.g., a vehicle). Screen 4101 may display interface 4103a that comprises a lens interface. In this example, interface 4103a comprises a zoom interface. For interface 4103a, a portion of photo 4101a may be displayed with a first zoom, and the portion of photo 4101a displayed within lens 4103a may be displayed with a second zoom different from the first zoom, where the second zoom is based on how interface 3803a is configured. In this example, the effect of zoom lens 4103a, that is the second zoom, may be adjusted by a user. In an embodiment, a user may select the inside portion of interface 4103a with a member, for example a finger, by touching the display. The user may then select outside of interface 4103a using a second member, for example a finger, by touching the display. The user may then drag the second member to adjust the effect of interface 4103a. In this example, the user may drag the second member up to increase the zoom effect and drag the second finger down to decrease the zoom effect of interface 4103a.

In an embodiment, the user may be displayed altered photos of, for example, an insured item, and may further generate one or more annotations based on the altered photos. Accordingly, a user may view one or more photos according to FIGS. 38-41 and may further generate damage annotations, as described above.

Figure 42:
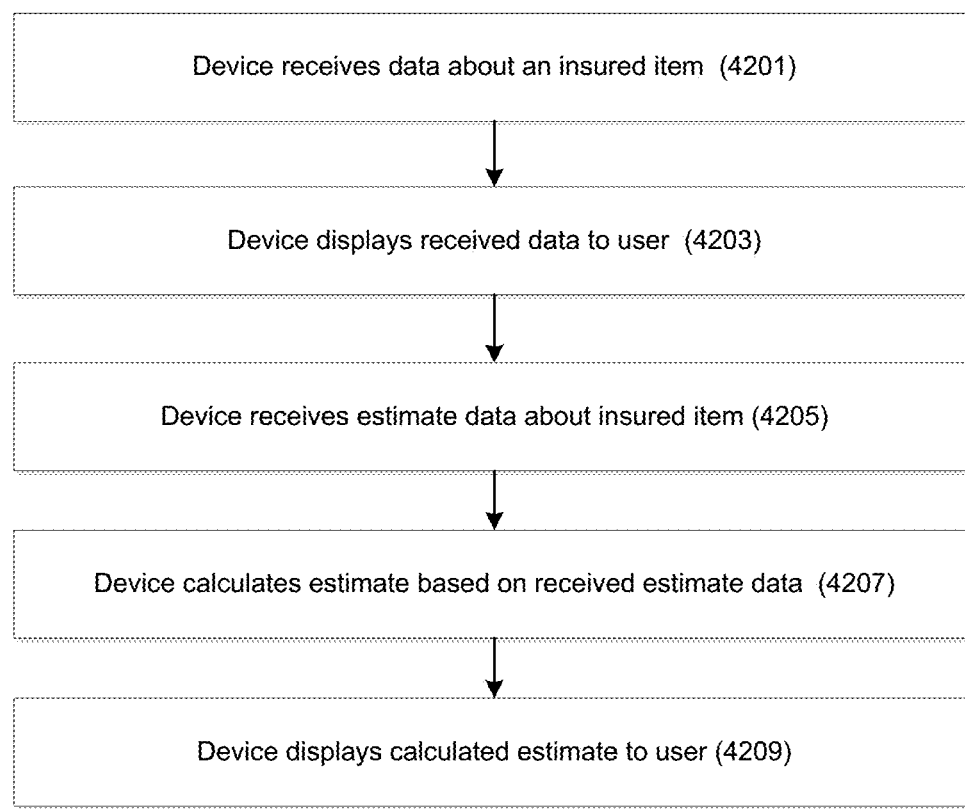
FIG. 42 shows a flow chart for displaying received data about an insured item and determining an estimate for the insured item in accordance with certain aspects of the present disclosure.

FIG. 42 shows an annotation process 4200 in accordance with at least one aspect of the present disclosure. In certain aspects, a mobile device (e.g., iPad™, iPhone™ Android™, etc.) may transmit data to a server, such as server 101, to facilitate one or more steps of the process in FIG. 42. For example, a mobile device that implements the process of FIG. 22 may interact with a server that implements the process of FIG. 3. The transmitted data may comprise photos and/or video of an insured item (e.g., a vehicle). The process of FIG. 42 may be implemented to generate an estimate about an insured item, such as a vehicle. In an example, server 101, terminal 141, and/or terminal 151 may implement the process of FIG. 42. In some aspects of the disclosure, the device implementing the process of FIG. 42 may comprise a multi-touch screen (e.g., a tablet computer).

In an embodiment, the process of FIG. 32 may be used in combination with the process of FIG. 42. For example, a user may annotate photos of an insured item based on the process of FIG. 32. Based on the annotated photos, an estimate may be generated for the insured item.

The process of FIG. 42 may start out at step 4201 where a device (e.g., server 101, terminal 141, and/or terminal 151) may receive data (e.g., photos and/or video) about an insured item (e.g., a vehicle). In an example, the data may be received based on the processes of FIG. 3, FIG. 22, and/or FIG. 32. In some aspects of the disclosure, the data may comprise photos of a vehicle that has been involved in an accident. In some embodiments, the received photos may comprise annotations.

The process may then move to step 4203 where the device displays the data to a user. For example, a device (e.g., server 101, terminal 141 and/or terminal 151) may display received data (e.g., photos and/or video) to a user. In an example, the user may comprise a claims processor, an administrator, or any other suitable user.

The process may then move to step 4205 where the device receives estimate data about the insured item. For example, a device (e.g., server 101, terminal 141 and/or terminal 151) may receive estimate data about an insured item (e.g. a vehicle) from a user (e.g., claims processor, administrator, and the like). In an example, the estimate data may be received based on one or more photos being displayed to the user. In some embodiments, the displayed photos may be displayed with one or more annotations, and the estimate data may be based on the one or more annotations. The received estimate data may comprise data related to a cost for repairing damage to the insured item and/or replacing portions of the insured item. For example, the received estimate data may be data about a damaged part or portion of the insured item.

The process may then move to step 3207 where the device calculates an estimate based on the received estimate data. For example, a device (e.g., server 101, terminal 141 and/or terminal 151) may receive estimate data about an insured item and calculate an estimate based on the received estimate data. In this example, the received estimate data may comprise data related to a cost for repairing damage to the insured item and/or replacing portions of the insured item, and the estimate may be calculated based on this data.

The process may then move to step 4209 where the device displays the calculated estimate. For example, a device (e.g., server 101, terminal 141 and/or terminal 151) may display the calculated estimate to a user (e.g., claims processor, administrator, and the like). In this example, the calculated estimate may comprise an aggregate of estimates for one or more repairs and/or replacements.

In some aspects of the disclosure, the device implementing the process of FIG. 42 may comprise a multi-touch screen (e.g., a tablet computer) and estimate data may be received from the user via the multi-touch screen. In some embodiments, the received data may be associated with claim information. For example, a claim may have been generated for an event, such as a vehicle accident, and the received data may comprise photos of a vehicle involved in the accident. The received data may be associated with generated claim, which may include a customer name, a date for the event, a description for the event, a location for the event, a location for the customer, a VIN number for the vehicle, a policy number, and any other suitable claim information. The process of FIG. 42 may comprise additional steps, may omit described steps, and/or may be performed in a different order.

Figure 43:
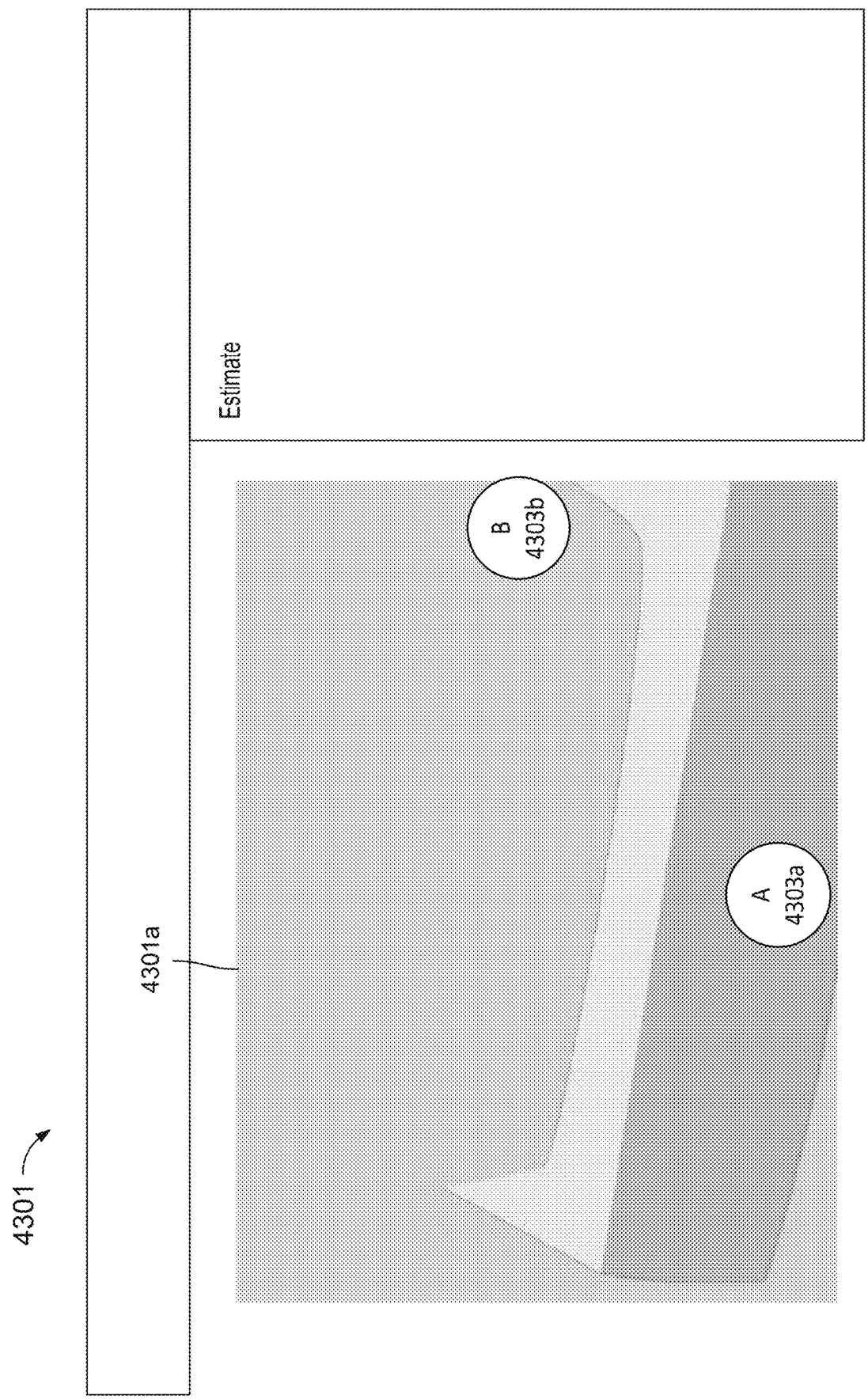
FIG. 43 shows a display screen for displaying received data and received annotations about the received data in accordance with certain aspects of the present disclosure.

FIG. 43 shows a display screen displayed to a user of a device in accordance with at least one aspect of the present disclosure. Screen 4301 shows an estimate display screen displayed to a user in accordance with at least one aspect of the present disclosure. For example, screen 4301 may display photo 4301a, such as a photo about an insured item (e.g., a vehicle). Photo 4301a may comprise a photo of a vehicle that has been in an accident may show damage to the vehicle. In an embodiment, annotations 4303a and 4303b may comprise damage annotations that indicate the damage displayed at a portion of the photo.

In certain aspects of the disclosure, annotations 4304a and 4303b may include a type of damage and a severity for the damage. For example, damage annotation 4303a may indicate damage at a portion of photo 4301a that comprises a dent of high severity. In some embodiments, the damage annotations may also indicate whether the damage displayed in a photo comprises incident damage or prior damage. For example, annotations 4304a may comprise damage related to an incident, such as a vehicle accident, while annotation 4304b may comprise prior damage that is not related to the incident.

Figure 44:
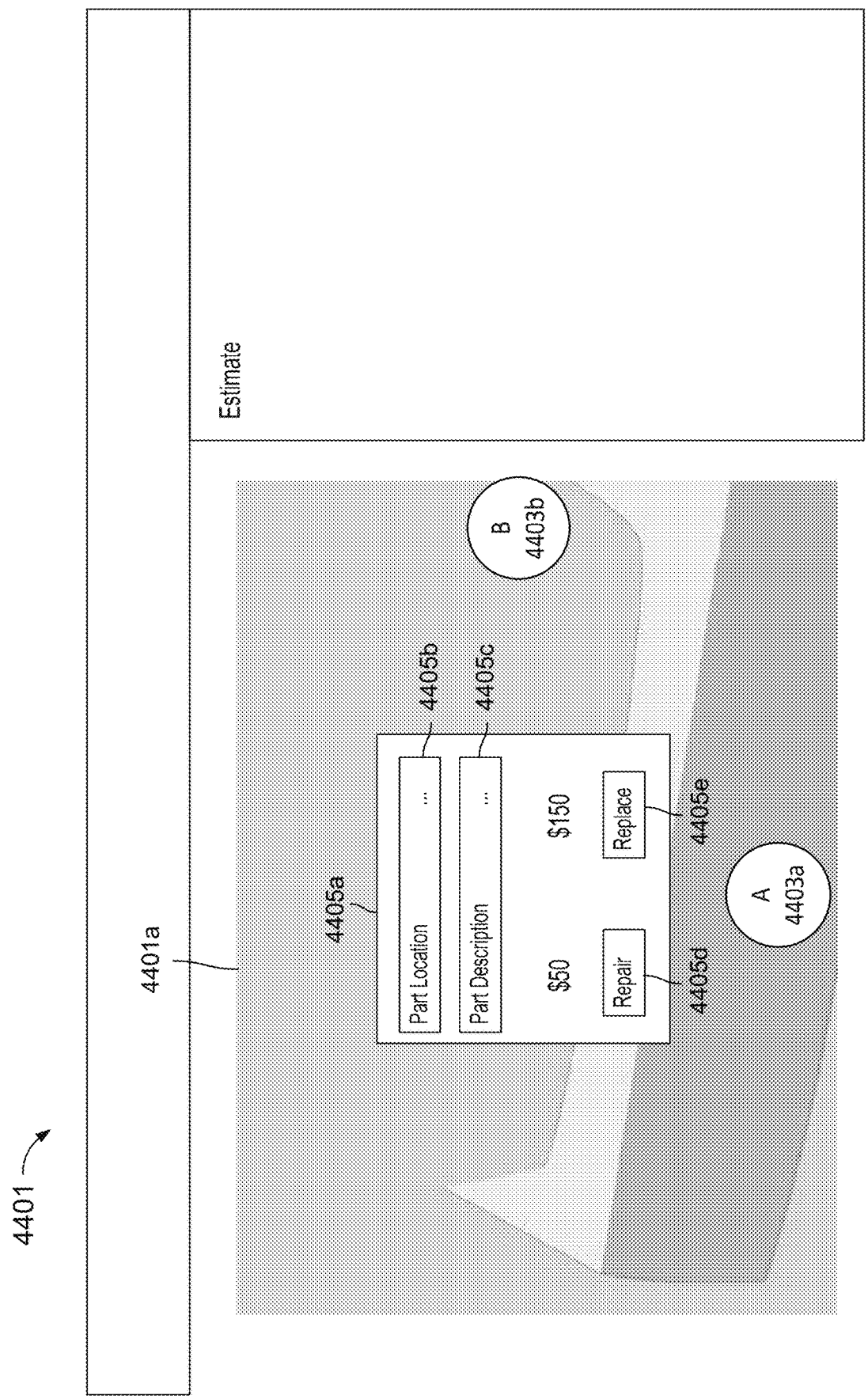
FIG. 44 shows a display screen for receiving part information about a damaged part of an insured item in accordance with certain aspects of the present disclosure.

In an embodiment, a damage annotation may be selected and estimate data may be input based on the selection. For example, a user may select a damage annotation with a member, such as finger, by touching the display. FIG. 44 shows a display screen displayed to a user of a device in accordance with at least one aspect of the present disclosure. Screen 4401 shows an estimate display screen displayed to a user in accordance with at least one aspect of the present disclosure. For example, screen 4401 may display photo 4401a, such as a photo about an insured item (e.g., a vehicle). In an embodiment, annotations 4303a and 4303b may comprise damage annotations that indicate the damage displayed at a portion of the photo. In an example where damage annotation 4403a has been selected, interface 4405a may be associated with damage annotation 4403a and the interface may further receive estimate data about the damage annotation.

Interface 4405a may comprise input field 4405b, where a part location may be input. For example, damage annotation 4403a may be located at the front of a vehicle, and input field 4405b may receive this location information. Interface 4405a may further comprise input field 4405c, where a part description may be input. For example, a user may determine that the damage is related to a part, such as a front fender of a vehicle, and input field 4405c may receive this part description.

In some embodiments, a claim may have been generated for an event, such as a vehicle accident, and photo 4401a and damage annotation 4403a and 4403b may be associated with the generated claim. The claim information may include a customer name, a date for the event, a description for the event, a location for the event, a location for the customer, a VIN number for the vehicle, a policy number, and any other suitable claim information.

In some aspects of the disclosure, a device displaying screen 4405 (e.g., server 101, terminal 141 and/or terminal 151) may be operatively connected to a database (e.g., database 121). The database may store part information for makes and models for a plurality of cars. In an embodiment, the database may additionally store cost information for one or more parts, such as the cost for repairing a part and the cost for replacing a part. For example, the database may store part information, such as a fender type, for a car of a first make and a first model, and the cost for repairing the fender and the cost for replacing the fender. The cost stored in the database may comprise a cost for parts, parts and labor, or any other suitable cost.

In some embodiments, based on the claim information, one or more of input fields 4405b and 4405c may be prepopulated. For example, a make and model for the vehicle associated with the claim may be determined based on the claim information, and the database may be queried to determine part information for the make and model. Input fields 4405b and 4405c may comprise drop down menus, and the drop down menus may be prepopulated based on the make and model of the vehicle involved in the claim. In an example, a vehicle may be of a first make and model, and part information may be determined for the vehicle.

Interface 4405a may display a cost for repair and/or replacement of the part identified in input fields 4405b and 4405c. For example, the database may be queried to determine part information, a cost for repairing the part, and a cost for replacing the part. The cost may be displayed and a user may select repairing the part with button 4405d and replacing the part with button 4405e.

Figure 45:
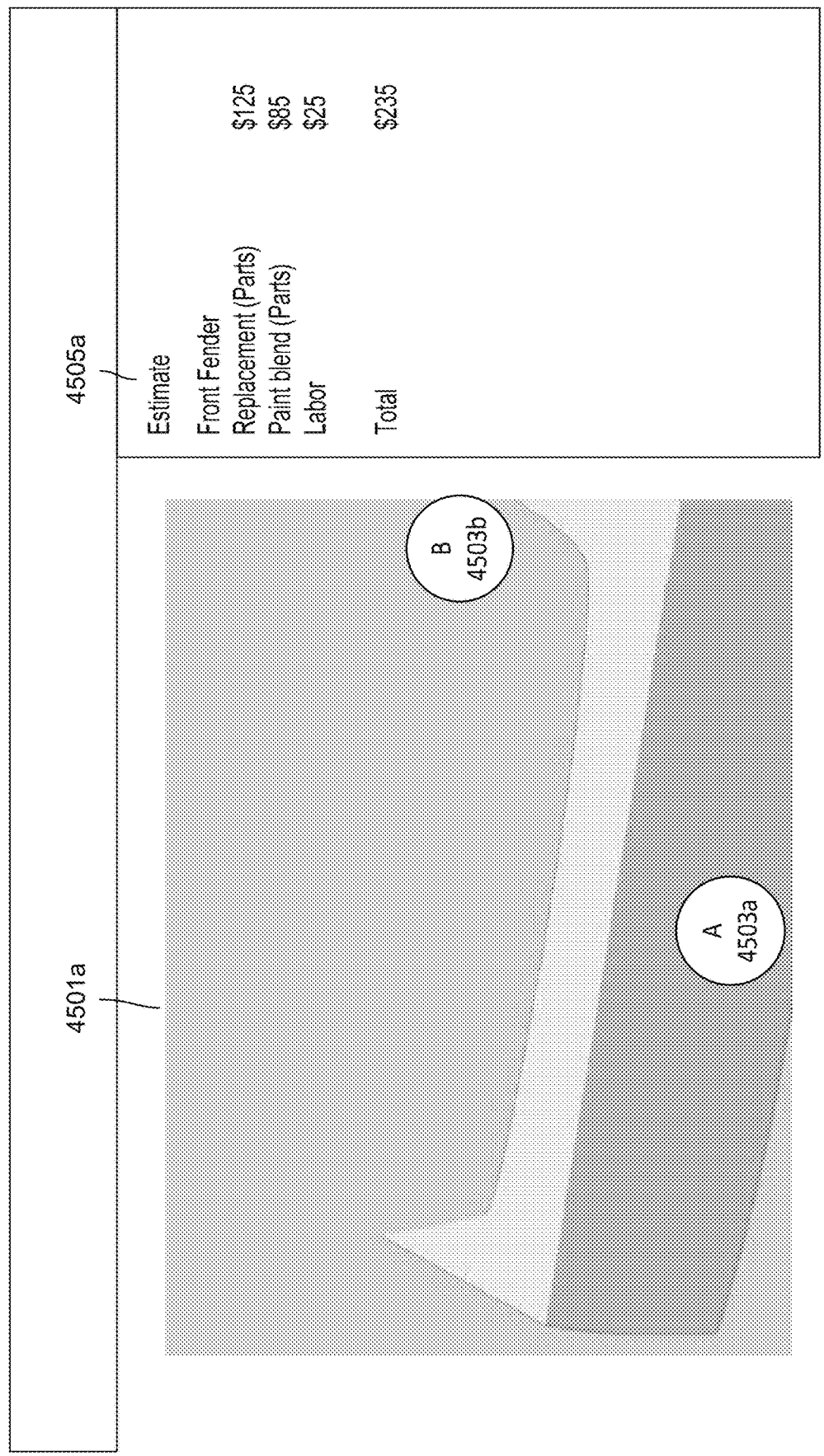
FIG. 45 shows a display screen for determining a cost estimate for replacing or repairing a damaged part of an insured item in accordance with certain aspects of the present disclosure.

In an embodiment, estimate data may be input for a damage annotation and the estimate data may be displayed to a user. FIG. 45 shows a display screen displayed to a user of a device in accordance with at least one aspect of the present disclosure. Screen 4501 shows an estimate display screen displayed to a user in accordance with at least one aspect of the present disclosure. For example, screen 4501 may display photo 4501*a*, such as a photo about an insured item (e.g., a vehicle). In an embodiment, annotations 4503*a* and 4503*b* may comprise damage annotations that indicate the damage displayed at a portion of the photo. In an example, damage annotation 4503*a* may be selected and estimated data may be received about the damage annotation.

In some aspects of the disclosure, an estimate for damage annotation 4503*a* may be calculated, and the estimate may be displayed at user interface element 4505*a*. For example, the received estimate data may indicate a replacement for a front fender of the vehicle involved the accident. The estimate may include a replacement cost for the parts (e.g., fender and paint) and labor (e.g., installation and painting). A total for the estimate may further be displayed. In some aspects of the disclosure, the cost for parts and/or labor may be queried from a database based on associated claim information, as further described above.

In some embodiments, a plurality of estimated data may be received about a plurality of damage annotations, and a plurality of estimates may be calculated. In this example, the plurality of estimates may be displayed, for example by element 4505*a*, and a total for the cost of the plurality of estimates may be displayed. In certain aspects of the disclosure, the damage annotations and estimates displayed in FIGS. 43-45 may be generated using a touch display, such as a tablet, a touch screen laptop, or any other suitable device.

It should be noted that one or more aspects of the above-described embodiments may be applied to various types of items that may or may not be insured, such as vehicles, homes, other properties, etc.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, the described implementation includes software but the present disclosure may be implemented as a combination of hardware and software or in hardware alone. Additionally, although aspects of the present disclosure are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

What is claimed is:

1. A method comprising:
   generating, via one or more user interface elements displayed on a display screen of a user computing device, data comprising a three-dimensional view of a vehicle or a panoramic view of the vehicle;
   sending, by the user computing device and to an enhanced claims processing server, the data;
   locking, by the user computing device and responsive to receiving a signal to lock a first one or more user interface elements, the first one or more user interface elements displayed on the display screen;
   unlocking, by the user computing device and responsive to receiving a request for additional data, a second one or more user interface elements displayed on the display screen;
   receiving, by the user computing device, a user selection indicating a selected user interface element of the second one or more user interface elements;
   generating, by the user computing device and via the selected user interface element, the additional data; and
   sending, by the user computing device and to the enhanced claims processing server, the additional data.

2. The method of claim 1, wherein the request for additional data is received from the enhanced claims processing server.

3. The method of claim 2, wherein the second one or more user interface elements comprise user interface elements that correspond to the additional data.

4. The method of claim 2, further comprising receiving, by the user computing device, a message comprising instructions about the additional data and a user-selectable graphical element identifying the selected user interface element.

5. The method of claim 2, wherein the additional data comprises one or more images.

6. The method of claim 5, further comprising: receiving, by the user computing device, a signal to re-lock the selected user interface element.

7. The method of claim 1, further comprising: displaying a login screen on the display screen of the user computing device.

8. A system comprising:
   an enhanced claims processing server; and
   a computing device communicatively connected to the enhanced claims processing server and comprising:
     a display screen;
     a processor; and
     a memory storing computer-readable instructions that, when executed by the processor, cause the computing device to:
       capture, via one or more user interface elements displayed on the display screen, data comprising a three-dimensional view of a vehicle or a panoramic view of the vehicle;
       send the data to the enhanced claims processing server;
       lock, in response to receiving a signal a signal to lock a first one or more user interface elements, the first one or more user interface elements displayed on the display screen;
       unlock, responsive to receiving a request for additional data, a second one or more user interface elements displayed on the display screen;
       receive a user selection indicating a selected user interface element of the second one or more user interface elements;
       generate, via the selected user interface element, the additional data; and
       send the additional data to the enhanced claims processing server.

9. The system of claim 8, wherein the request for additional data is received from the enhanced claims processing server.

10. The system of claim 9, wherein the second one or more user interface elements comprise user interface elements that correspond to the additional data.

11. The system of claim 8, wherein the memory further stores computer-readable instructions that, when executed by the processor, cause the computing device to:
    receive a message comprising instructions about the additional data and a user-selectable graphical element identifying the selected user interface element.

12. The system of claim 8, wherein the additional data comprises one or more images.

13. The system of claim 8, wherein the memory further stores computer-readable instructions that, when executed by the processor, cause the computing device to:
  receive a signal to re-lock the selected user interface element.

14. The system of claim 8, wherein the memory further stores computer-readable instructions that, when executed by the processor, cause the computing device to: display a login screen on the display screen of the computing device.

15. A computing device comprising:
  a display screen;
  a processor; and
  a memory storing computer-readable instructions that, when executed by the processor, cause the computing device to:
    capture, via one or more user interface elements displayed on the display screen, data comprising a three-dimensional view of a vehicle or a panoramic view of the vehicle;
    send the data to an enhanced claims processing server;
    lock, in response to receiving a signal a signal to lock a first one or more user interface elements, the first one or more user interface elements displayed on the display screen;
    unlock, responsive to receiving a request for additional data, a second one or more user interface elements displayed on the display screen;
    receive a user selection indicating a selected user interface element of the second one or more user interface elements;
    generate, via the selected user interface element, the additional data; and
    send the additional data to the enhanced claims processing server.

16. The computing device of claim 15, wherein the request for additional data is received from the enhanced claims processing server and wherein the additional data comprises one or more images.

17. The computing device of claim 15, wherein the second one or more user interface elements comprise user interface elements that correspond to the additional data.

18. The computing device of claim 15, wherein the memory further stores computer-readable instructions that, when executed by the processor, cause the computing device to:
  receive a message comprising instructions about the additional data and a user-selectable graphical element identifying the selected user interface element.

19. The computing device of claim 15, wherein the memory further stores computer-readable instructions that, when executed by the processor, cause the computing device to:
  receive a signal to re-lock the selected user interface element.

* * * * *